United States Patent [19]

Ehara et al.

[11] Patent Number: 5,624,525
[45] Date of Patent: Apr. 29, 1997

[54] SHEET STICKING APPARATUS

[75] Inventors: Tadamasa Ehara, Sayama; Tetsuro Kimura, Saitama; Kazuaki Mimura, Urawa, all of Japan

[73] Assignees: Honda Giken Kogyo Kabushiki Kaisha; Lintec Corporation, both of Tokyo, Japan

[21] Appl. No.: 282,704

[22] Filed: Jul. 29, 1994

[30] Foreign Application Priority Data

| Aug. 2, 1993 | [JP] | Japan | 5-191401 |
| Jun. 1, 1994 | [JP] | Japan | 6-120449 |
| Jun. 1, 1994 | [JP] | Japan | 6-120450 |
| Jun. 1, 1994 | [JP] | Japan | 6-120451 |

[51] Int. Cl.$^6$ .......................... B32B 31/00; G05G 15/00
[52] U.S. Cl. .......................... 156/360; 156/361; 156/363; 156/541; 156/542; 156/556; 156/580; 100/238; 198/345.1
[58] Field of Search .......................... 156/360, 361, 156/362, 363, 540, 541, 542, 556, 566, 580; 198/345.1, 406, 409, 416, 456; 100/238

[56] References Cited

U.S. PATENT DOCUMENTS

| 3,238,080 | 3/1966 | Schluter | 156/351 |
| 3,427,214 | 2/1969 | Voigt | 156/542 X |
| 3,483,059 | 12/1969 | Dinter | 156/542 X |
| 4,025,382 | 5/1977 | Del Rosso | 156/542 X |
| 4,170,095 | 10/1979 | Hightower | 198/456 X |
| 4,211,399 | 7/1980 | McGowan | 198/345.1 X |
| 4,554,042 | 11/1985 | Marchetti | 156/360 X |
| 4,638,756 | 1/1987 | Collmann | 198/345.1 X |
| 5,022,954 | 6/1991 | Plaessmann | 156/542 |
| 5,232,539 | 8/1993 | Carpenter et al. | 156/360 |
| 5,342,461 | 8/1994 | Murphy | 156/360 X |

FOREIGN PATENT DOCUMENTS

B224464  1/1990  Japan .

Primary Examiner—David A. Simmons
Assistant Examiner—Paul M. Rivard
Attorney, Agent, or Firm—Webb Ziesenheim Bruening Logsdon Orkin & Hanson, P.C.

[57] ABSTRACT

A sheet sticking apparatus for sticking a sheet S held on a continuous separator T and fed to the surface of a work W carried on a conveyor, which comprises a sorting section 7 adapted to position a work W fed from the preceding step and lower a detection plate 84 to sort the height of the work W, a sheet sticking section 8 arranged downstream of the sorting section 7 and adapted to lower the separator T to just above the work W, and sticking the sheet S to the surface of the work W while gradually peeling the sheet S from the separator T in synchronism with the carriage of the work W, and a press section 9 adapted to lower a press member 270, 271 to a position at which the press member contacts the surface of the work W, so that the press member presses the sheet S over its substantially entire surface against the work W, and to deliver the work W with the sheet stuck to the ensuing step. By virtue of this apparatus, the sheet S can be automatically stuck to the surface of the work W, even if it is large-sized and has an uneven surface, without the need to use a mold corresponding to the shape of the work W.

19 Claims, 37 Drawing Sheets

SHEET STICKING APPARATUS

FIELD OF THE INVENTION

The present invention relates to a sheet sticking apparatus and a sheet sticking method which can most suitably be employed to stick a pressure sensitive sheet, such as a protective film, being flexible and excellent in contour following properties to, for example, the surface of a large-sized work with an uneven surface.

BACKGROUND OF THE INVENTION

It is now being widely practiced to stick flexible protective films having excellent contour-following properties to, for example, the surfaces of aluminum wheels as automobile parts in order to prevent them from suffering from soil or flaw on the surfaces during the storage or transportation after manufacturing of the automobiles and to peel the protective films at the time of sale.

The sticking of a sheet to the surface of a large-sized work with an uneven surface (nonflat surface), such as the above-mentioned sticking of protective films to automobile wheels, has been carried out by the manual work of workers.

The reason for the need of the manual work is as follows. The above-mentioned protective films for automobile wheels and other flexible sheets themselves have small thicknesses and hence inherently have substantially no capability of shape retention. Thus, the attempt to adhere the sheet to the surface of a large-sized work with an uneven surface by pressing the sheet against the surface while mechanically holding two ends of the sheet encounters extreme difficulty in attaining the adherence in such a condition that the sheets follow the uneven contour of the work. Such machine operation is likely to cause various problems, include formation of an air layer between the work and the sheet, wrinkling of the sheet and inclination for coiling and peeling of the sheet at the periphery of the sheet.

In order to cope with these problems, for example, Japanese Patent Publication No, 4464/1990 proposes an automatic process for the above type of sheet, comprising providing a mold having a molding surface with an unevenness opposite to that of a surface of the work (molded item) to which the sheet is to be stuck, molding a sheet having a configuration following the contour of the molding surface of the above mold, and pressing the sheet against the surface of the work (molded item) to which the sheet is to be stuck while retaining the configuration of the sheet to thereby attain sticking of the sheet.

However, the above-mentioned conventional sheet sticking by the manual work of workers consumes enormous labor to thereby cause the productivity to be extremely poor.

On the other hand, in the process disclosed in Japanese Patent Publication No. 4464/1990, it is needed to provide, for each different work, a mold having a molding surface with an unevenness opposite to that of a surface of the work to which the sheet is to be stuck, and to employ the mold in conformity with the work. Not only does this require considerably time-consuming mold control but also the fabrication of the mold is pretty difficult. Further, the molding by the use of the mold inevitably requires mold closing and opening operations, which become a bottleneck in a sequence of sheet sticking operations to thereby cause the productivity to be poor.

Still further, in the above molding of a sheet having a configuration corresponding to the contour of the surface of the work to which the sheet is to be stuck and directly pressing of the sheet against the surface of the work to which the sheet is to be stuck while retaining the configuration of the sheet, not only would the sheet be wrinkled at the time of the sheet molding following the contour of the molding surface of the mold, e.g., when the surface of the work to which the sheet is to be stuck is uneven, air would remain between the sheet and the work to thereby form an air layer therebetween, but also the pressure at the periphery of the sheet would be so poor as to cause inclination for coiling and peeling of the sheet at the periphery.

OBJECT OF THE INVENTION

An object of the present invention is to provide means for automatically sticking a sheet to the surface of a work within a short period of time without the need to use a mold having a molding surface corresponding to the contour of the work, even if the work is large-sized and has an uneven surface, in view of the above situation of the prior art.

Another object of the present invention is to provide means for causing a sheet temporarily stuck to the surface of a work to adhere over its substantially entire surface to the surface of the work and further for securely pressing especially the periphery of the sheet along its entire circumference against the work to thereby accomplish the desired sticking.

SUMMARY OF THE INVENTION

For attaining the above objects, one form of the sheet sticking apparatus of the present invention is an apparatus for sticking a sheet held on a continuous separator and continuously fed to the surface of a work sequentially carried on a conveyor, and comprises a sorting section adapted to position a work fed from the preceding step and lower a detection plate so as to sort at least the height (according to necessity, the size and the type) of the work; a sheet sticking section arranged downstream of the sorting section and adapted to lower the sheet-holding separator to just above the work and stick the sheet to the surface of the work while gradually peeling the sheet from the separator in synchronism with the carriage of the work; and a press section adapted to lower a press member to a position at which the press member contacts the surface of the work, so that the press member presses the sheet over its substantially entire surface against the work, and to deliver the work with the sheet stuck to the ensuing step.

Further, one mode of the sheet sticking method of the present invention is a method for sticking a sheet held on a continuous separator and continuously fed to the surface of a work sequentially carried on a conveyor, and comprises sorting the height of the work, lowering the sheet-holding separator to just above the work in accordance with the height of the work and simultaneously sharply folding back this separator to thereby cause the forward edge of the sheet to peel, sticking the sheet to the surface of the work while sending out the separator in synchronism with the carriage of the work to thereby gradually peel the sheet, and thereafter lowering a press member in accordance with the height of the work to thereby press the sheet over its substantially entire surface against the work.

In the above form and mode of the present invention, first, a work sequentially carried from the preceding step is positioned to a predetermined place. Then, at least the height of the work is sorted, and a sheet is automatically stuck to the surface of the work while gradually peeling the sheet from the separator at position suitable for the height of the work. The sheet stuck to the work is pressed against the work by means of a press member, so that the work can sequentially be delivered to the ensuing step without the occurrence of undesirable peeling and flotation of the sheet from the work.

Another form of the sheet sticking apparatus of the present invention is an apparatus for sticking a sheet held on a continuous separator and continuously fed to the surface of a work sequentially carried on a conveyor, and comprises a sheet sticking section provided with a labeler head having a peel plate adapted to peel the forward edge of the sheet from the separator by sharply folding back the sheet-holding separator half-way on a carriage path thereof, a vacuum grid capable of traveling along the work carriage direction, positioned in front of the peel plate and adapted to advance while adsorbing and holding the sheet peeled from the separator, and an air blow connected to an edge of the vacuum grid on its side of the peel plate and adapted to downward blow air at the forward edge of the vacuum grid in synchronism with the feed of the sheet and the carriage of the work to thereby stick the sheet to the work.

The above labeler head and vacuum grid may be connected to a lower end o an elevation plate movable up and down to thereby compose an elevatable labeler unit.

Another mode of the sheet sticking method of the present invention is a method for sticking a sheet held on a continuous separator and continuously fed to the surface of a work sequentially carried on a conveyor, and comprises sharply folding back the sheet-holding separator to thereby peel the forward edge of the sheet from the separator, drawing the peeled sheet forward while adsorbing and holding the edge thereof to thereby allow the sheet to hang down, and then conducting an air blow in which air is blown toward the sheet from above the sheet while synchronously feeding the sheet in the work carriage direction, so that the sheet is stuck to the surface of the work.

In the above form and mode of the present invention, the traveling sheet-holding separator is sharply folded back to thereby peel an edge of the sheet held on the separator and continuously fed from the separator by virtue of the rigidity of the sheet. The peeled sheet is drawn forward while adsorbing and holding the edge thereof. Then, the adsorption and hold are liberated to allow the sheet to hang down so as to cover the surface of the work. The carriage of the work is continued, and the sheet is sequentially fed while gradually peeling the sheet from the separator in synchronism with the carriage of the work. An air blow is performed in which air is blown toward the sheet from above the sheet, so that the sheet is pressed against the surface of the work to attain adhesion therebetween by virtue of the air pressure exerted by the air blow. Thus, it is not necessary to employ a mold, and the sheet can automatically be stuck to the surface of the work in a manner such that the sheet follows the contour of the surface of the work.

A further form of the sheet sticking apparatus of the present invention is an apparatus provided with a press section adapted to press a sheet temporarily stuck to the surface of a work, over its substantially entire surface, against the work, wherein the press section is composed of a rotatable press device mount plate, and fixed to a lower side thereof, a plurality of radially divided and approximately sectorially shaped elastic press plates each having inner and outer sides independently movable up and down and a peripheral press roll movable up and down, the peripheral roll being interposed between neighboring press plates and at a position corresponding to the peripheral edge of the press plates.

The press device mount plate may be so constructed as to be movable up and down, and the peripheral press roll may be movable along the diameter direction of the press device mount plate.

A further mode of the sheet sticking method of the present invention comprises temporarily sticking a sheet to the surface of a work and applying a plurality of radially divided and sectorially shaped elastic press plates in a manner such that their inner sides are first lowered and then their outer sides lowered to thereby first press the center of the sheet in the direction from the inside toward the outside against the work, and thereafter traveling a peripheral press roll under pressure on the peripheral part of the sheet along the periphery to thereby press the peripheral part over its entire circumference against the work.

In the above form and mode of the present invention, first, the sheet is temporarily stuck to the surface of the work. While keeping this condition, a press plate member is lowered to thereby press the center of the sheet against the work. A plurality of divided press plates are employed as the press plate member, and their inner sides are first lowered and then their outer sides lowered to thereby gradually press and expand the sheet toward the outer direction while pressing the sheet against the surface of the work, so that the sheet adheres to the work. Thus, any air enclosed between the work and the sheet is gradually guided toward the outer direction and finally discharged, and simultaneously the sheet is so elongated as to prevent wrinkling of the sheet. Subsequently, the press plates are elevated, and a peripheral press roll is traveled, while keeping its lower end pressed against the surface of the work, on the peripheral part of the sheet along the periphery to thereby press the peripheral part of the sheet over its entire circumference against the work with a satisfactory force. Thus, the coiling and peeling of the sheet from the periphery of the sheet can be prevented.

Still a further form of the sheet sticking apparatus of the present invention is an apparatus for sticking a sheet held on a continuous separator and continuously fed to the surface of a work sequentially carried on a conveyor, and comprises a peel plate adapted to peel the forward edge of the sheet from the separator by sharply folding back the sheet-holding separator halfway on a carriage path thereof, a grid positioned in front of the peel plate along the work carriage direction, being movable forward and backward along the work carriage direction and adapted to adsorb and hold the edge of the peeled sheet, and an elevatable press roll positioned above the grid and adapted to descend so as no press the sheet against the work.

Still a further mode of the sheet sticking method of the present invention is a method for sticking a sheet held on a continuous separator and continuously fed to the surface of a work carried on a conveyor, and comprises sharply folding back the sheet-holding separator to thereby peel the forward edge of the sheet from the separator, adsorbing and holding the edge of the peeled sheet, synchronously advancing the sheet along the work carriage direction while keeping the holding of the sheet and pressing the sheet against the work by means of a press roll halfway while advancing the sheet.

In the above form and mode of the present invention, the traveling sheet-holding separator is sharply folded back to thereby peel an edge of the sheet held on the separator and continuously fed from the separator by virtue of the rigidity of the sheet, which edge is adsorbed and held. While maintaining the adsorption and holding of the edge, the sheet is advanced synchronously with the work along the work carriage direction, thereby gradually peeling the sheet from the separator. While continuing the peeling, the thus peeled sheet is caused to cover the surface of the work, and simultaneously the sheet having covered the surface of the work is pressed by means of a press roll against the work to thereby attain automatic sticking of the sheet to the surface of the work.

BRIEF DESCRIPTION OF THE DRAWINGS

FIG. 55A, FIG. 55B and FIG. 55C are views illustrating the action taken at the time of the primary sticking of a protective film to a wheel surface in the second embodiment.

DETAILED DESCRIPTION OF PREFERRED EMBODIMENTS

Figure 1:
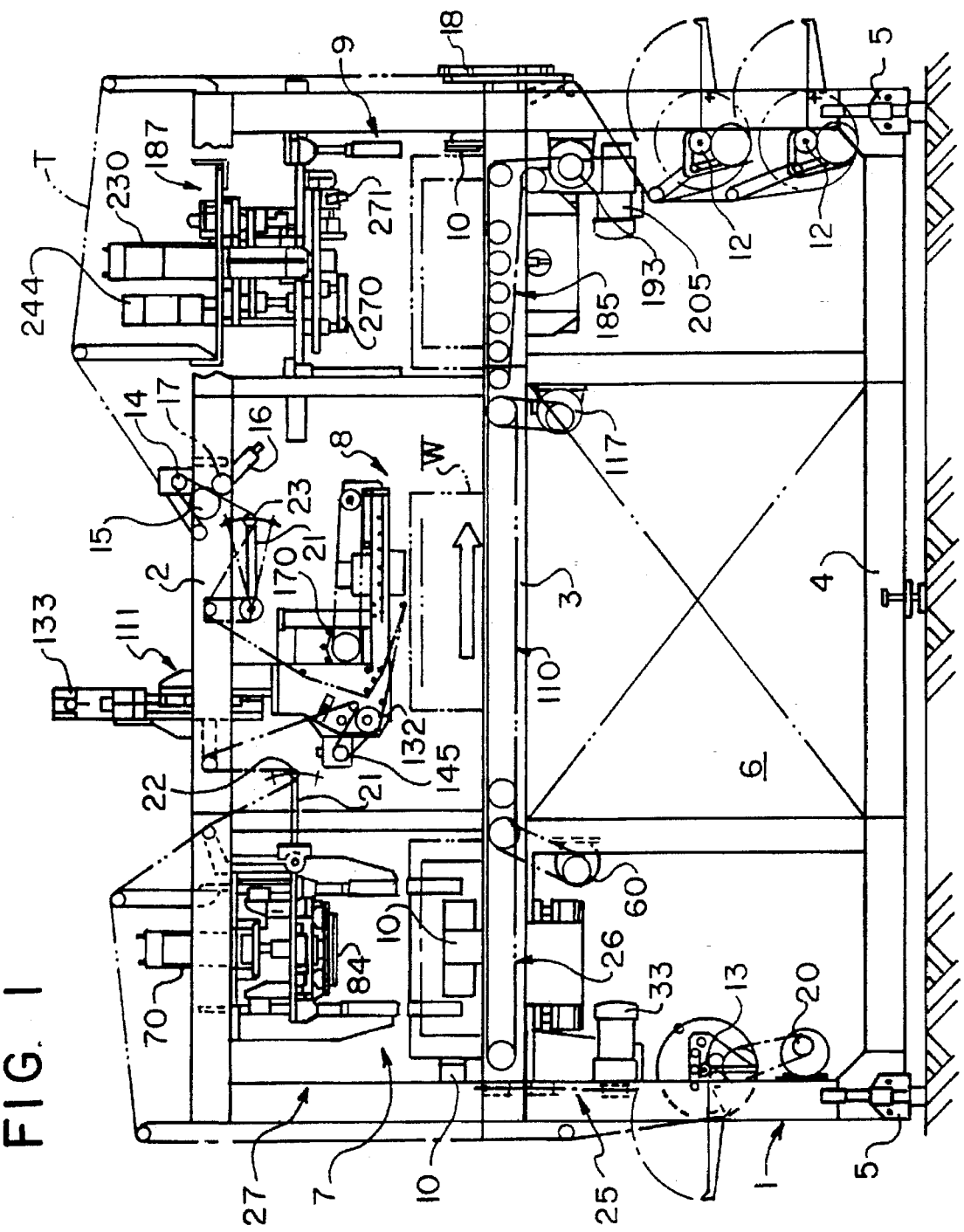
FIG. 1 is a general front view illustrating the first embodiment of the present invention.

Representative embodiments of the present invention will now be described with reference to the drawings.

FIGS. 1 to 49 illustrate the first embodiment and FIGS. 50 to 55 the second embodiment of the present invention. In these embodiments, a wheel W mounted on a tire for use in an automobile is employed as the work to which a sheet is to be stuck, and a protective film (sheet) S is stuck to the surface of the disk of the wheel W in order to prevent the same from suffering from soil or flaw during the storage or transportation of the automobile.

In the first embodiment, numeral 1 denotes a rectangularly framed and three-dimensionally assembled main frame. The main frame 1 is provided with an upper frame 2, a middle frame 3 and a lower frame 4, and the height thereof can be regulated by means of jack bolts 5. Further, a control panel 6 is fixed to the front of the main frame 1.

A sorting section 7, a sheet sticking section 8 and a press section 9 are continuously provided along the direction of the carriage of the wheel (work) W (from left to right in the Figure). Further, a carriage path for separator T is formed so as to surround the circumference of the main frame 1.

Figure 2:
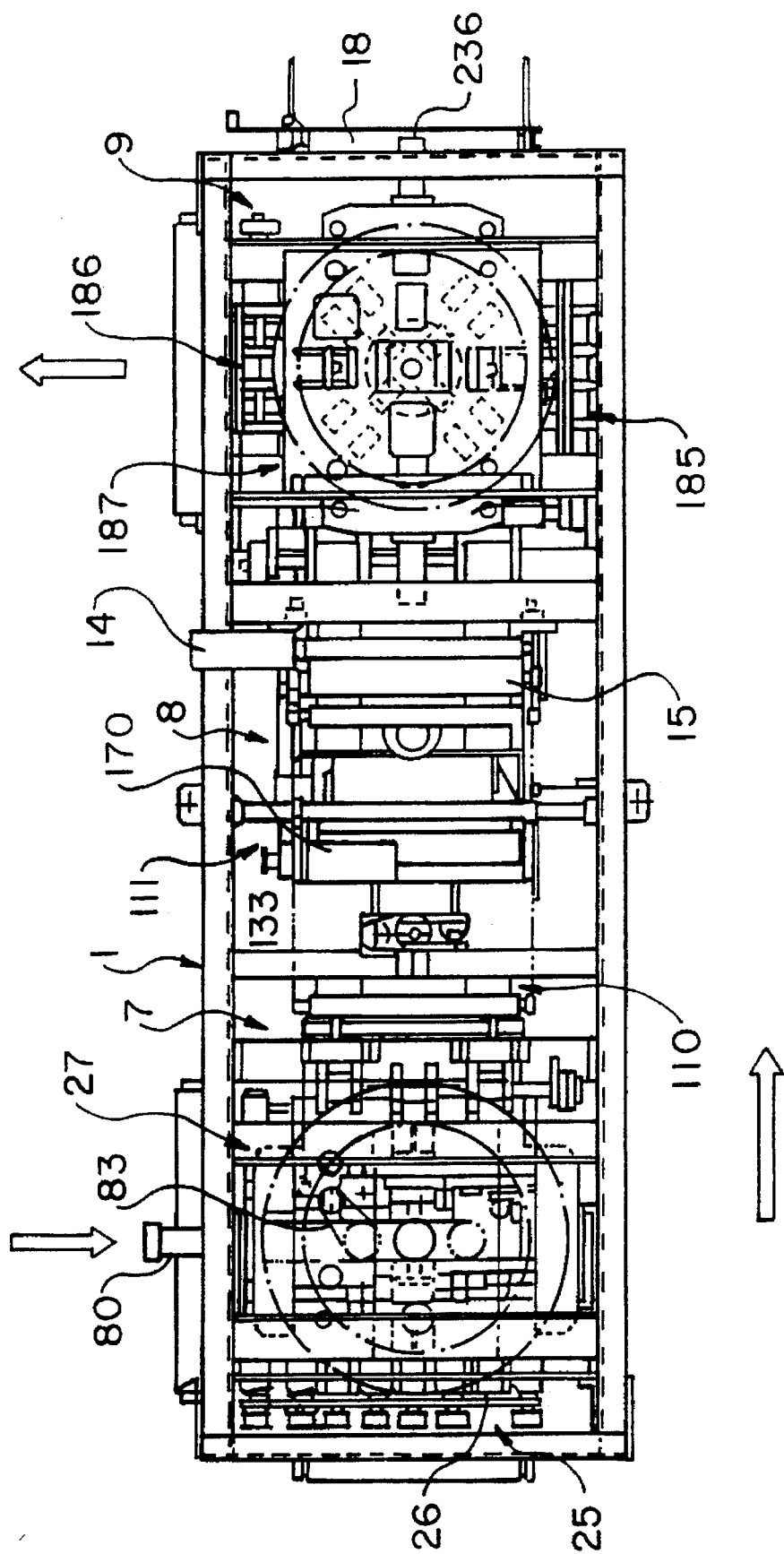
FIG. 2 is a plan illustrating the same.
Figure 3:
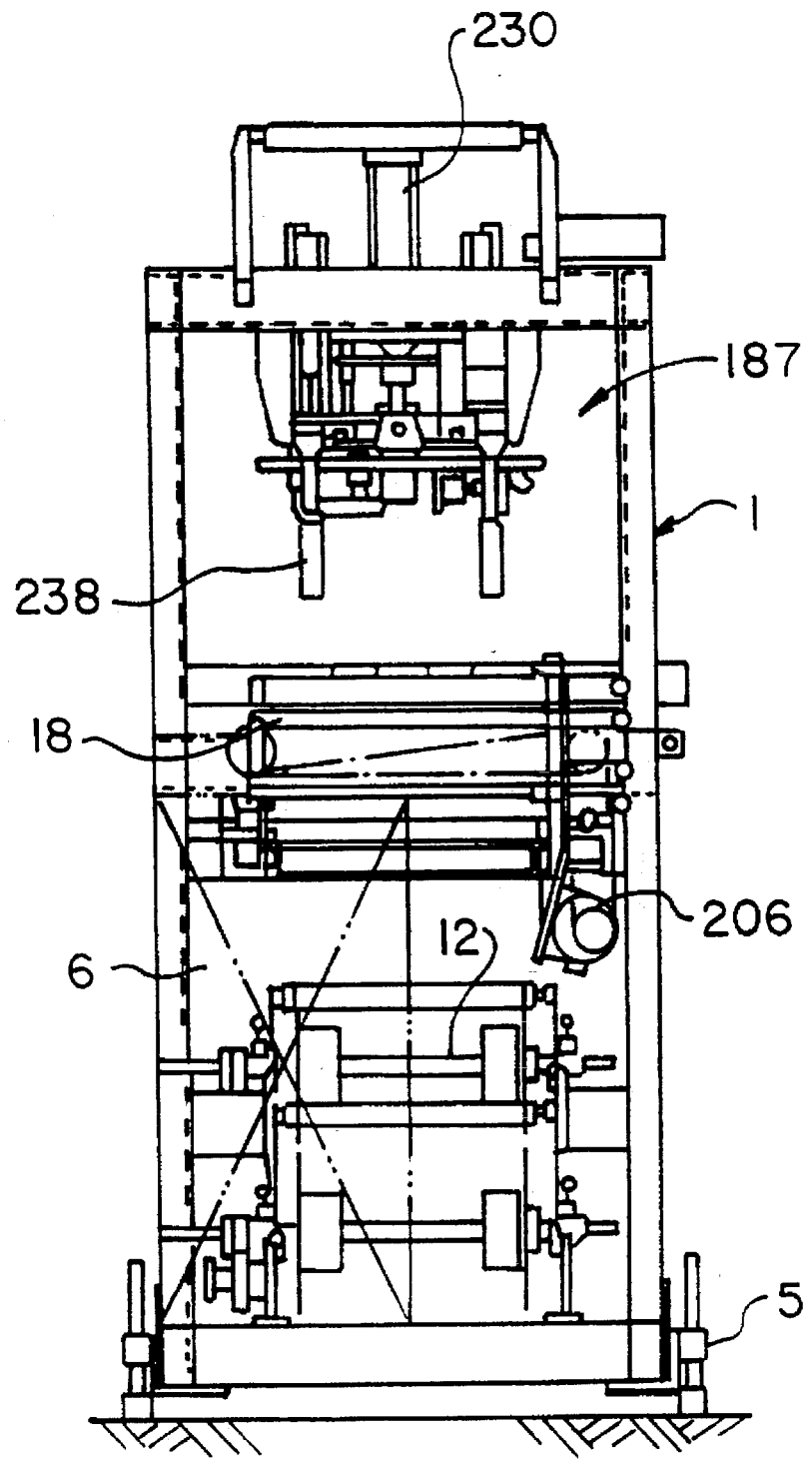
FIG. 3 is a right side view corresponding to FIG. 1.
Figure 4:
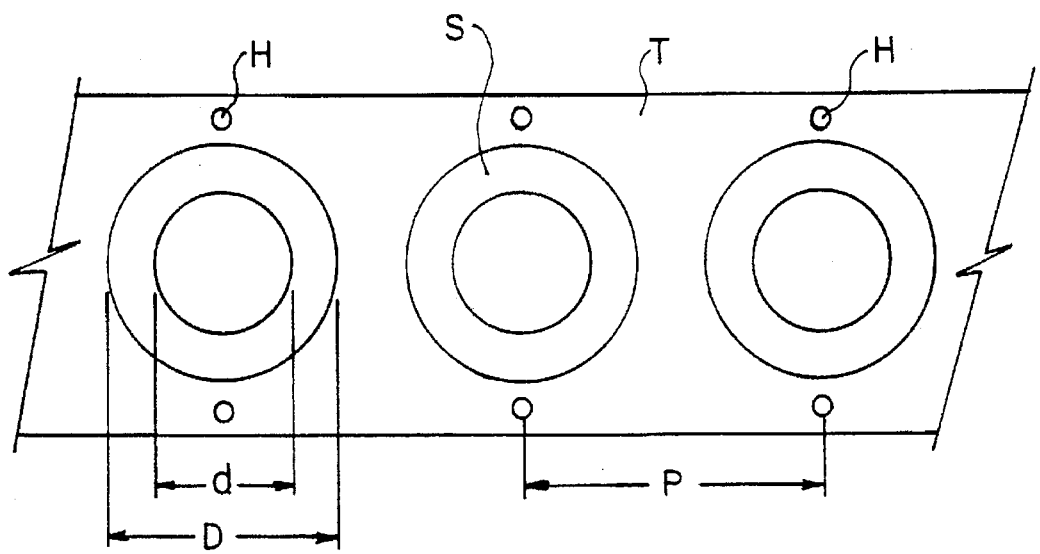
FIG. 4 is a plan of a separator holding protective films.

In the first embodiment, wheels W are fed from the upper left of FIG. 2, and carried from the left side to the right side. During the carriage, protective films (sheets) S held at a predetermined pitch on a continuous separator T as shown in FIG. 4 are stuck to the wheels W on their disk surfaces. Thereafter, the wheels W having the protective films S respectively attached thereto are delivered to the subsequent step toward the upper right of the Figure.

Fixed guides 10 functioning as stoppers for preventing the fall of the wheels W are fixed to the above middle frame 3 at three points, i.e., two right and left extreme sides of the main frame 1 along the wheel W carriage path, and the front side of the sorting section 7.

The separator T is provided with release treatment, and the protective film (sheet) S held on the separator T is, for example, comprised of a flexible polyethylene base of about 50 μm in thickness with contour-following properties, the surface of the base having a pressure sensitive adhesive laminated thereto. The separator T have film detection holes H perforated on both sides thereof at a predetermined pitch p conforming with the size of the protective film S, as shown in FIG. 4.

In the sheet sticking section 8, the protective films S are peeled one by one from the separator T, and stuck to the surfaces of the wheels W. A carriage path for the separator T will be described below.

Two separator-with-protective-films holding shafts 12 adapted to support in a wound form a separator T having protective films S adhering thereto are disposed on one side (right side) of the main frame 1 at its lower part while a separator winding shaft 13 adapted to wind the separator T from which the protective films S have been peeled is disposed on the other side (left side) of the main frame 1 at its lower part.

A hoisting roll 15 adapted to rotate by the driving force of a separator feeding motor 14 and a pinch roll 17 adapted to advance toward the direction of the hoisting roll 15 by the action of a cylinder for hoisting roll unit 16 and to cooperate with the hoisting roll 15 to sandwich the separator T therebetween are disposed in mutually opposing relationship on the upper frame 2 of the main frame 1 between the sheet sticking section 8 and the press section 9.

This apparatus is so constructed that the separator T supported by the separator-with-protective-films holding shafts 12 in a wound form detours above the press section 9, and guided so as to have itself sandwiched between the hoisting roll 15 and the pinch roll 17, and that the separator T is intermittently fed toward the sheet sticking section 8 in accordance with the rotation of the hoisting roll 15.

A separator binding bed 18 is disposed above the separator-with-protective-films holding shafts 12. The separator binding bed 18 is used in binding a separator being in current use and a new separator in a manner such that an end of the separator T being in current use and a tip of the new separator T are set thereon so as for their film detection holes H to lie one on the other, the overlap is cut off with a cutter and a tape is applied so as to bind them.

On the other hand, the separator winding shaft 13 is so constructed as to rotate by the driving force of a separator winding motor 20. The separator T from which the protective films S have been peeled and which has detoured above the sorting section 7 is sequentially wound by the separator winding shaft 13 driven by the above motor 20.

Dancer rolls 22, 23 rotatably supported by tips of a pair of swingable tension arms 21 are respectively interposed between the hoisting roll 15 and the following labeler head 132 of the sheet sticking section 8 and between the labeler head 132 and the separator winding shaft 13.

The dancer rolls 22, 23 are moved up and down by the swing of the tension arms 21 corresponding to the magnitude of the tension applied to the separator T. The function of the dancer roll 22 on the side of the separator winding motor 20 is to control the motor 20 while that of the other dancer roll 23 is to control the separator feeding motor 14 in accordance with the swing. Thus, proximity switches are arranged on their ceiling and bottom.

When the dancer roll 22 reaches the bottom, the separator winding motor 20 starts driving. On the other hand, when the dancer roll 22 reaches the ceiling, the driving is halted.

When the dancer roll 23 reaches the ceiling, the separator feeding motor 14 starts driving. On the other hand, when the dancer roll 23 reaches the bottom, the driving is halted.

The above formation of the carriage path for the separator T ensures that not only is the separator T sequentially fed only in the predetermined amount at the predetermined feeding rate by the following labeler head 132 but also the driving of the separator winding motor 20 and the separator feeding motor 14 is controlled in accordance with the up and down movement of the dancer rolls 22, 23, so that the separator T is automatically carried without any slack.

The functions of the sorting section 7 are to position the wheels W fed from the preceding step (positioning by centering in this embodiment), to sort the height, size and type of each of the wheels W and to thereafter sequentially carry the wheels W to the sheet sticking section 8. The sorting section 7 is mainly comprised of a feed roll conveyor 25, a delivery conveyor 26 and a sorting unit 27.

Herein, the sorting of the size of each of the wheels W is, for example, sorting from among 14, 15 and 16 inches. The sorting of the type of each of the wheels W is, for example, sorting from among aluminum, steel and other metals to find whether it is necessary to effect protection of its surface by the use of a protective film S.

In this embodiment, for example, a protective film S having an inner diameter (d) of 150 mm and an outer diameter (D) of 404 mm is commonly applied to 14-inch and 15-inch wheels W, while a protective film S having an inner diameter (d) of 150 mm and an outer diameter (D) of 430 mm is applied to a 16-inch wheel. Further, protective films S are applied only to aluminum wheels W.

Figure 5:
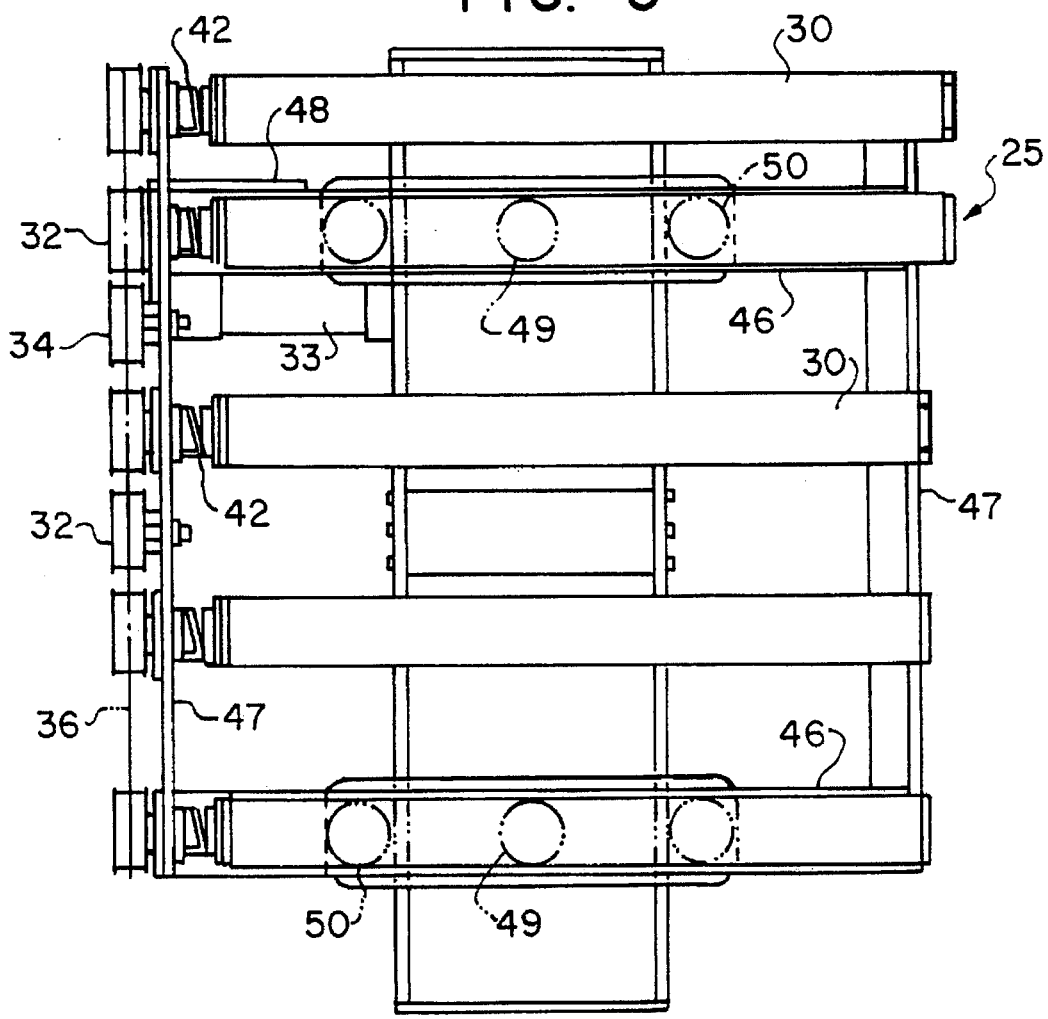
FIG. 5 is a plan of a feed roll conveyor disposed in a sorting section.
Figure 6:
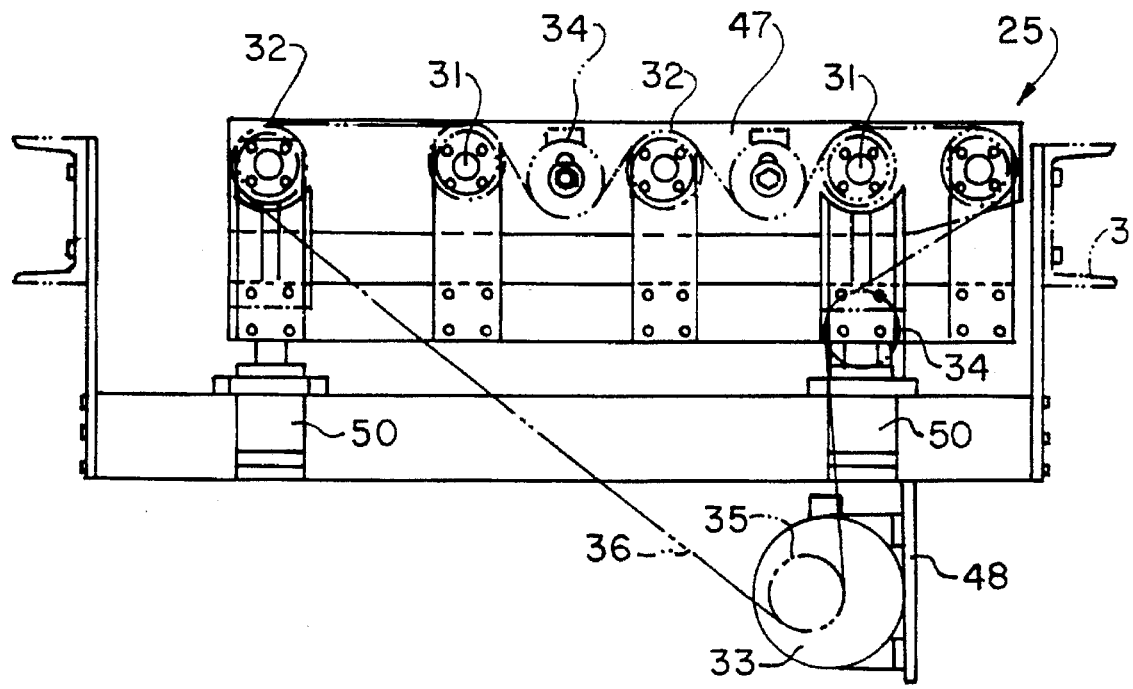
FIG. 6 is a right side view corresponding to FIG. 5.
Figure 7:
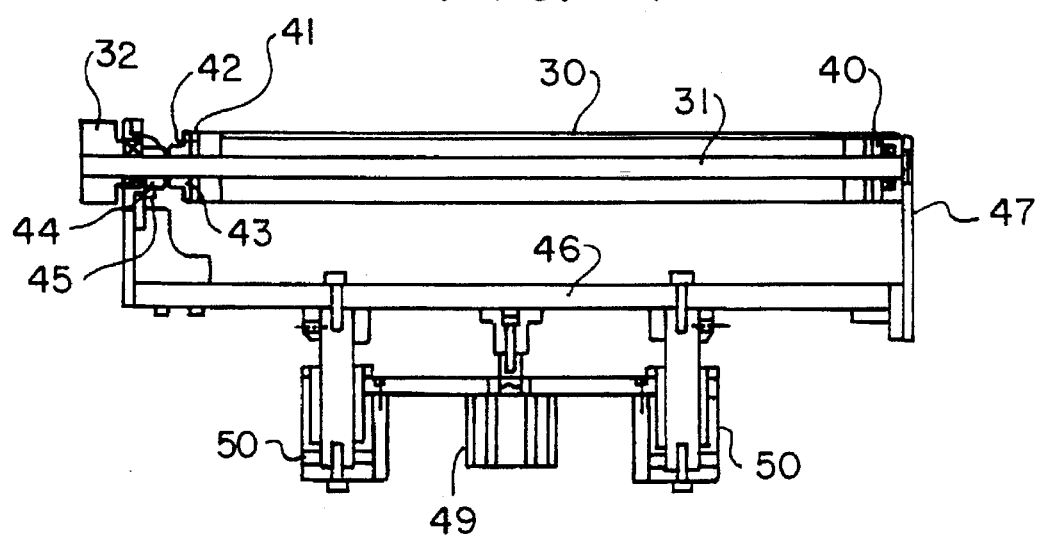
FIG. 7 is a sectional view of a conveyor roll used in the above conveyor.

The role of the feed roll conveyor 25 is to forward the wheels W fed from the previous step to the center of the sorting section 7, below the sorting unit 27. The structure thereof is as shown in FIGS. 5 to 7.

The feed roll conveyor 25 includes a plurality (five in the Figure) of conveyor rolls 30 disposed perpendicularly to the feed direction, in mutually parallel relationship and on the same plane. The conveyor rolls 30 are so constructed as to rotate in accordance with the rotation of respective roll shafts 31. A follower pulley 32 is fixed to an edge of each of the roll shafts 31.

A feed-roll-conveyor driving motor 33 is disposed for rotating the roll shafts 31. Guide pulleys 34 are disposed at predetermined positions between the follower pulleys 32 and between the follower pulley 32 and the driving motor 33. A driving pulley 35 fixed to the output shaft of the driving motor 33, the follower pulleys 32 and the guide pulleys 34 are mutually connected by means of a belt 36.

Thus, mechanism is constructed in which the driving of the feed-roll-conveyor driving motor 33 induces the synchronous rotation of the conveyor rolls 30 in the same direction, which rotation carries the wheels W put on the conveyor rolls 30 into the sorting section 7.

Each of the conveyor rolls 30 is sandwiched at its both ends between a clutch fixing plate 40 and a clutch 41 made of, for example, a felt, and held on the roll shaft 31 in the condition such that it is depressed through a compression spring 42 and a clutch pushing plate 43, as shown in FIG. 7. Thus, when some force is applied to the conveyor roll 30, a slip occurs at the clutch 41, so that the rotation of the roll shaft 31 is not transmitted to the conveyor roll 30 to thereby cause racing thereof.

A torque regulation collar 44 and a torque regulation nut 45 are provided for regulating the torque brought about in the above situation.

This applies to the below described feed roll conveyor 185 of the press section 9.

The above conveyor roll 30 and guide pulley 34 are held on a pair of mount plates 47 respectively connected to both ends of an elevation beam 46. The feed-roll-conveyor driving motor 33 is mounted on a motor mount plate 48 fixed to the mount plates 47.

Each of the elevation beams 46 is connected to the top of the piston rod of a feed-roll-conveyor elevating cylinder 49 fixed in the middle frame 3 of the main frame 1. Thus, the elevation beams 46 are moved up and down while keeping horizontality with the guide of a total of four bearings 50 by the driving of the elevating cylinder 49 with the result that the conveyor rolls 30, the guide pulleys 34 and the driving motor 33 are integral moving up and down.

Figure 8:
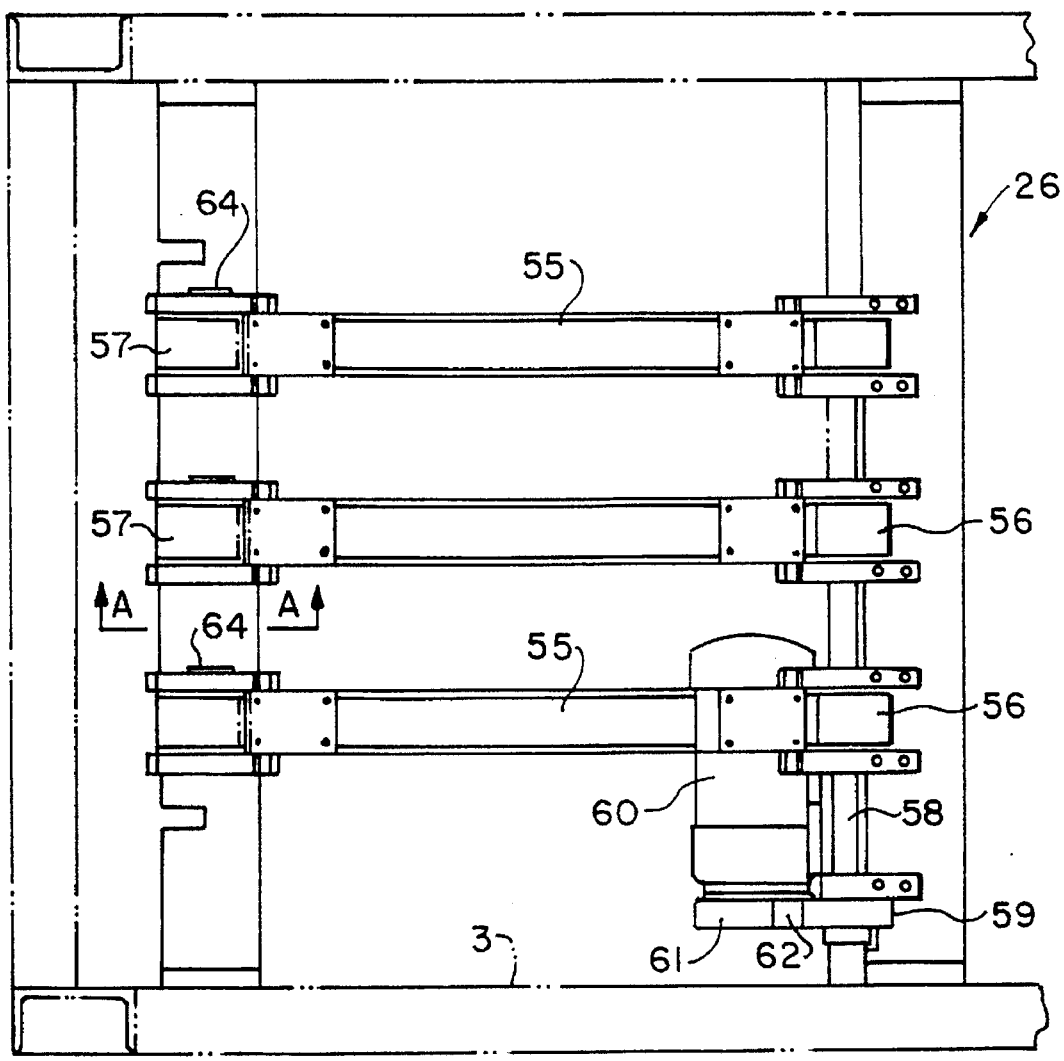
FIG. 8 is a plan of a carriage conveyor disposed in the sorting section.
Figure 9:
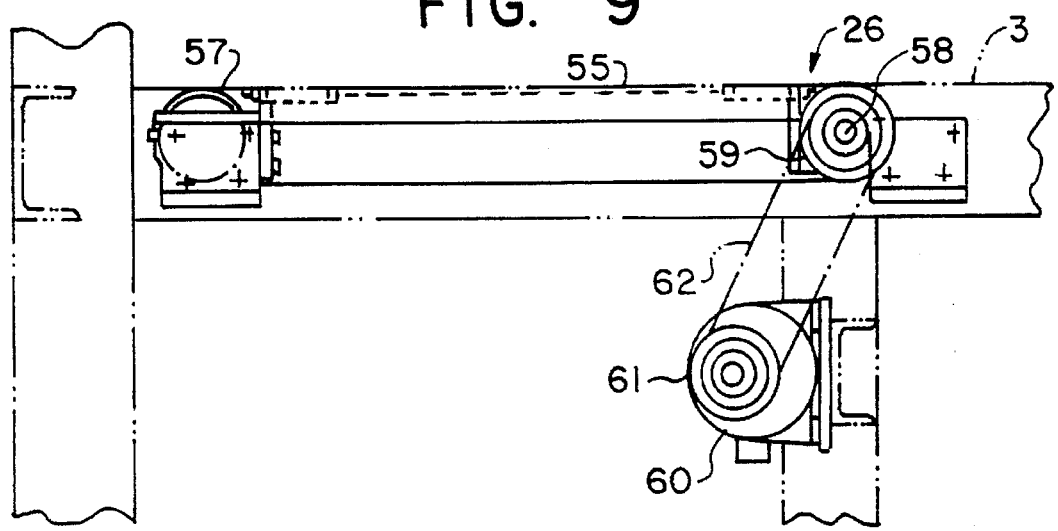
FIG. 9 is a front view corresponding to FIG. 8.

The delivery conveyor 26 is provided with a delivery belt 55 interposed between neighboring conveyor rolls 30 of the feed roll conveyor 25 in parallel therewith and extending the axial direction thereof, as shown in FIGS. 8 and 9. Each of the delivery belts 55 is stretched between a driving-side toothed pulley 56 and a follower-side toothed pulley 57.

The driving-side toothed pulleys 56 are nonrotatably fixed to the same driving shaft 58 rotatably supported. A follower pulley 59 is fixed to an end of the driving shaft 58. A belt 62 is stretched between the follower pulley 59 and a driving pulley 61 fixed to the output shaft of a motor 60 for sorting section delivery conveyor.

Figure 10:
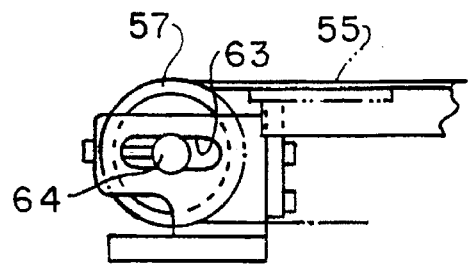
FIG. 10 is a sectional view on the line A—A of FIG. 8.
Figure 11:
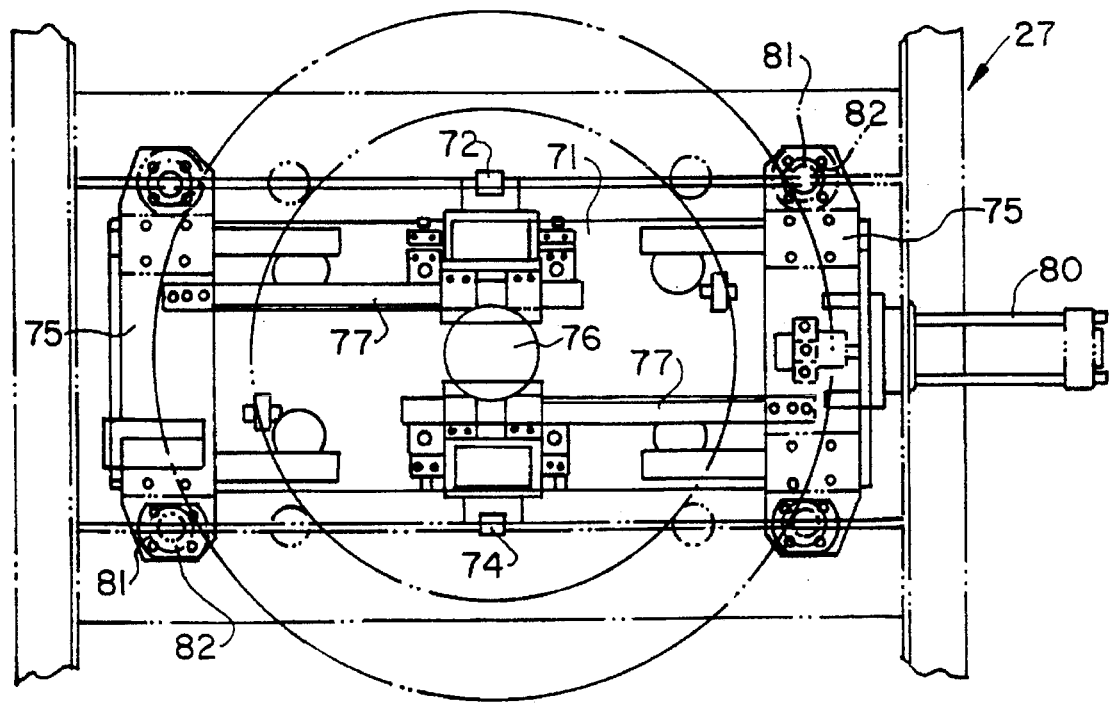
FIG. 11 is a plan of a centering part of a sorting unit of the sorting section.
Figure 12:
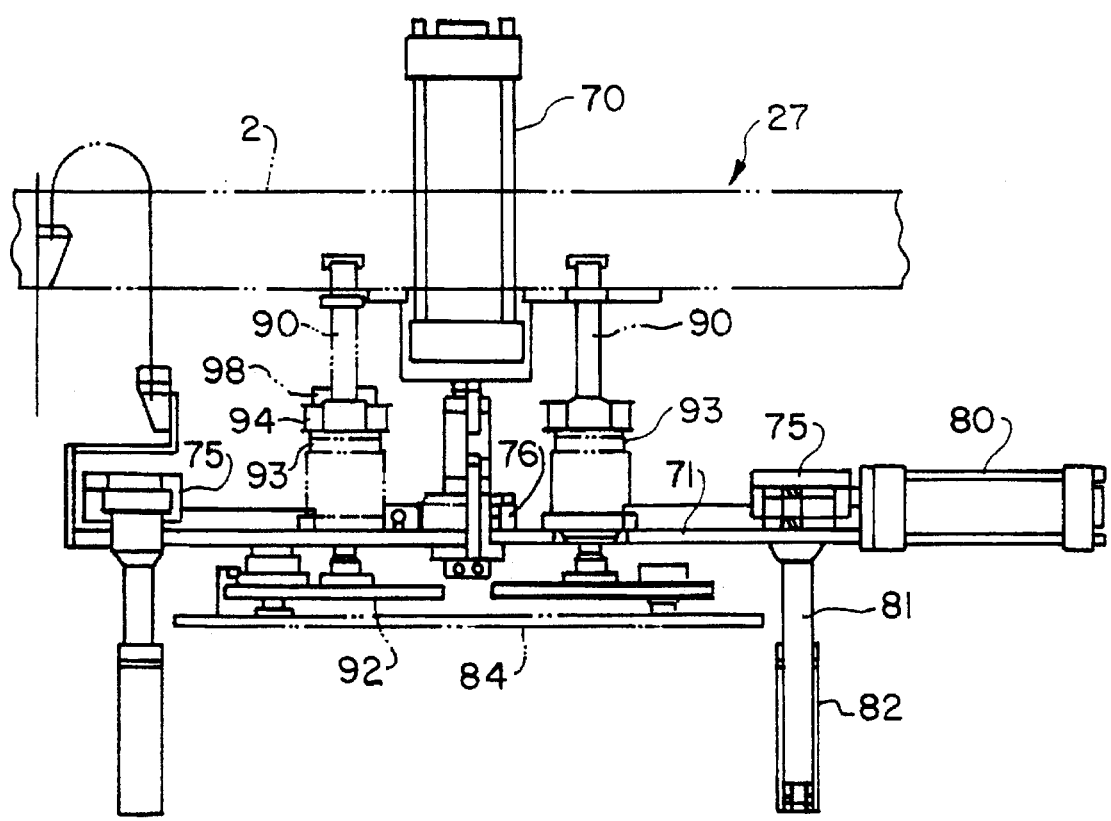
FIG. 12 is a right side view of the centering part of FIG. 11.
Figure 13:
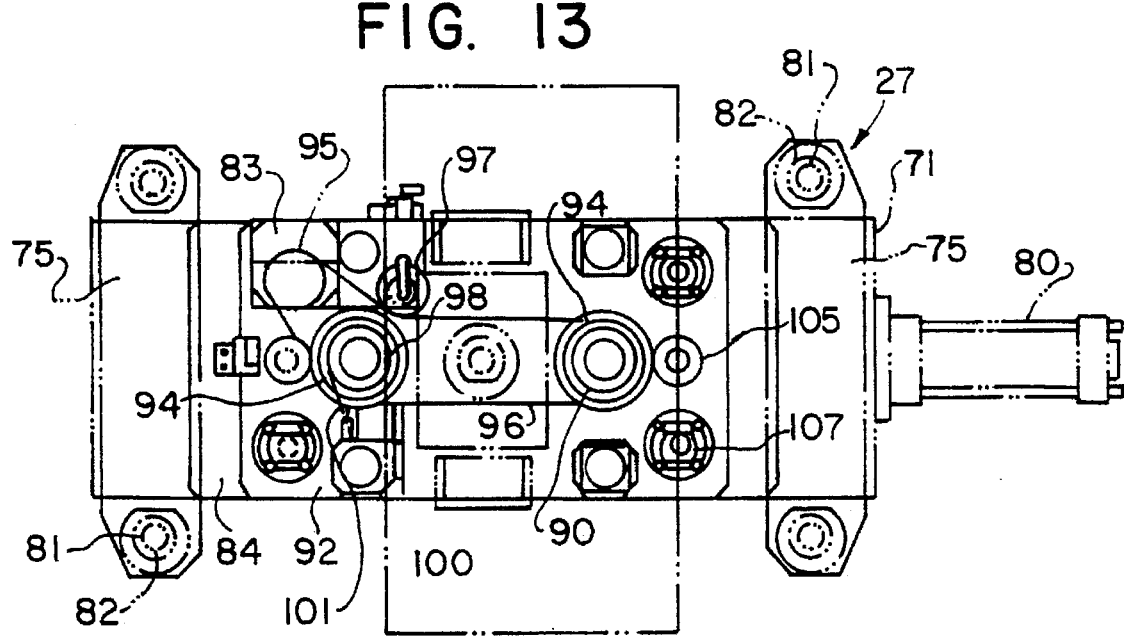
FIG. 13 is a plan of a height detecting part of the above sorting unit.
Figure 14:
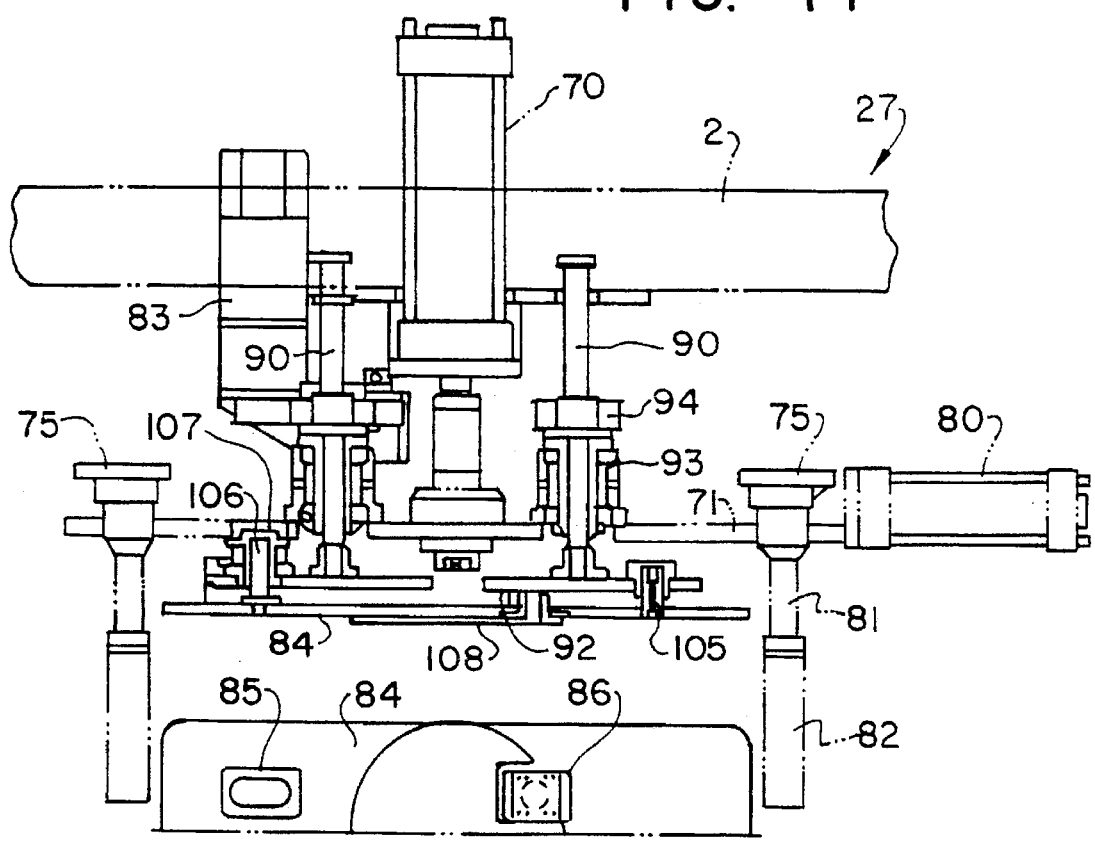
FIG. 14 is a partially cut-away right side view of the height detecting part of FIG. 13.
Figure 15:
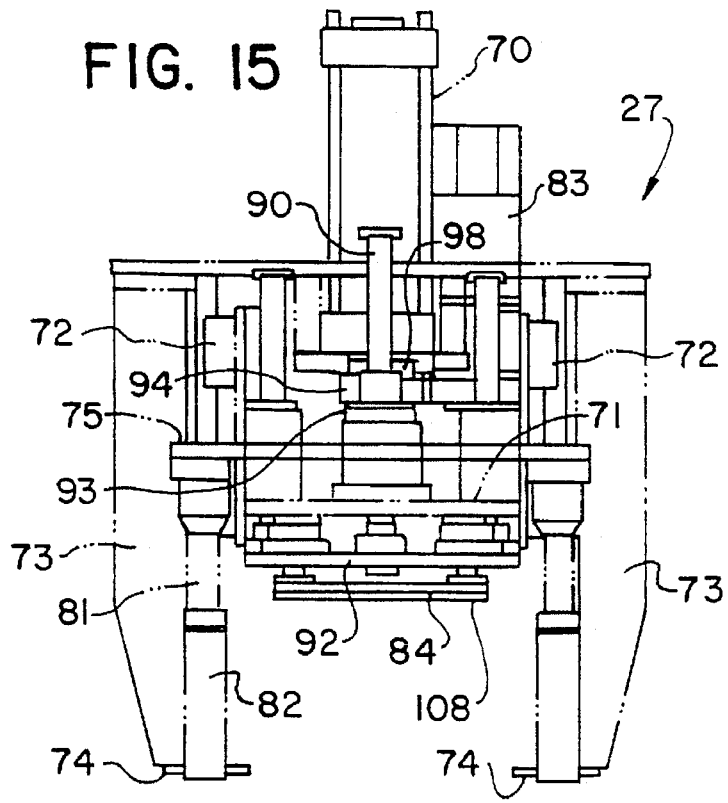
FIG. 15 is a plan of the above height detecting part.
Figure 16:
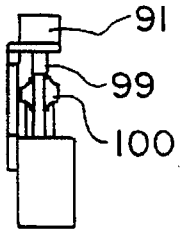
FIG. 16 is a front view of an encoder mount part taken out from the above sorting unit.

Each of the follower-side toothed pulleys 57 is rotatably supported by a tension shaft 64 held through a slit 63 movably along the traveling direction of the delivery belt 55, as shown in FIG. 10.

Thus, the delivery belt 55 is caused to travel toward the sheet sticking section 8 by the driving of the output shaft of a motor 60 for sorting section delivery conveyor with the result that the wheels W on the delivery belt 55 are carried by the travel thereof.

The upper surface of the delivery belt 55 is positioned lower than the plane formed of the upper edges of the conveyor rolls 30 of the feed roll conveyor 25. When the conveyor rolls 30 are lowered by the driving of the elevating cylinder 49, the upper surface of the delivery belt 55 is positioned higher than above plane formed of the upper edges of the conveyor rolls 30, so that the transfer of the wheels W is carried out from the feed roll conveyor 25 to the delivery conveyor 26.

The role of the sorting unit 27 is to achieve the positioning by centering of the wheels W fed into the sorting section 7 by means of the feed roll conveyor 25 and the sorting of at least the height of the wheels W, and it is built as shown in FIGS. 11 to 16.

An elevation base plate 71 is connected to the lower end of the piston rod of a sorting-section elevation cylinder 70 attached to the upper frame 2 of the main frame 1. The elevation base plate 71 is moved up and down along LM guides 72 by the actuation of the elevation cylinder 70. Further, the following members are mounted on the elevation base plate 71, and are moved up and down integrally with the elevation base plate 71.

Fall preventing plates 74 are respectively connected to the lower ends of LM guide mount plates 73 on which the LM guides 72 are mounted.

A pair of mutually parallel and slidable slide plates 75 are disposed on the upper surface of the elevation base plate 71 at equal distances from the center of the elevation base plate 71. A rack plate 77 which extends in the T-letter form toward the center and has, sculpted thereon, a rack adapted to engage a pinion 76 rotatably supported in the center of the elevation base plate 71 is connected to each of the slide plates 75.

One of the slide plates 75 is connected to the tip of the piston rod of a centering cylinder 80, and a total of four centering bars 81 extending to below the elevation base plate 71 are vertically disposed at both ends of each of the slide plates 75 along the lengthwise direction thereof. Centering rolls 82 are held on each of the centering bars 81 so as to surround the latter.

Thus, the actuation of the centering cylinder 80 achieves the synchronous movement in the mutually approaching direction of the pair of slide plates 75 through the pinion 76 and the rack plates 77, so that the total of four centering rolls 82 contact rectangulatar four points on the peripheral surface of each of the wheels W. Thus, positioning by centering is accomplished.

A detection plate 84 adapted to move up and down by the driving of a detection-section elevating motor 83 to thereby detect the height of each of the wheels W is disposed below the elevation base plate 71. This detection plate 84 is provided with a size sensor 85 capable of discriminating the size of each of the wheels W and a type sensor 86 capable of discriminating the type of each of the wheels W.

Two size sensors 85 each comprised of, for example, a photosensor are diagonally arranged at different distance from the center. When the inner one of two sensors 85 senses the rim of the wheel W, the wheel W is judged as being 14 inches. On the other hand, when the outer one of the two sensors 85 senses the rim of the wheel W, the wheel W is judged as being 15 inches. Further, when both of the sensors 85 do not sense the rim of the wheel W, the wheel W is judged as being 16 inches.

The above utilizes the constancy of the position of the rim of the wheel W from the center for each size. However, naturally, any other means may be employed in the sorting of the size of the wheel W.

Two type sensors 86 each composed of, for example, a proximity sensor adapted to sense only nonmagnetic materials are diagonally disposed, and judgment of the wheel W as being made of aluminum is effected by the sensing of at least one of the type sensors 86. The above takes into account that there is coarse or fine mesh depending on the type of the wheel W and the requirement coping with various patterns.

Sensors adapted to sense only magnetic materials may be used as the type sensors 86 to thereby judge the wheel W as being made of aluminum when there is no sensing by the sensors.

The up and down movement of the detection plate 84 is conducted by a pair of ball screws 90 and nut parts threadedly engaging the ball screws 90, and the mechanism is constructed that the height of the wheel W is detected by measuring the number of revolutions of the nut parts by an encoder 91.

That is, each of the ball screws 90 is nonrotatable and vertically extends linearly, and is connected at its lower end to an end plate 92. It threadedly engage a nut part sculpted on the inner circumferential surface of a rotatable spindle 93. A follower pulley 94 is fixed to the spindle 93 so as to rotate integrally with the spindle 93.

A driving pulley 95 is fixed to the lower end of the output shaft of the detection-section elevating motor 83. A belt 96 is stretched between the driving pulley 95 and each of the follower pulleys 94. A guide pulley 97 for regulating the tension of the belt 96 is interposed therebetween.

An auxiliary pulley 98 is fixed to an upper part of one of the follower pulleys 94 so as to rotate integrally with the follower pulley 94. An auxiliary belt 101 is stretched between the auxiliary pulley 98 and an auxiliary pulley 100 fixed to a shaft 99 having the above encoder 91 mounted at an upper end thereof.

Thus, the rotation of the detection-section elevating motor 83 causes the follower pulley 94 and hence the spindle 93 to rotate. This rotation causes the ball screw 90 threadedly engaging the nut part sculpted on the inner circumferential Surface of the spindle 93 to move up and down. The rotation of the spindle 93 is transmitted through the auxiliary pulleys 98 and 100 and the auxiliary belt 101 to the encoder 91 to thereby bring about rotation of the encoder 91, which is measured.

The end plate 92 and the detection plate 84 with a compression spring 105 therebetween are mutually connected through a slide shaft 106 and a stopper 107. Thus, the detection plate 84 and the end plate 92 are integrally elevated by the elevation of the ball screw 90. A round shape rubber disk 108 is attached to the lower surface of the detection plate 84.

Figure 43:
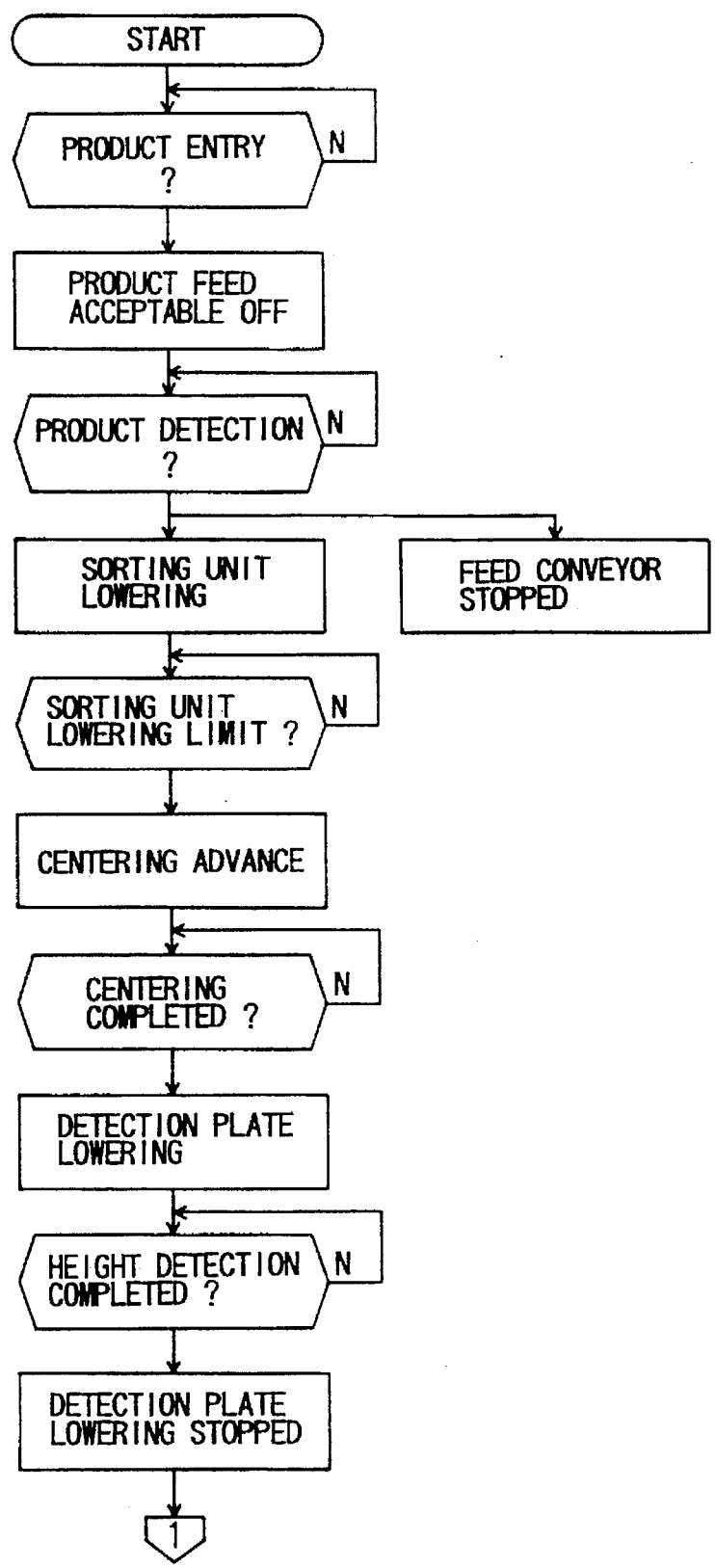
FIG. 43 is a flow chart of the operations carried out in the sorting section.
Figure 44:
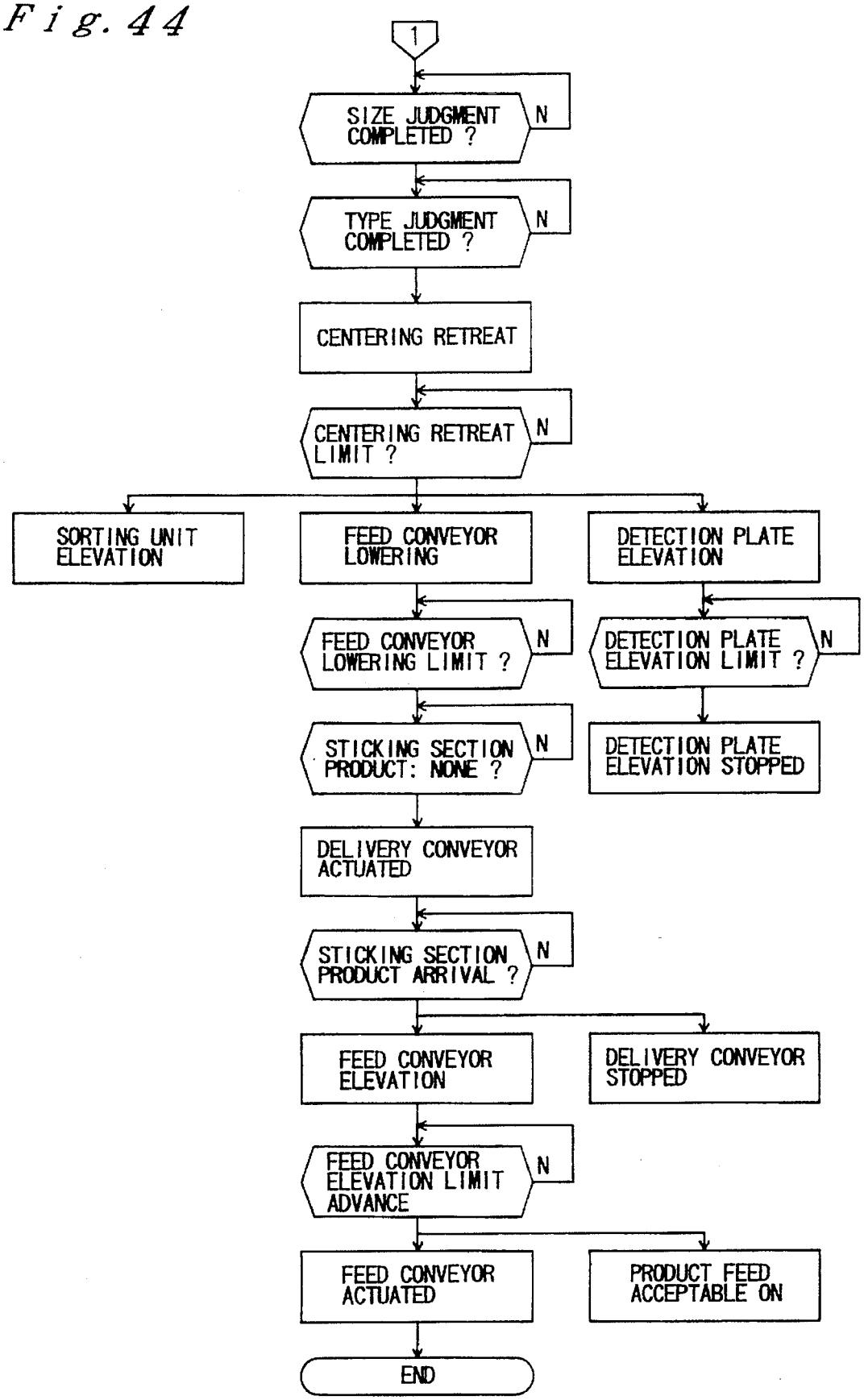
FIG. 44 is a flow chart continuing from FIG. 43.

The operations of the sorting section 7 will now be described with reference to the flow charts shown in FIGS. 43 and 44.

First, the feed roll conveyor 25 is actuated by the driving of the feed-roll-conveyor driving motor 33. Once a wheel (product) W is fed into the sorting section 7, the further feeding of another wheel W into the sorting section 7 is inhibited, so that the simultaneous feeding of two wheels W into the sorting Section 7 is prevented.

When the arrival of the wheel W at a predetermined position in the sorting section 7 is detected, the feed roll conveyor 25 is stopped, and the sorting-section elevation cylinder 70 is actuated to lower the sorting unit 27. When the sorting unit 27 reaches the bottom, the sorting-section elevation cylinder 70 is stopped.

In the above condition, the centering cylinder 80 is actuated to thereby simultaneously move the centering rolls 82 toward the center. The four centering rolls 82 are caused to contact the peripheral surface of the wheel W to thereby effect the positioning by centering of the wheel W.

Subsequently, the detection-section elevating motor 83 is driven to thereby rotate the spindle 93. Thus, the ball screw 90 threadedly engaging the nut part sculpted on the inner circumferential surface of the spindle 93 is caused to descend to lower the detection plate 84. At that time, the number of revolutions of the spindle 93 is measured with the encoder 91, so that the height of the wheel W is detected. The height detection is completed and terminated. Thereafter, size and product type discriminations are carried out with the use of the size sensor 85 and type sensor 86 mounted on the detection plate 84, respectively.

After the sorting of the height, size and type of the wheel W, the centering cylinder 80 is caused to have reverse motion to thereby reverse the centering rolls 82 to the predetermined outer refuge position.

Then, the sorting-section elevation cylinder 70 is caused to have reverse motion to thereby elevate the sorting unit 27 to a predetermined position. Simultaneously, the detection-section elevating motor 83 is reversely driven to thereby elevate the detection plate 84 to the ceiling. Still simultaneously, the feed-roll-conveyor elevating cylinder 49 is actuated to hereby lower the feed roll conveyor 25. Thus, the wheel W lying on the conveyor rolls 30 is caused to position on the delivery belt 55 of the delivery conveyor 26.

When the feed roll conveyor 25 has reached the bottom and when the absence of the wheel (product) W at the predetermined position of the sheet sticking section 8 is detected, the motor 60 for sorting section delivery conveyor is driven to thereby travel the delivery belt 55 toward the sheet sticking section 8. When the arrival of the wheel W in the below described predetermined position of the sheet sticking section 8 is detected, the travel is terminated.

Simultaneously with the stopping of the travel, the feed-roll-conveyor elevating cylinder 49 is caused to have motion reverse to that mentioned above to hereby elevate the feed roll conveyor 25. When the feed roll conveyor 25 has reached the ceiling, the feed-roll-conveyor driving motor 33 is driven to thereby actuate the feed roll conveyor 25, and simultaneously the steps for permitting the feeding of the product into the sorting section 7 are taken. This sequence of operations is continually repeated.

The data obtained in the sorting section 7 regarding the height, size and type of the wheel W are used to perform various controls in the sheet sticking section 8 and the press section 9. Even if wheels W different in the height, size and type are randomly fed from the previous step, the desired application of the protective films S can be successfully carried out.

Now, the sheet sticking section 8 will be illustrated.

The functions of the sheet sticking section 8 are to stick the protective films S to the wheels W carried in the positioned condition from the sorting section 7 while peeling the protective films S one by one from the separator T (primary sticking) and to carry the resultant wheels W to the subsequent step in the press section 9. The sheet sticking section 8 is mainly comprised of a carriage conveyor 110 and a labeler unit 111.

The carriage conveyor 110 is arranged so as to be continuous with the sorting section delivery conveyor 26, and the conveyors 26 and 110 are traveled so as to accomplish the transfer of the wheels W from the sorting section 7 to the sheet sticking section 8.

Figure 17:
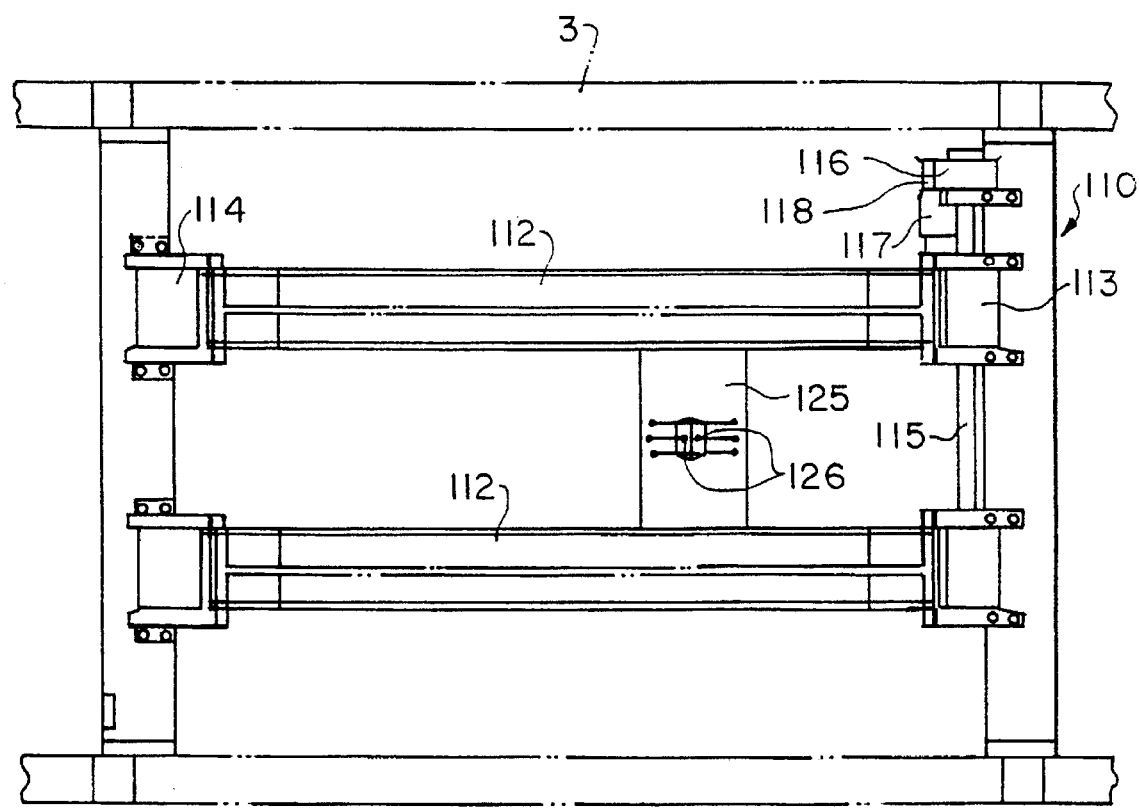
FIG. 17 is a plan of a carriage conveyor disposed in a sheet sticking section.
Figure 18:
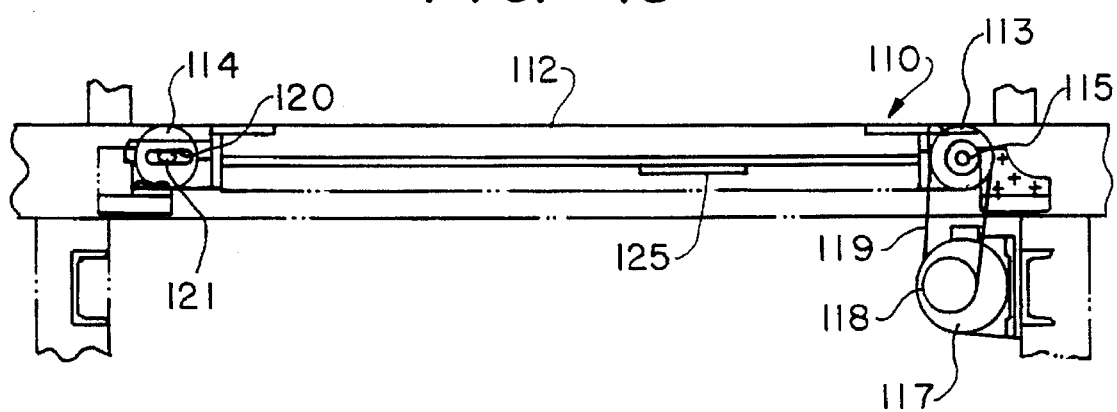
FIG. 18 is a front view of the carriage conveyor of FIG. 17.

The carriage conveyor 110 is provided with a pair of carriage belts 112, and each thereof is stretched between a drive-side toothed pulley 113 and a follower-side toothed pulley 114, as shown in FIGS. 17 and 18.

The driving-side toothed pulleys 113 are nonrotatably fixed to the same driving shaft 115 rotatably supported. A follower pulley 116 is fixed to an end of the driving shaft 115. A belt 119 is stretched between the follower pulley 116 and a driving pulley 118 fixed to the output shaft of a sheet-sticking-section carriage motor 117.

On the other hand, each of the follower-side toothed pulleys 114 is rotatably supported by a tension shaft 121 held through a slit 120 movably along the raveling direction of the delivery belt 112.

Thus, the delivery belt 112 is caused to travel from the sorting section 7 toward the sheet sticking section 8 by the driving of the sheet-sticking-section carriage motor 117 with the result that the wheels W on the delivery belt 112 are carried by the travel thereof.

A sensor bracket 125 is disposed below the delivery belt 112, and a total of three position sensors 126 respectively fit for the varieties of the wheels W are disposed, so as to be movable along the traveling direction of the delivery belt 112, in the sensor bracket 125 at positions spaced at predetermined intervals along the above traveling direction.

The position sensors 126 are adapted to detect the arrival of the wheel W in the predetermined position of the sheet sticking section 8. The selection of a particular sensor therefrom is made on the basis of the above-mentioned data regarding the size of the wheel W.

In this embodiment, a sensor 126 on the side of sorting section 7, a central sensor 126 and a sensor 126 on the side of the press section 9 are employed for 14 inches, 15 inches and 16 inches as the size of the wheel W, respectively. Thus, even if the size of the wheel W is varied, the center of the wheel W is always brought to the predetermined position.

Figure 19:
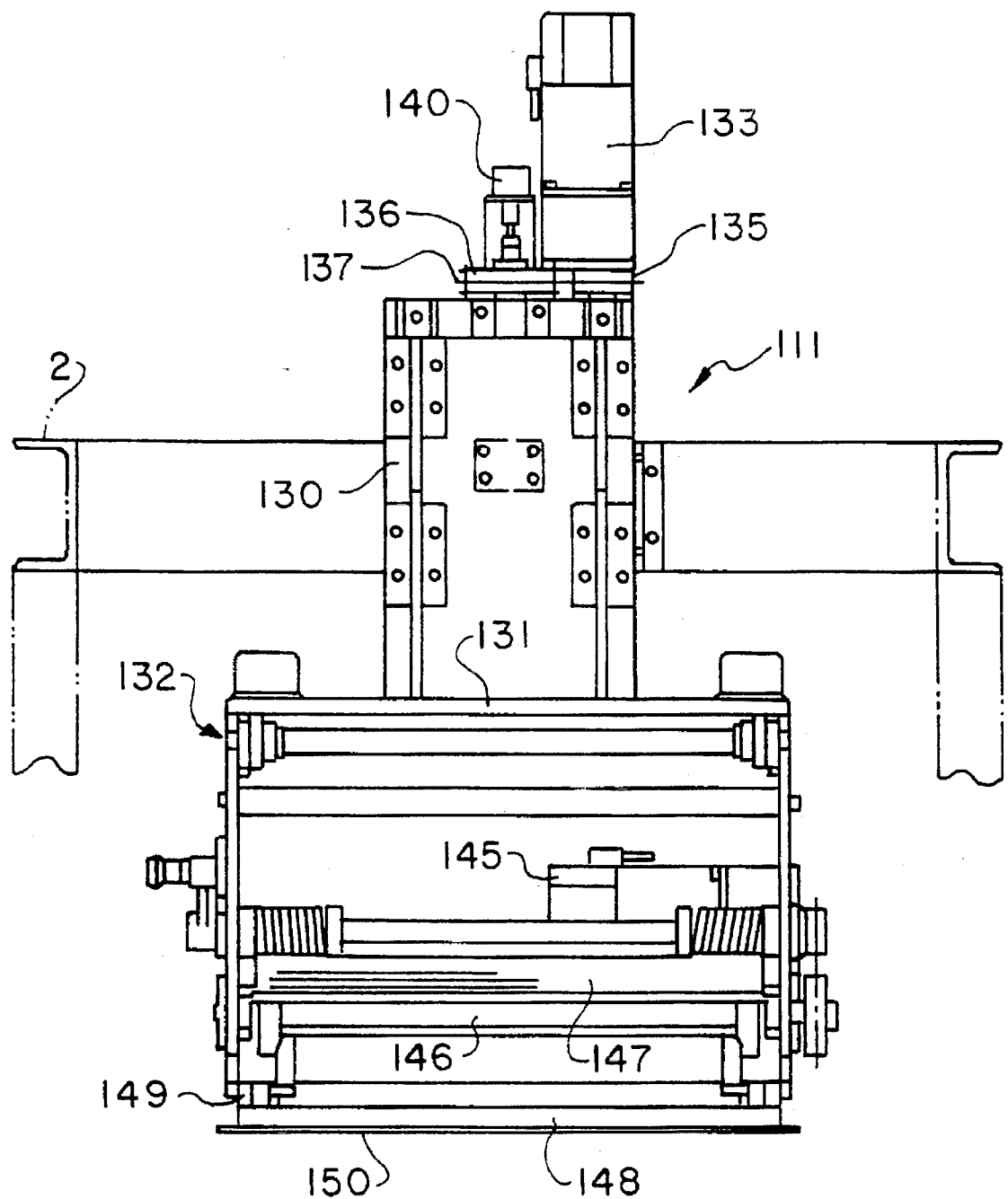
FIG. 19 is a side view of a labeler head part of a labeler unit as a member of the sheet sticking section and further the elevation mechanism thereof.
Figure 20:
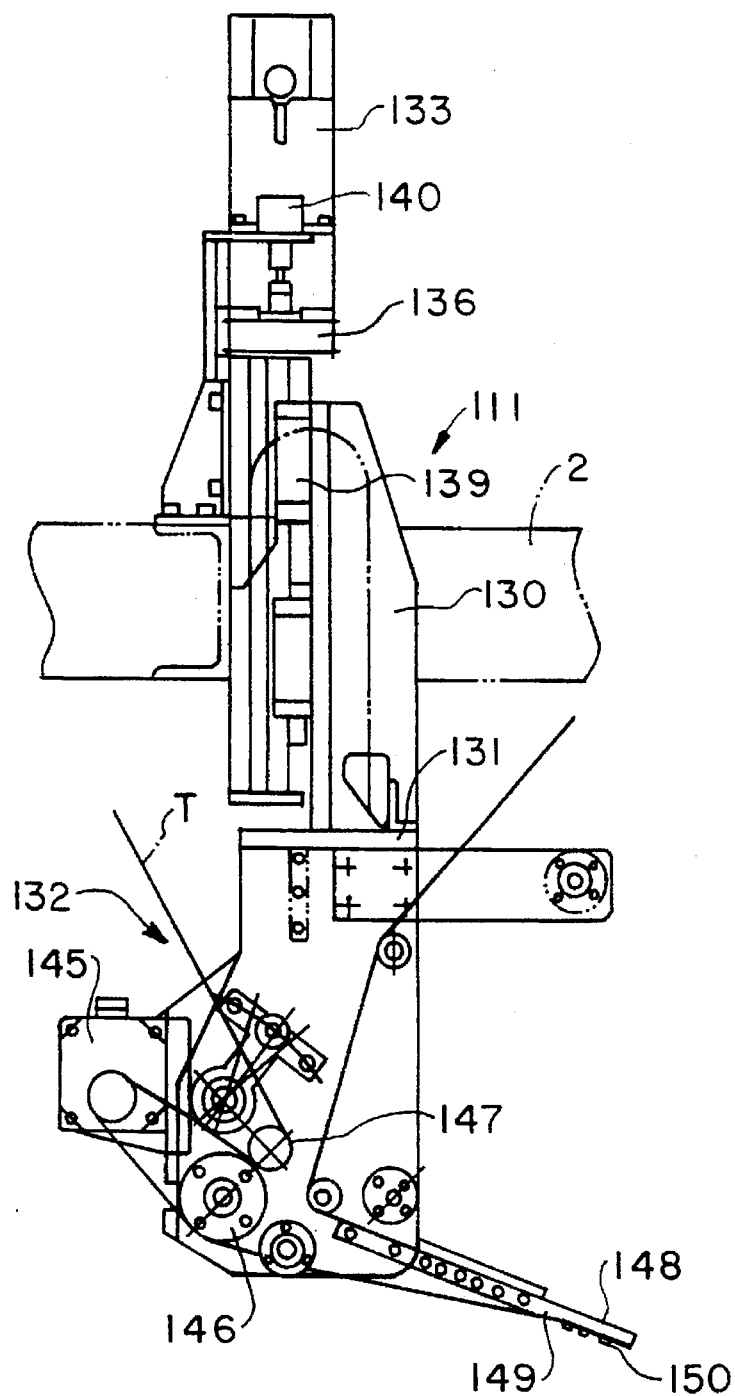
FIG. 20 is a front view of the labeler head part of FIG. 19.
Figure 21:
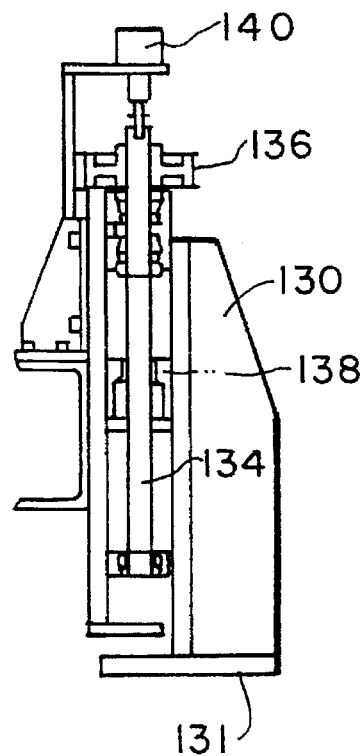
FIG. 21 is a front view of the elevation mechanism of an elevation plate as a member of the sheet sticking section.
Figure 22:
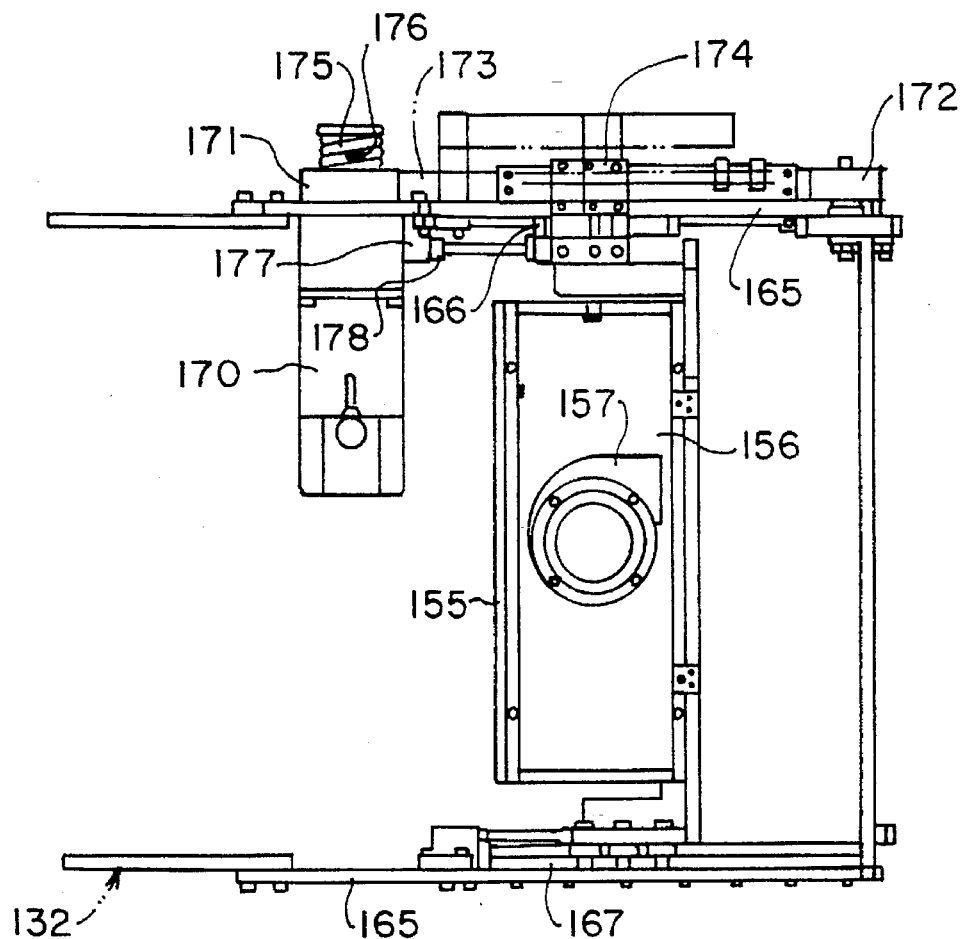
FIG. 22 is a plan of a vacuum grid as a member of the sheet sticking section, showing the moving mechanism thereof.
Figure 23:
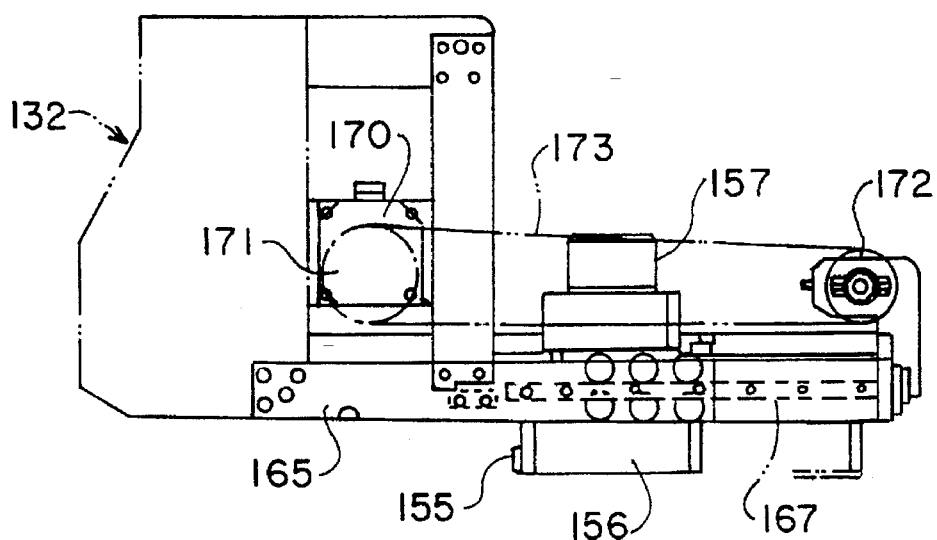
FIG. 23 is a front view of the vacuum grid of FIG. 22.
Figure 24:
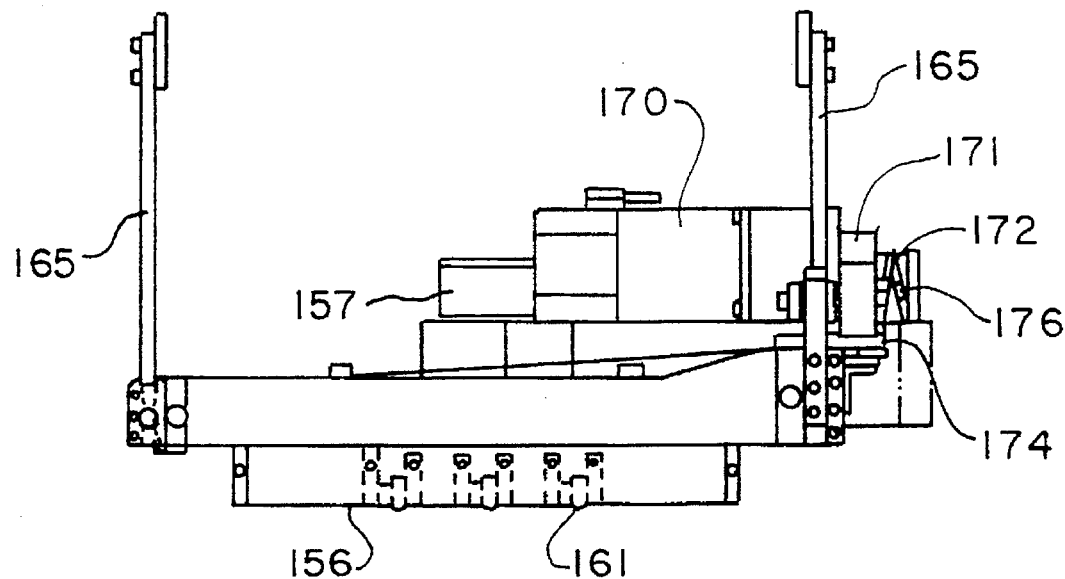
FIG. 24 is a right side view corresponding to FIG. 23.
Figure 25:
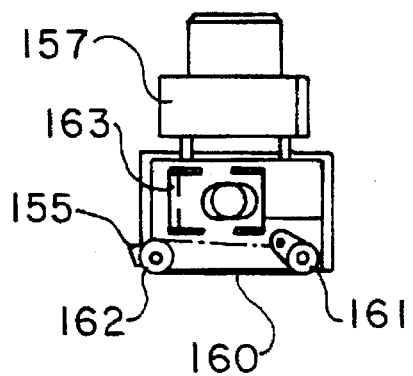
FIG. 25 is a front view of the vacuum grid.
Figure 26:
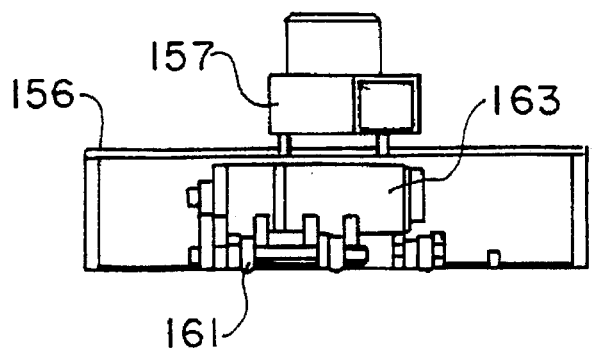
FIG. 26 is a partially cut-away side view of the vacuum grid of FIG. 25.

The labeler unit 111 is provided with an elevation plate 130 movable up and down, a base plate 131 is connected to a lower end of the elevation plate 130, and a labeler head 132 is held on the base plate 131, as shown in FIGS. 19 to 21.

A labeler elevation motor 133 fixed to the upper frame 2 of the main frame 1 and a ball screw 134 vertically extending linearly, rotatable and nonelevatably supported are provided for elevating the elevation plate 130. Further, a belt 137 is stretched between a driving pulley 135 fixed to the output shaft of the elevation motor 133 and a follower pulley 136 fixed to the ball screw 134. Still further, a nut mount plate 138 having a nut part threadedly engaging the ball screw 134 is fixed to the elevation plate 130.

Thus, the mechanism is constructed that the driving of the labeler elevation motor 133 rotates the ball screw 134 and this rotation causes the nut mount plate 138 having a nut part threadedly engaging the ball screw 134 and hence the elevation plate 130 to move up and down along the LM guide 139.

An upper end of the ball screw 134 is provided with an encoder 140 for measuring the number of revolutions thereof The ball screw 134 is rotated until the number of revolutions thereof comes to correspond to the height of wheel W detected by the encoder 91 in the sorting section 7. Thus, the labeler head 132 stops at a predetermined position just above the wheel W, namely at a position at which there is always a fixed positional relationship between the upper surface of the wheel W and the lower surface of the labeler head 132.

A separator carriage path for peeling the protective films S from the separator T sequentially carried by the rotation of the hoisting roll 15 and delivering the resultant separator having the protective films S detached toward the dancer roll 22, is formed inside the labeler head 132 A drive roll 146 adapted to rotate by the driving of a separator T feeding motor 145 and a pinch roll 147 adapted to cooperate with the drive roll 146 to sandwich the separator T therebetween, are disposed halfway on the separator carriage path.

The feeding rate and length of the separator T are controlled by the driving of the separator feeding motor 145.

A peel plate 148 adapted to peel the forward edge of the protective films S from the separator T by sharply folding back the protective-film-holding separator T to thereby cause the rigidity of the protective films S to work for the peeling, is held in a bracket 149 and arranged upstream of the drive roll 146 on the separator carriage path.

That is, the peel plate 148 is flat, arranged along the wheel W carriage direction and slightly downward, and has an acute-angled free edge. The separator T is traveled on the upper surface, the free edge and the lower surface of the peel plate 148, and reaches the drive roll 146.

Thus, the separator T is folded back by about 180° along the peel plate 148. At that time, the protective films S tend to continue the linear travel on the upper surface of the peel plate 148, and the rigidity of the protective films S beats the adherence between the protective films S and the separator T. As a result, the edge of the protective films S is peeled from the separator T.

An air assist 150 is disposed below the free edge of the peel plate 148 and parallel to the peel plate 148.

The air assist 150 has a closed tubular form, and is provided with a plurality of nozzle holes (not shown) oriented upward along the wheel W carriage direction and arranged at predetermined pitches along the lengthwise direction. Further, both the ends thereof are connected to air hoses (not shown).

Air is introduced through the air hoses, and jetted upward through the nozzle holes, so that the protective films S peeled by the use of the peel plate 148 are guided forward (assisted) while preventing the downward drop thereof.

A vacuum grid 156 adapted to adsorb and hold the edge of the protective film S peeled by the use of the peel plate 148 and provided in its rear edge with an air blow 155, is disposed in front of the peel plate 148 along the wheel W carriage direction in a fashion such that the vacuum grid 156 can freely travel along the wheel W carriage direction, as shown in FIGS. 22 to 26.

The vacuum grid 156 has a closed rectangular boxy form, and has a bottom plate with a plurality of slits (not shown) extending in mutually parallel relationship along the wheel W carriage direction. Further, it has an upper plate provided with a sirocco fan 157 by which constant suction is conducted.

Still further, a plurality of film carrying belts 160 stretched between a pair of pulleys 161 and 162 are disposed in the vacuum grid 156, and a film carrying motor 163 for traveling the film carrying belts 160 is accommodated therein.

The driving of the film carrying motor 163 causes the film carrying belts 160 to travel on its lower surface side unidirectionally along the wheel W carriage direction, so that the protective films S are guided forward while preventing the downward slack thereof.

On the other hand, the air blow 155 is in the form of a closed rectangular box isolated from the vacuum grid 156. It has a bottom plate provided with a plurality of nozzle holes (not shown) at predetermined pitches along the lengthwise direction, and is connected to an air hose (not shown).

Air is introduced inside through the air hose to thereby conduct air blow in which air is jetted downward through the nozzle holes.

The vacuum grid 156 is disposed in a fashion such that it is fitted between a pair of beams 165 connected to a lower part of the labeler head 132, and moves forward and backward along the wheel W carriage direction while keeping horizontality along an LM guide 166 and a guide 167 disposed on both sides thereof. Accordingly, a grid moving motor 170 is fixed to one of the beams 165.

That is, a driving pulley 171 is attached to the driving shaft of the grid moving motor 170, and a follower pulley 172 is rotatably supported by the tip of one of the beams 165. A belt 173 is stretched between the pulleys 171 and 172. The vacuum grid 156 is connected through a belt bracket 174 to the belt 173.

Thus, the driving of the grid moving motor 170 causes the belt 173 to travel forward and backward, and, together with the belt 173, the vacuum grid 156 travels.

The driving pulley 171 is mounted on the driving shaft of the moving motor 170 through a clutch plate 175 and a compression spring 176 to allow the same to race in the event of a large torque.

A stopper 177 is fixed to the beams 165, and the apparatus is so constructed that the vacuum grid 156 is stopped by contacting of the top of a bolt 178 fixed to the vacuum grid 156 with the stopper 177.

Figure 45:
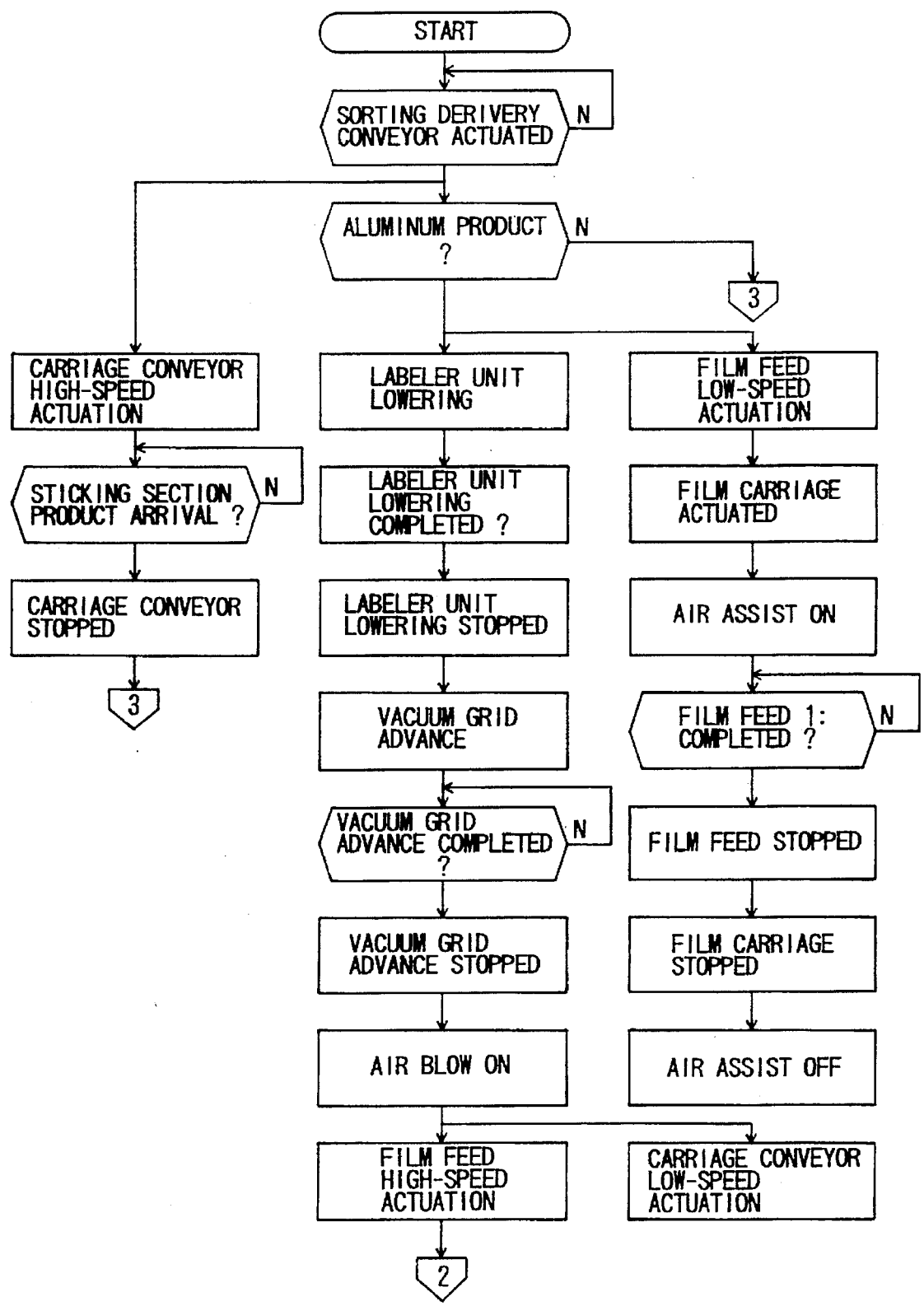
FIG. 45 is a flow chart of the operations carried out in the sheet sticking section.
Figure 46:
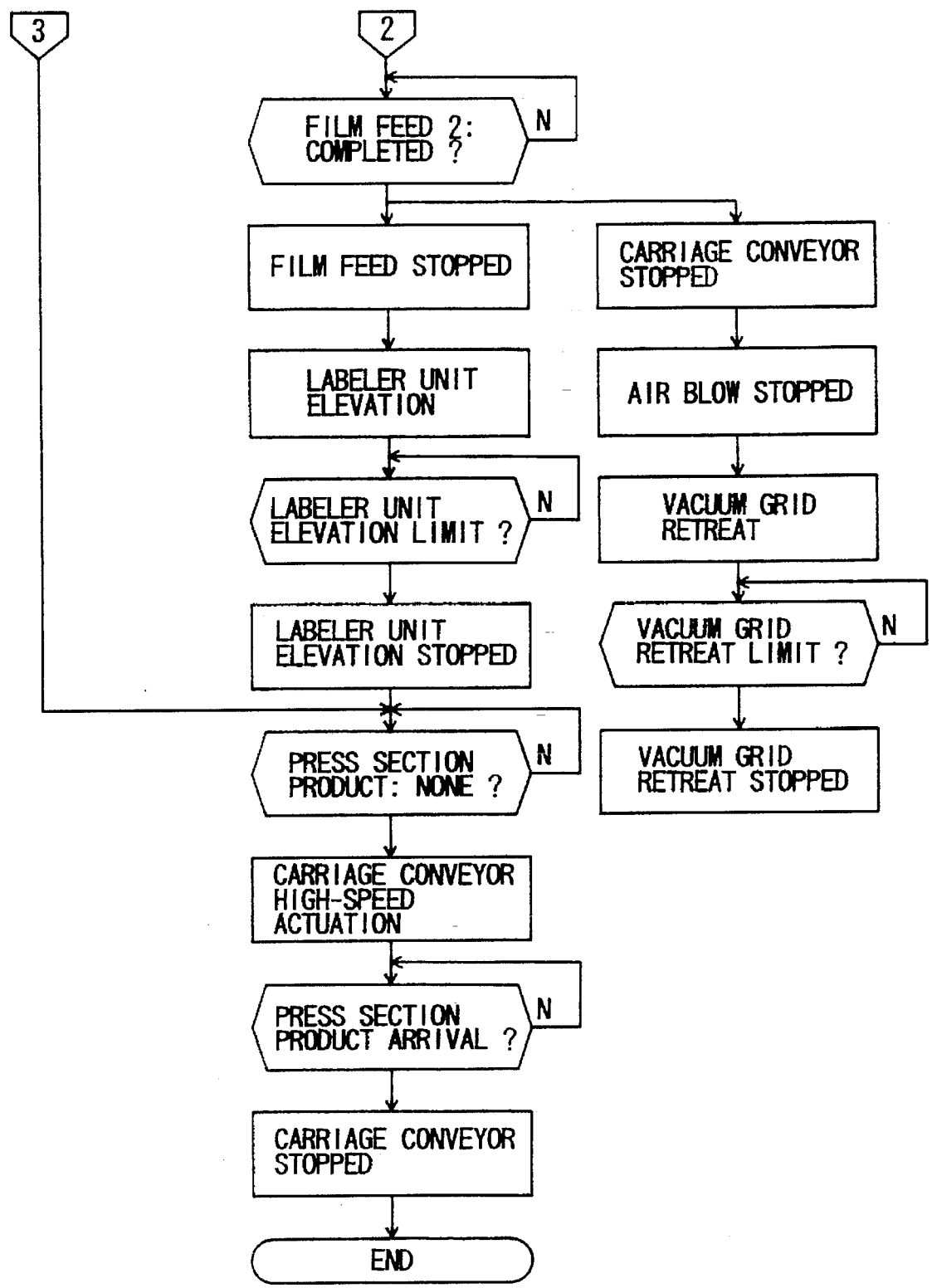
FIG. 46 is a flow chart continuing from FIG. 45.

The operations in the sheet sticking section 8 will now be described with reference to FIGS. 27A–28C and the flow charts shown in FIGS. 45–46.

First, under the condition that the delivery conveyor 26 of the sorting section 7 is in operation, the carriage conveyor 110 is actuated at a high speed by driving the sheet-sticking-section carriage motor 117 to thereby transfer the wheel W having been carried by the delivery conveyor 26 of the sorting section 7 to carriage conveyor 110. When the position sensor 126 detects the arrival of the wheel W in the predetermined position, the wheel W is stopped.

In the event that the sorting result at the sorting section 7 is that the wheel W is not made of aluminum so that the protection by sticking the protective films S is not necessary, the absence of the wheel W in the predetermined position of the press section 9 is confirmed after the stopping of the carriage conveyor 110 and again the carriage conveyor 110 is actuated at a high speed to thereby carry the wheel W to the press section 9.

On the other hand, when the wheel W is made of aluminum requiring the sticking of the protective film S, the labeler elevation motor 133 of the labeler unit 111 is actuated synchronously with the high-speed actuation of the carriage conveyor 110 to thereby lower the labeler unit 111 to the predetermined position and stop the same. Simultaneously, the separator feeding motor 145 is actuated at a low speed, and thereafter the film carrying motor 163 is driven to thereby cause the film carrying belt 160 to travel. Still simultaneously, the air assist 150 is brought into operation, so that air is jetted through the nozzle holes thereof.

Figure 27A:
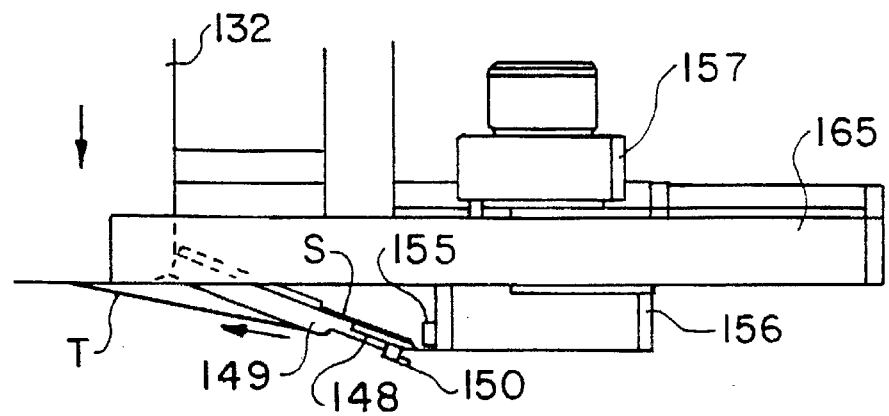
FIG. 27A, FIG. 27B and FIG. 27C are views illustrating the action taken when an edge of a protective film is peeled and the peeled edge is adsorbed and held.
Figure 27B:
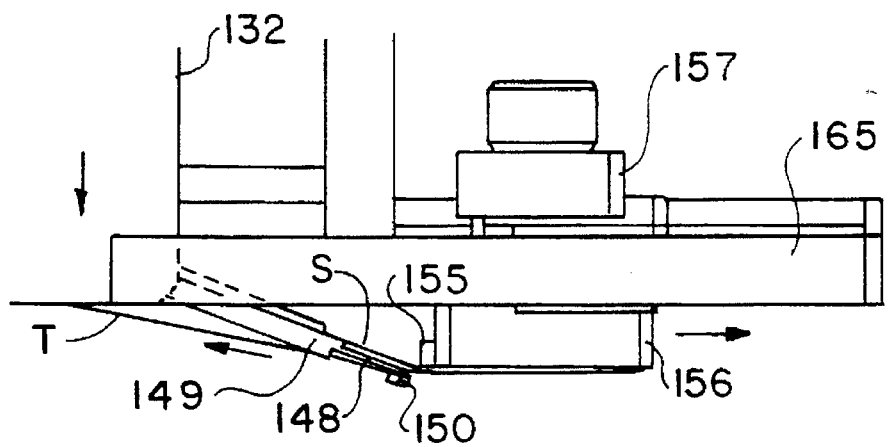

The above operation is further illustrated with reference to FIG. 27A–27C. As shown in FIGS. 27A and 27B, the separator T drawn out by the low-speed actuation of the separator feeding motor 145 is sharply folded back by the peel plate 148 to thereby peel the edge of the protective film S from the separator T. While the peeled edge is kept blown upward by the air assist 150 in operation, the same is guided forward by the travel of the film carrying belt 160.

Since the sirocco fan 157 is kept in suction condition as mentioned above, the protective film S fed by the low-speed actuation of the separator feeding motor 145 is adsorbed and held by the vacuum grid 156.

Subsequently, the drivings of the separator feeding motor 145 and the film carrying motor 163 are stopped, the air assist 150 is brought out of operation, and thereafter the grid moving motor 170 of the vacuum grid 156 is driven to thereby advance the vacuum grid 156 toward the press section 9.

Figure 27C:
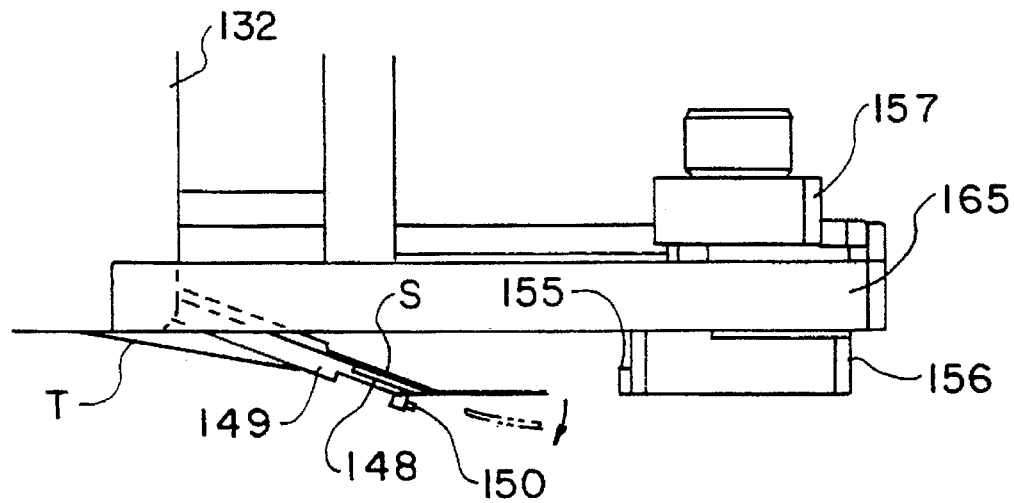

The advance distance of the vacuum grid 156 is rendered greater than the feed of the protective film S to thereby cause the protective film S to fall from its forward edge on the wheel W by the weight of itself, as shown in FIG. 27C.

Then, the air blow comprising jetting air downward from the nozzle holes of the air blow 155 is performed.

Figure 28A:
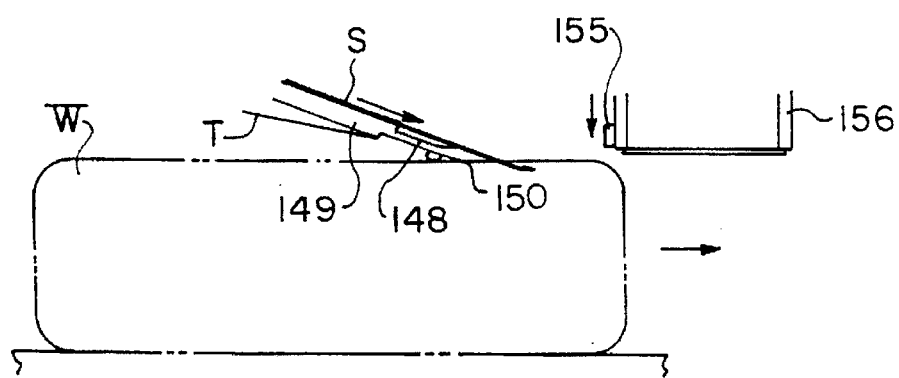
FIG. 28A, FIG. 28B and FIG. 28C are views illustrating the action taken at the time of the sticking (primary sticking) of a protective film to a wheel surface.
Figure 28B:
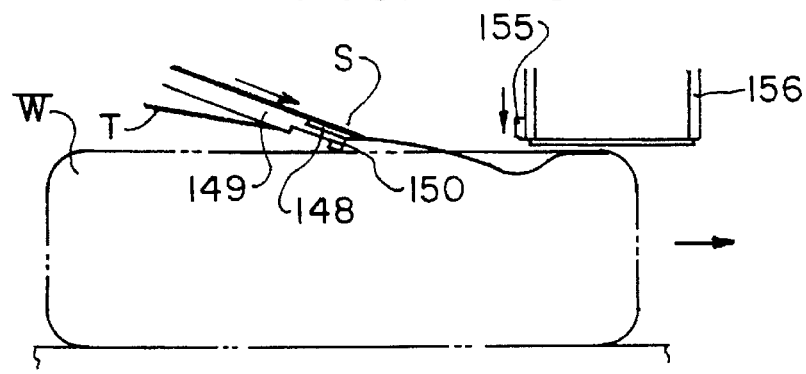
Figure 28C:
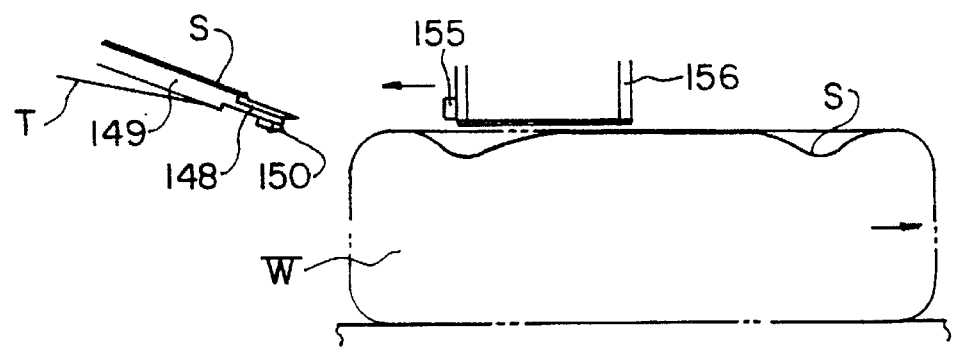

In this situation, not only is the carriage conveyor 110 actuated at a low speed by the carriage motor 117 but also the separator feeding motor 145 is actuated at a high speed to thereby synchronously move the wheel W and the protective film S in the same direction, as shown in FIG. 28. Simultaneously, the protective film S is stuck to the surface of the wheel W by the air blow by means of the air blow 155.

After the completion of the above film feeding, the film feeding by the driving of the separator feeding motor 145 is stopped, and thereafter the labeler head 132 is elevated to the ceiling and stopped. Simultaneously, the driving of the carriage conveyor 110 and the air blow by the air blow 155 are stopped, and the vacuum grid 156 is reversed to the reverse limit and stopped.

When the absence of the wheel W in the predetermined position of the press section 9 is detected (or not detected), the carriage conveyor 110 is actuated at a high speed. When the arrival of the wheel W in the predetermined position of the press section 9 is detected, it is stopped. This operation is continually repeated.

The function of the press section 9 is to press the protective film S stuck (temporarily stuck) in the sheet sticking section 8, substantially all over the film, against the wheel W in order to prevent the removal or location of the protective film S from the wheel W, and the press section 9 is mainly comprised of a feed roll conveyor 185, a press-section delivery conveyor 186 and a press unit 187.

Figure 29:
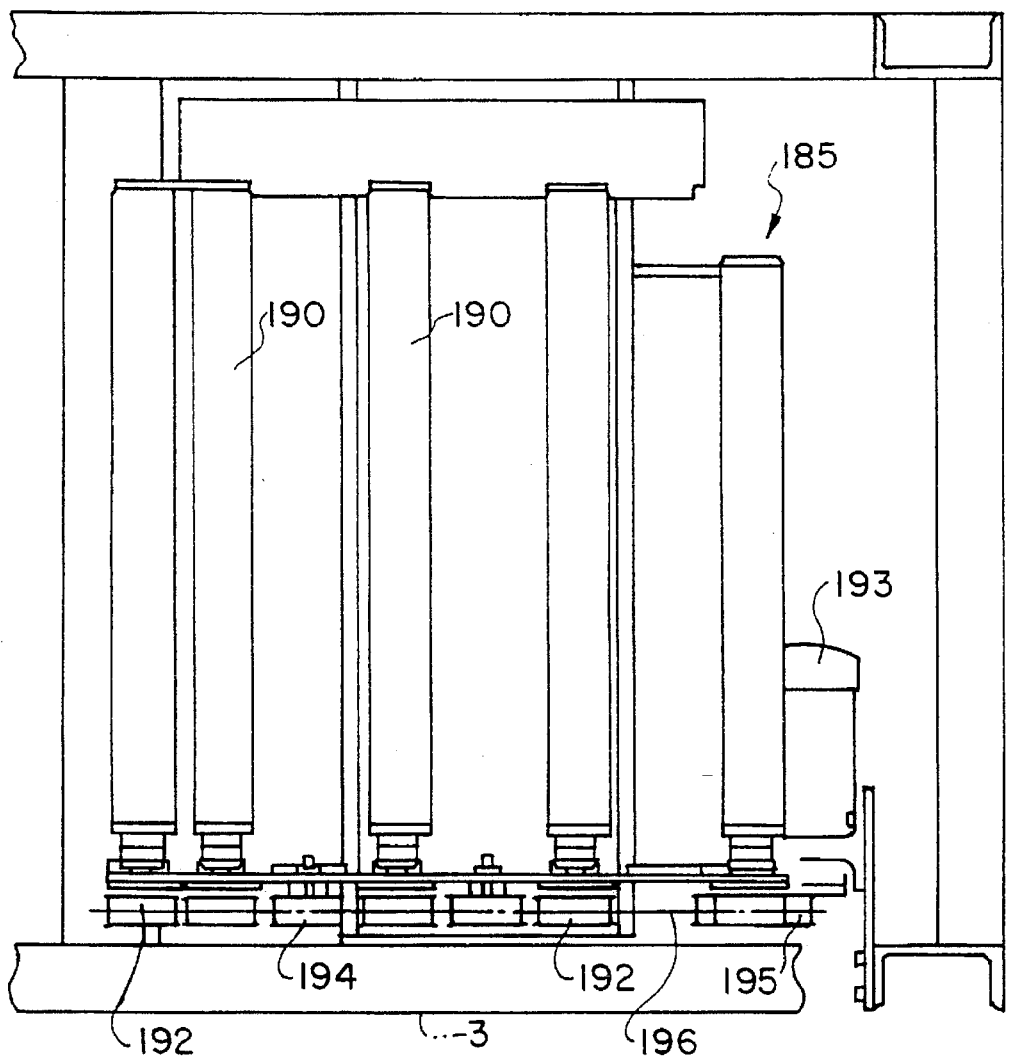
FIG. 29 is a plan of a feed roll conveyor disposed in a press section.
Figure 30:
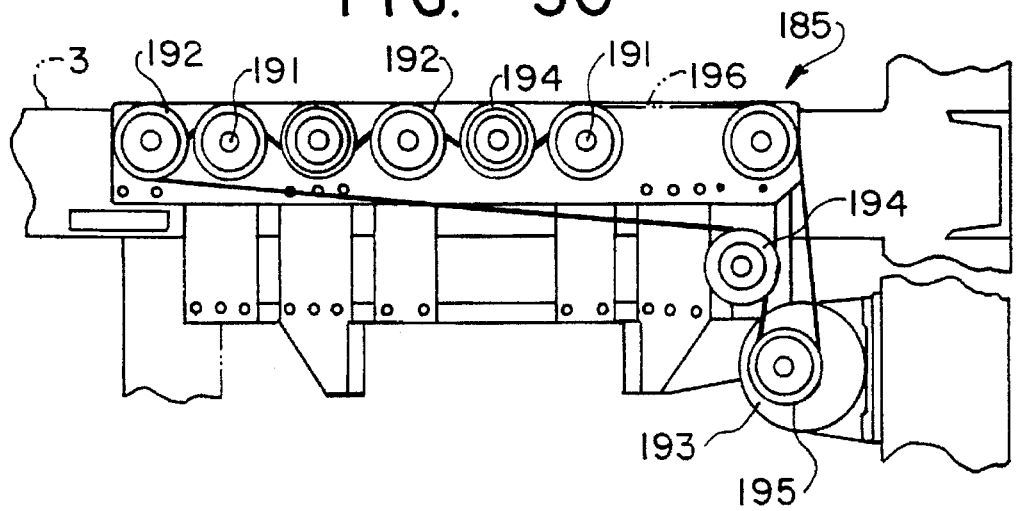
FIG. 30 is a front view of the feed roll conveyor of FIG. 29.

The feed roll conveyor 185 of the press section is adapted to forward the wheel W sequentially carried from the sheet sticking section 8 as the preceding step to the center of the press section 9 below the press unit 187. The structure thereof is as shown in FIGS. 29 and 30.

The feed roll conveyor 185 of the press section is substantially identical with the feed roll conveyor 25 of the sorting section, and has a structure corresponding to a 90° rotation of the structure of the feed roll conveyor 25.

That is, the feed roll conveyor 185 includes a plurality (five in the Figure) of conveyor rolls 190 extending along the carriage direction and disposed in mutually parallel relationship and on the same plane. The conveyor rolls 190 are so constructed as to rotate in accordance with the rotation of respective roll shafts 191. A follower pulley 192 is fixed to an edge of each of the roll shafts 191.

On the other hand, a press-section roll conveyor motor 193 is disposed for rotating the roll shafts 191. Guide pulleys 194 are disposed at predetermined positions between the follower pulleys 192 and between the follower pulley 192 and the roll conveyor motor 193. A driving pulley 195 fixed to the output shaft of the roll conveyor motor 193, the follower pulleys 192 and the guide pulleys 194 are mutually connected by means of a belt 196.

Thus, the mechanism is constructed that the driving of the roll conveyor motor 193 induces the synchronous rotation of the conveyor rolls 190 in the same direction, which rotation carries the wheels W put on the conveyor rolls 190 into the press section 9.

When a large torque is applied to the conveyor rolls 190, as to the conveyor rolls 30 of the feed roll conveyor 25 of the sorting section, a slip occurs at the clutch, so that the rotation of the roll shaft 191 is not transmitted.

Figure 31:
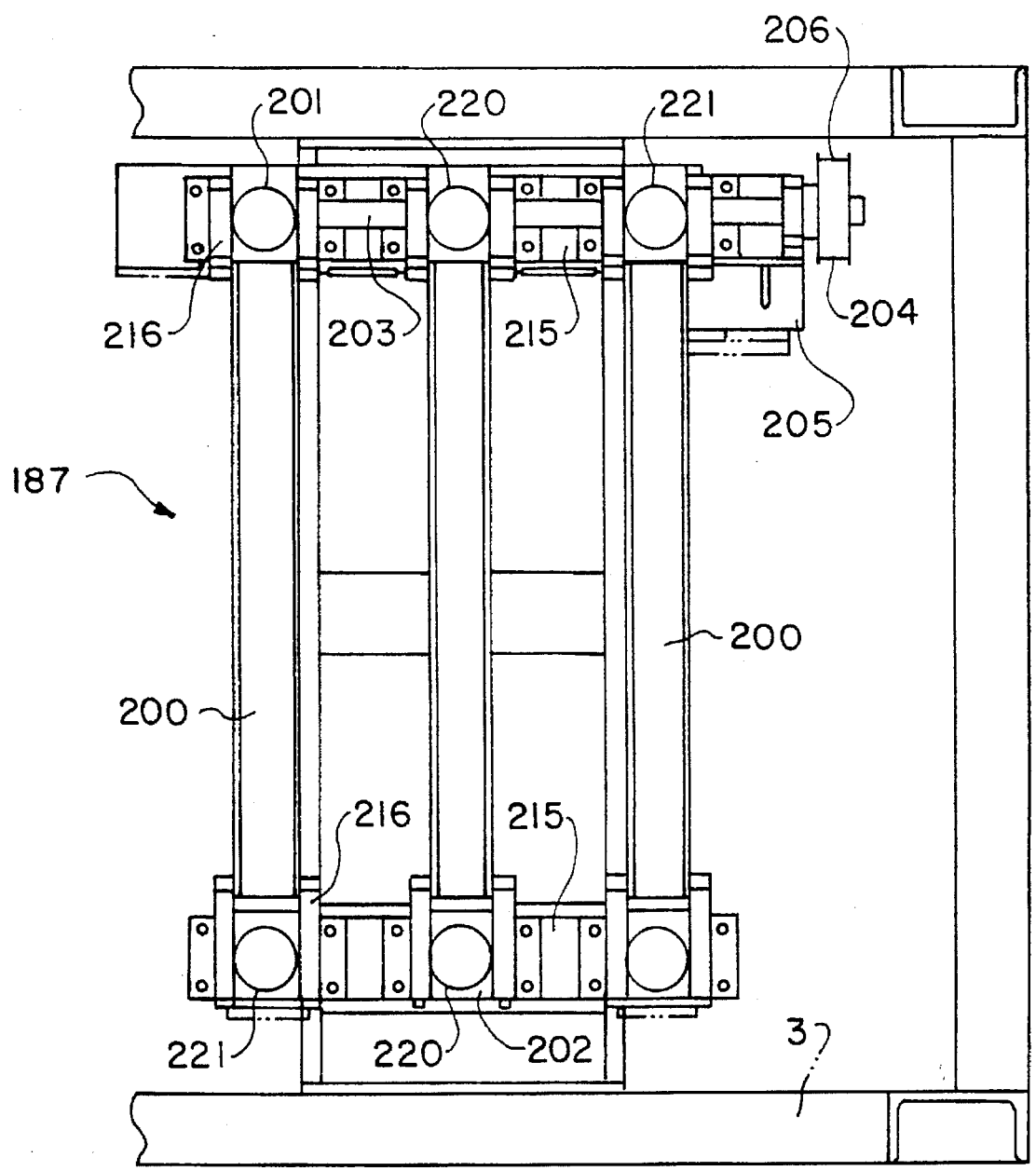
FIG. 31 is a plan of a carriage conveyor disposed in the press section.
Figure 32:
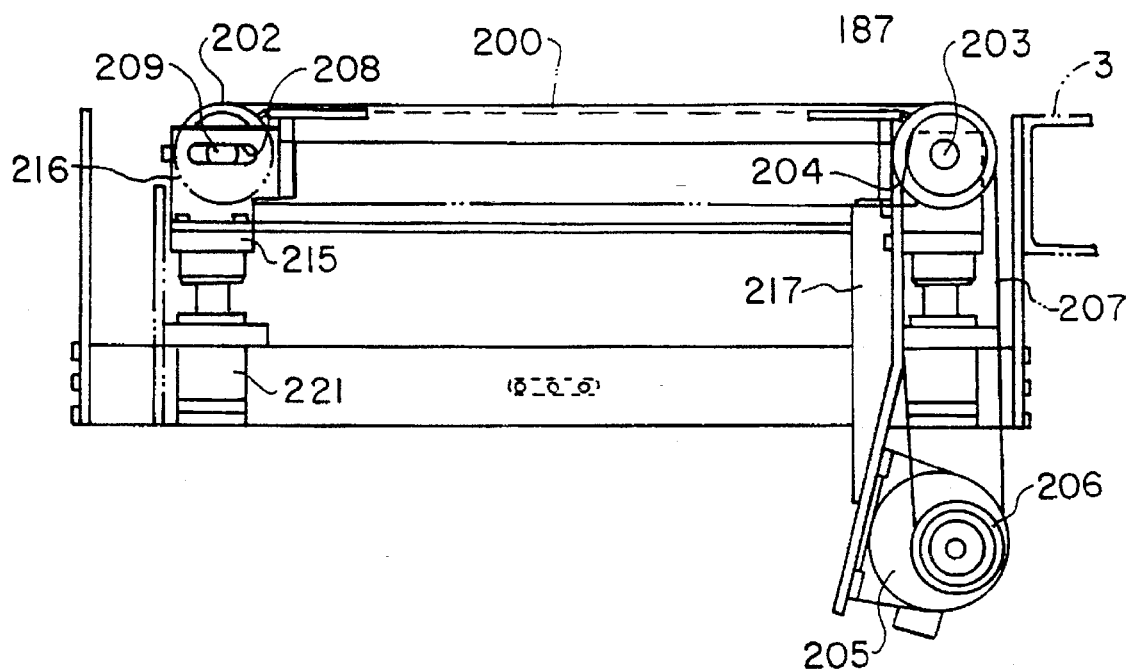
FIG. 32 is a right side view of the carriage conveyor of FIG. 31.
Figure 33:
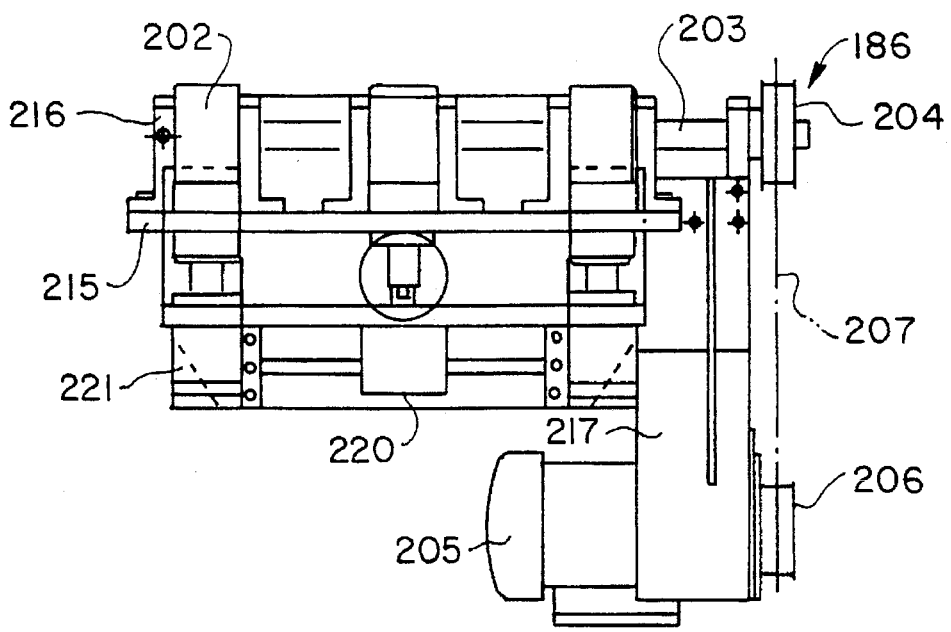
FIG. 33 is a front view of the above conveyor.
Figure 34:
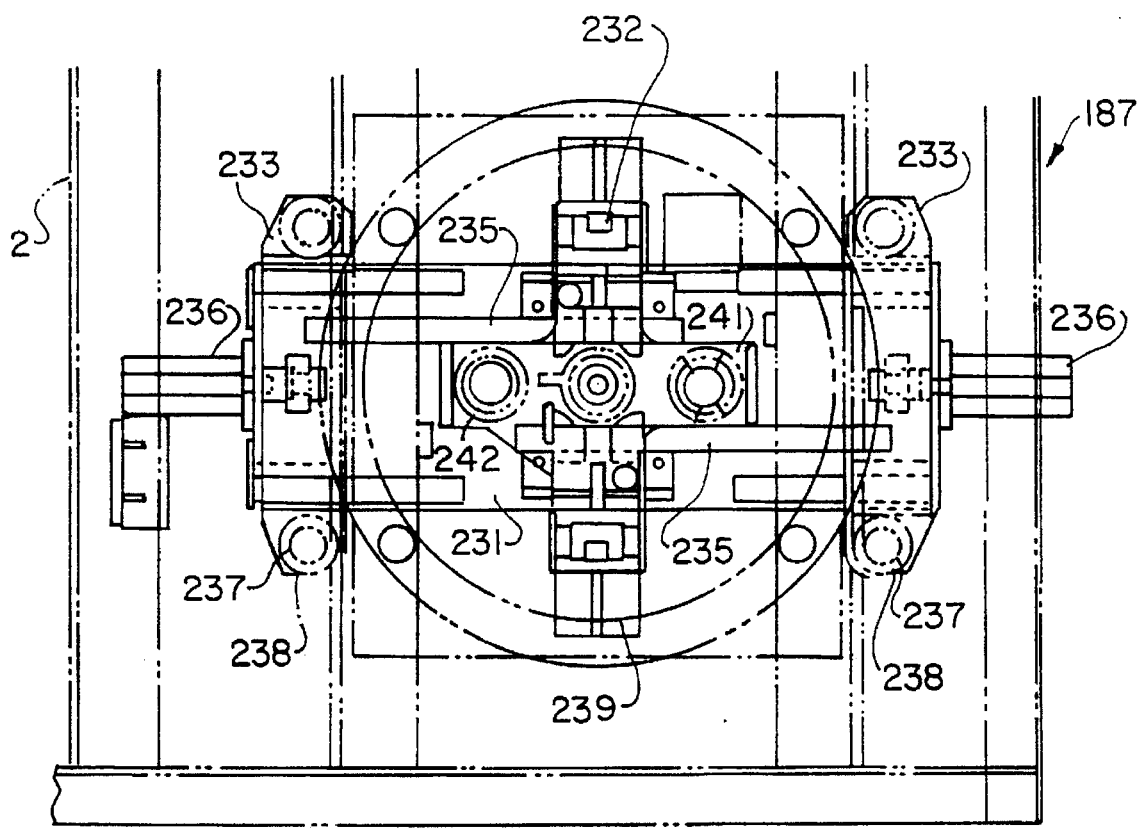
FIG. 34 is a plan of a centering part of a press unit as a member of the press section.
Figure 35:
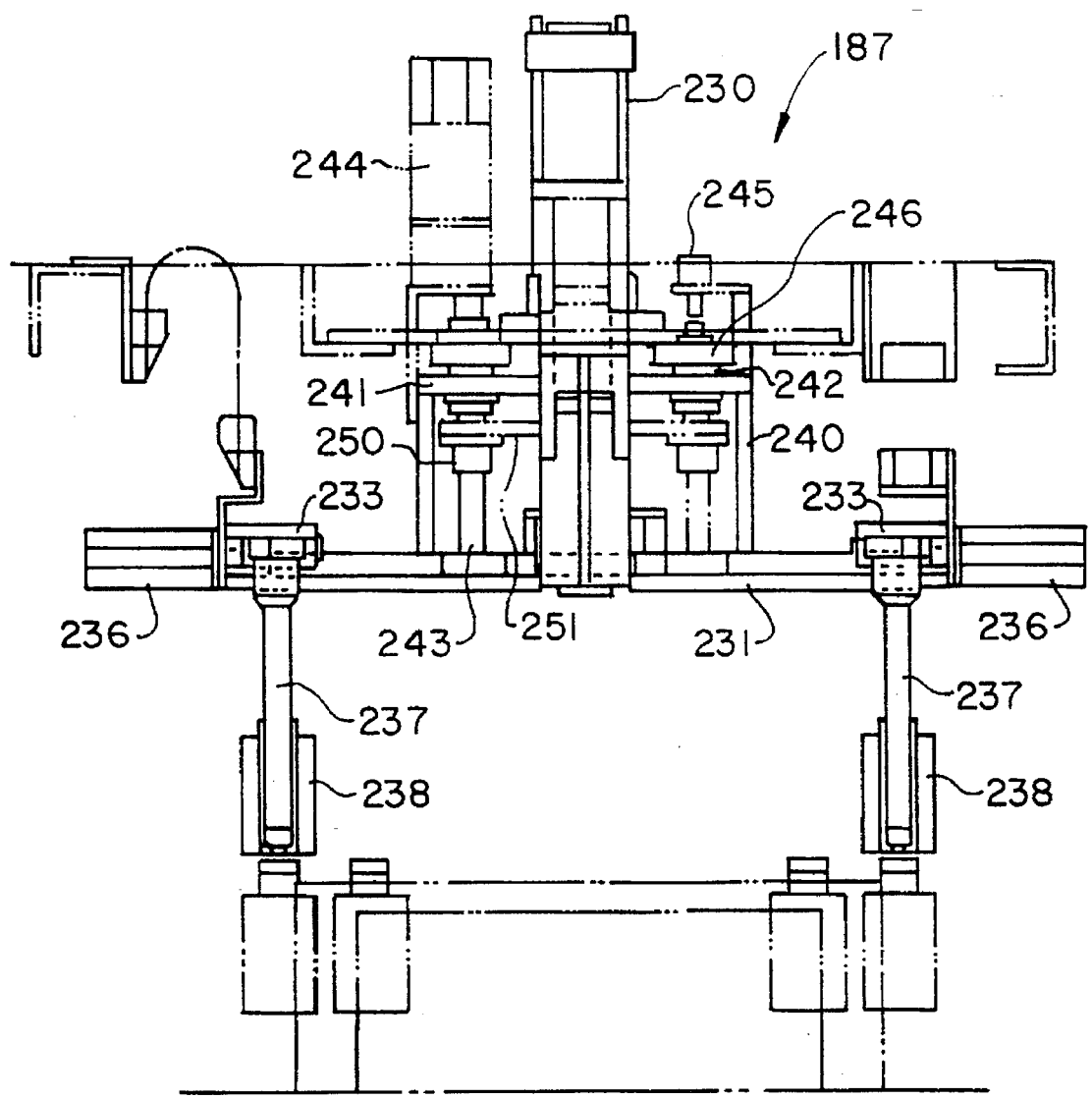
FIG. 35 is a front view of the centering part of FIG. 34.
Figure 36:
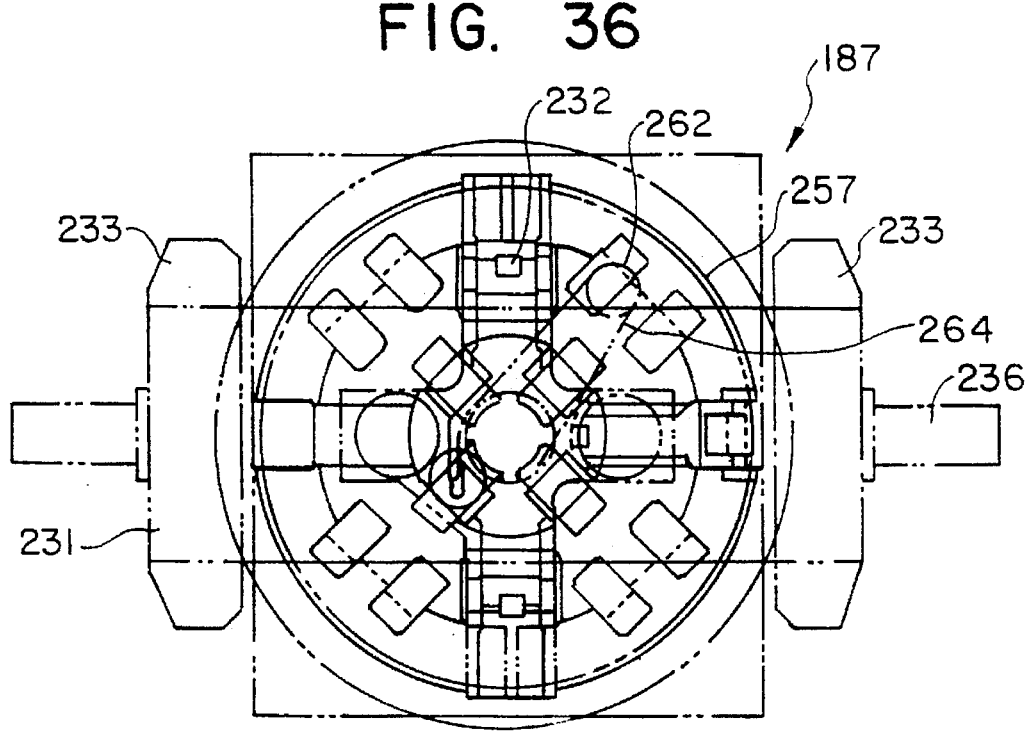
FIG. 36 is a plan of a pressing part of the above press unit.
Figure 37:
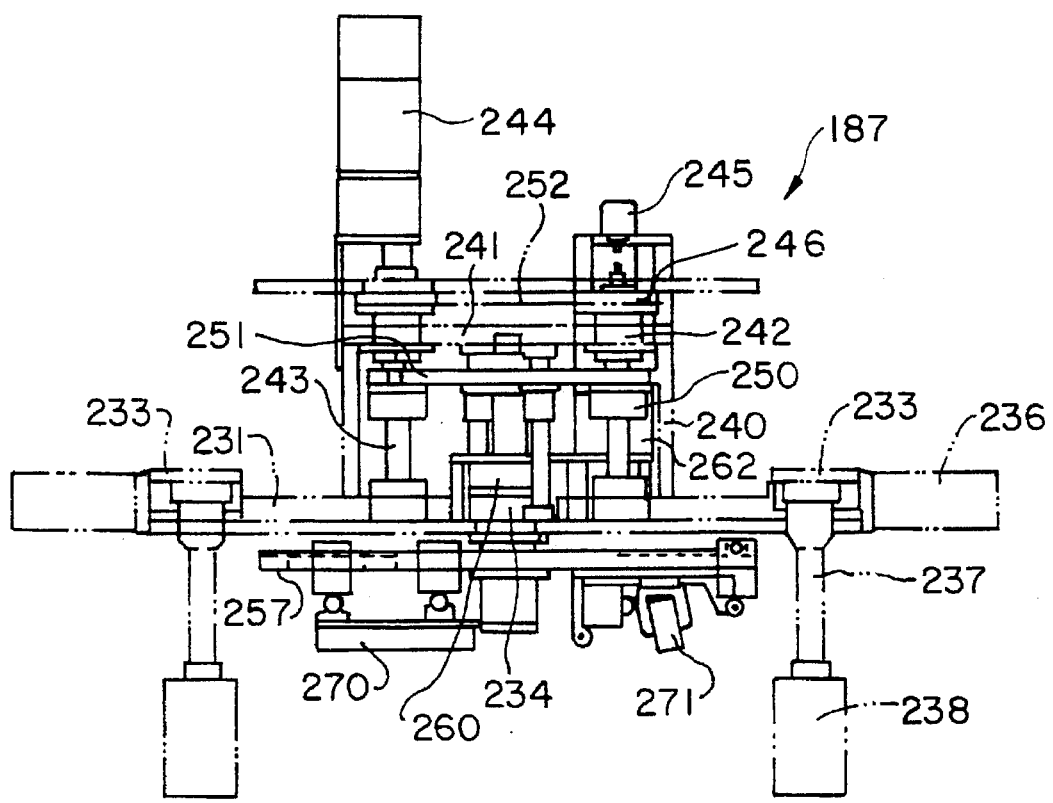
FIG. 37 is a front view of the pressing part of FIG. 36.
Figure 38:
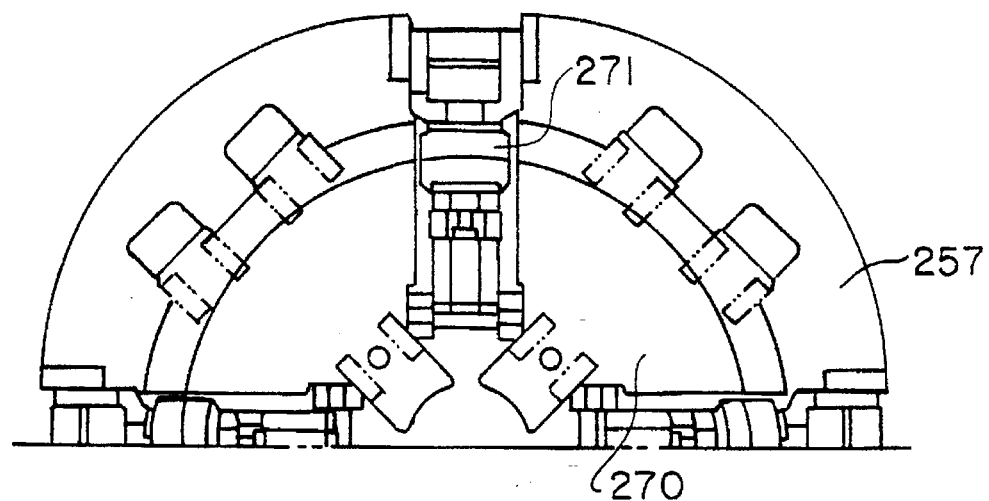
FIG. 38 is a bottom view of the above pressing part.
Figure 39:
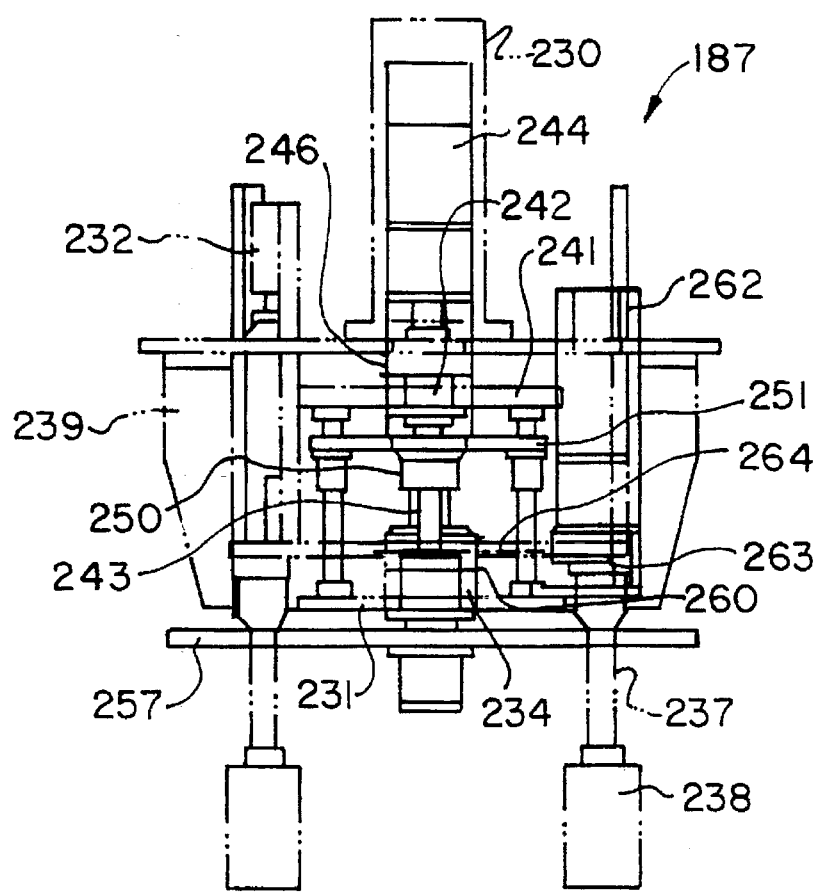
FIG. 39 is a side view of the above pressing part.
Figure 40:
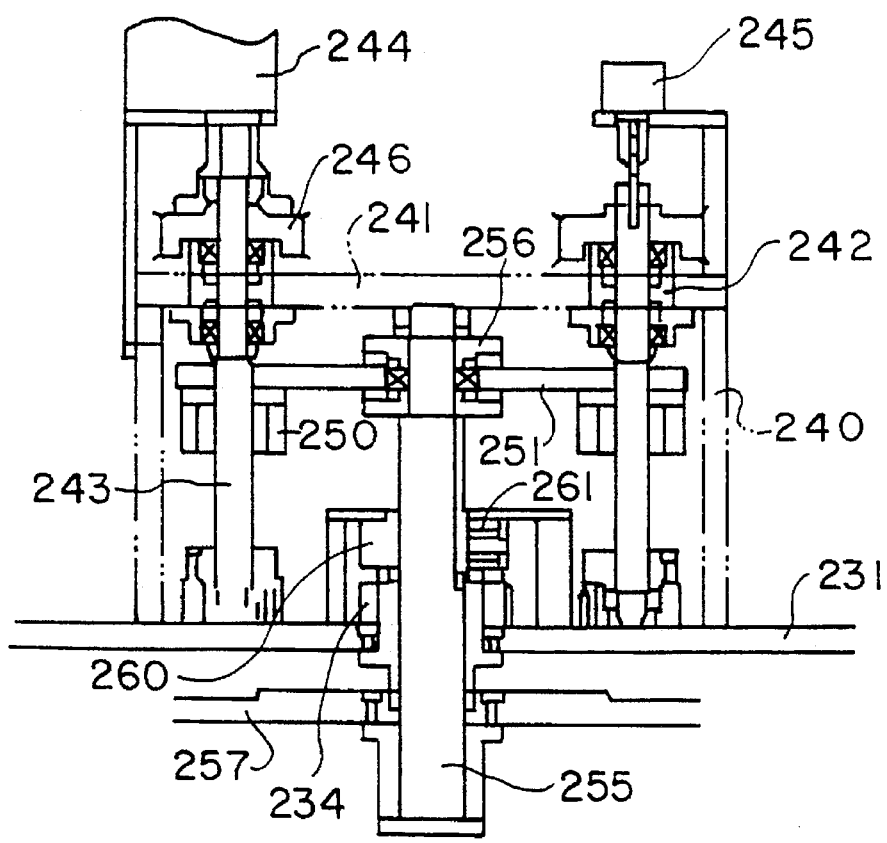
FIG. 40 is an enlarged essential part section of the above pressing part.
Figure 41:
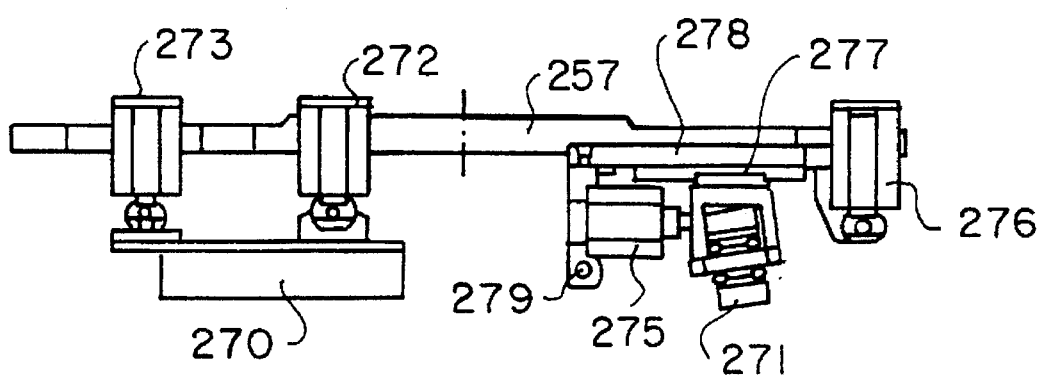
FIG. 41 is a sectional view on the line B—B of FIG. 38.

The press-section delivery conveyor 186 is substantially identical with the sorting-section delivery conveyor 26, and has a structure corresponding to a 90° rotation of the structure of the sorting-section delivery conveyor 26, as shown in FIGS. 31 to 33.

That is, the delivery conveyor 186 is provided with a delivery belt 200 interposed between neighboring conveyor rolls 190 of the feed roll conveyor 185 in parallel therewith and extending the axial direction thereof. Each of the delivery belts 200 is stretched between a driving-side toothed pulley 201 and a follower-side toothed pulley 202.

The driving-side toothed pulleys 201 are nonrotatably fixed to the same driving shaft 203 rotatably supported. A follower pulley 204 is fixed to an end of the driving shaft 203. A belt 207 is stretched between the follower pulley 204 and a driving pulley 206 fixed to the output shaft of a delivery conveyor motor 205.

Each of the follower-side toothed pulleys 202 is rotatably supported by a tension shaft 209 held through a slit 208 movably along the traveling direction of the delivery belt 200.

Thus, the delivery belt 200 is caused to travel along the wheel W carriage direction (delivery direction) by the driving of the delivery conveyor motor 205 with the result that the wheels W on the delivery belt 200 are carried by the above travel to the subsequent step.

The pulleys 201 and 202 of the press-section delivery conveyor 186 are held by a bracket 216 fixed to an elevation beam 215, and the delivery conveyor motor 205 is mounted on a motor mount plate 217 fixed to the elevation beam 215.

The elevation beam 215 is connected to the upper end of the piston rod of a delivery-conveyor elevating cylinder 220 fixed to the middle frame 3 of the main frame 1. The elevation beam 215 is moved up and down with the guide of a bearing 221 by the driving of the elevating cylinder 220, so that the delivery belt 200, the delivery conveyor motor 205, etc. are integrally moved up and down in accordance with the above up and down movement.

The upper surface of the delivery belt 200 is positioned slightly lower than the plane formed of the upper edges of the conveyor rolls 190. When the delivery belt 200 is elevated for its upper surface to position higher than the above plane formed of the upper edges of the conveyor rolls 190, the transfer of the wheels W is carried out from the feed roll conveyor 185 to the delivery conveyor 186.

The press unit 187 has the structure as shown in FIGS. 34 to 41, and is provided with substantially the same centering mechanism as in the sorting unit 27 of the sorting section 7.

That is, an elevation base plate 231 is connected to the lower end of a press-section elevation cylinder 230 attached to the upper frame 2 of the main frame 1. The elevation base plate 231 is moved up and down along LM guides 232 by the actuation of the elevation cylinder 230. Further, the following members are mounted on the elevation base plate 231, and are moved up and down integrally with the elevation base plate 231.

A pair of mutually parallel and slidable slide plates 233 are disposed on the upper surface of the elevation base plate 231 at equal distances from the center of the elevation base plate 231. A rack plate 235 which extends in the T-letter form toward the center and has, sculpted thereon, a rack adapted to engage a pinion 234 rotatably supported in the center of the elevation base plate 231 is connected to each of the slide plates 233.

Each of the slide plates 233 is connected to the tip of the piston rod of a centering cylinder 236, and a total of four centering bars 237 extending to below the elevation base plate 231 are vertically disposed at both ends of each of the slide plates 233 along the lengthwise direction thereof. Centering rolls 238 are held on each of the centering bars 237 so as to surround the latter.

The LM guide 232 is mounted on an LM guide mount plate 239.

Thus, the centering cylinders 236 are synchronously operated in mutually different directions to thereby achieve the movement in the mutually approaching direction of the pair of slide plates 233 through the pinions 234 and the rack plates 235, so that the total of four centering rolls 238 contact rectangular four points on the peripheral surface of each of the wheels W. Thus, positioning by centering is accomplished.

In this embodiment, the sorting section 7 includes one centering cylinder and the press section 9 includes two centering cylinders. The reason for the use of two centering cylinders is to obtain satisfactory driving force taking into account the relationship with the inner diameter of cylinder. Essentially, the number of cylinders is not limiting and may be one or two.

A strut 240 is set on the elevation base plate 231. An intermediate bearing plate 241 is connected to an upper end of the strut 240. A pair of bearings 242 are mounted on the intermediate bearing plate 241.

Ball screws 243 are respectively rotatably supported by the bearings 242. A press-plate elevating motor 244 is directly connected to an upper end of one of the ball screws 243, while an encoder 245 is attached to an upper end of the other ball screw 243. A pulley 246 is mounted on each of the ball screws 243 so as to make integral rotation.

Further, a nut part case 250 provided with a nut part threadedly engaging the ball screw 243 is disposed, and a second elevation plate 251 is connected to the nut part case 250. A belt 252 is stretched between the pulleys 246.

Thus, the rotation of the press-plate elevating motor 244 causes the pulleys 246 and also the ball screws 243 to rotate. The rotation of the ball screws 243 causes the second elevation plate 251 to move up and down. The number of revolutions of the ball screws 243 is detected by the encoder 245.

An upper end of a press supporting shaft 255 is supported through a thrust lock seat 256 by the center of the second elevation plate 251. A press-device mount plate 257 is connected to a lower end of the press supporting shaft 255.

A follower pulley 260 is mounted through a key 261 halfway on the press supporting shaft 255 in a fashion such that the pulley 260 is slidable up and down and rotates integrally with the press supporting shaft 255. A belt 264 is stretched between a driving pulley 263 directly connected to the lower end of the output shaft of a press-section rotating motor 262 held on the elevation base plate 231 and the above follower pulley 260.

Thus, the driving of the press-section rotating motor 262 causes the press supporting shaft 255 and also the press-device mount plate 257 to rotate. The up and down movement of the press supporting shaft 255 is not inhibited by the follower pulley 260.

The press-device mount plate 257 is provided with four sponge-clad press plates 270 and four rubber-lined peripheral press rolls 271 arranged on the lower side thereof.

Each of the press plates 270 has an approximately sectorial shape outward expanding at an angle of about 90° so as to cooperate with the other three press plates 270 to form a hollow disk shape agreeing with the shape of the protective film S. The press plates 270 are mounted through one inner swing cylinder 272 and two outer swing cylinders 273 along the diameter direction of the plates on the press-device mount plate 257.

The inner swing cylinder 272 is first operated to lower the inner side of the press plates 270. Then, the outer swing cylinders 273 are operated to lower the outer side of the press plates 270. Such controlled operations permit gradual pressing of the protective film S stuck to the surface of the wheel W from the inside toward the outside with the result that wrinkling of the protective film S can be prevented.

On the other hand, the peripheral press roll 271 is used to press the outer periphery of the protective film against the surface of the wheel W. It is rotatably supported at a position between neighboring press plates 270 and corresponding to the peripheral edge of the press plates 270. Further, the press device mount plate 257 is provided with a position change cylinder 275 and a peripheral press cylinder 276.

The position change cylinder 275 is used to slide the peripheral press roll 271 in the diametrical direction along the LM guide 277 to thereby change the position of the peripheral press roll 271 so that all of 14-inch, 15-inch and 16-inch wheels W can be dealt with.

In this embodiment, both of 14-inch and 15-inch wheels W are dealt with by the peripheral press roll 271 set at a fixed position. For only 16-inch wheels W, the peripheral press roll 271 is slid half an inch outward by the use of the position change cylinder 275.

The peripheral press cylinder 276 is used to lower the peripheral press roll 271 by downward swinging an LM guide mount plate 278 (for mounting the LM guide 277) as a swing arm about a supporting shaft 279 together with the position change cylinder 275.

The peripheral press cylinder 276 is operated as mentioned above to thereby cause a lower end of the peripheral press roll 271 to contact the protective film S stuck to the wheel W. While keeping this condition, the press-section rotating motor 262 is driven to thereby rotate the press-device mount plate 257, so that the peripheral press roll 271 travels on the protective film S. Thus, the protective film S is pressed against the surface of the wheel W.

Figure 47:
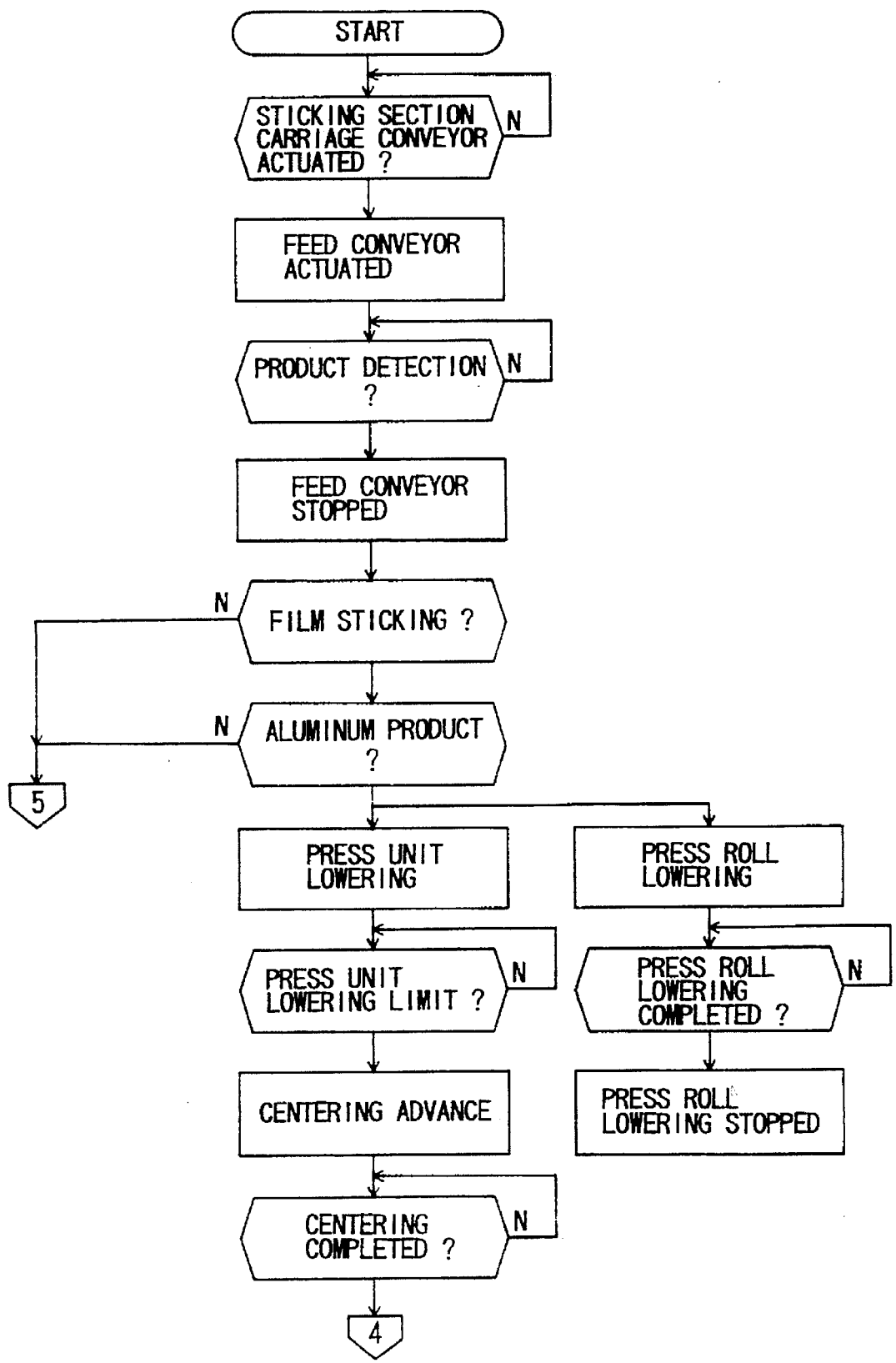
FIG. 47 is a flow chart of the operations carried out in the press section.
Figure 48:
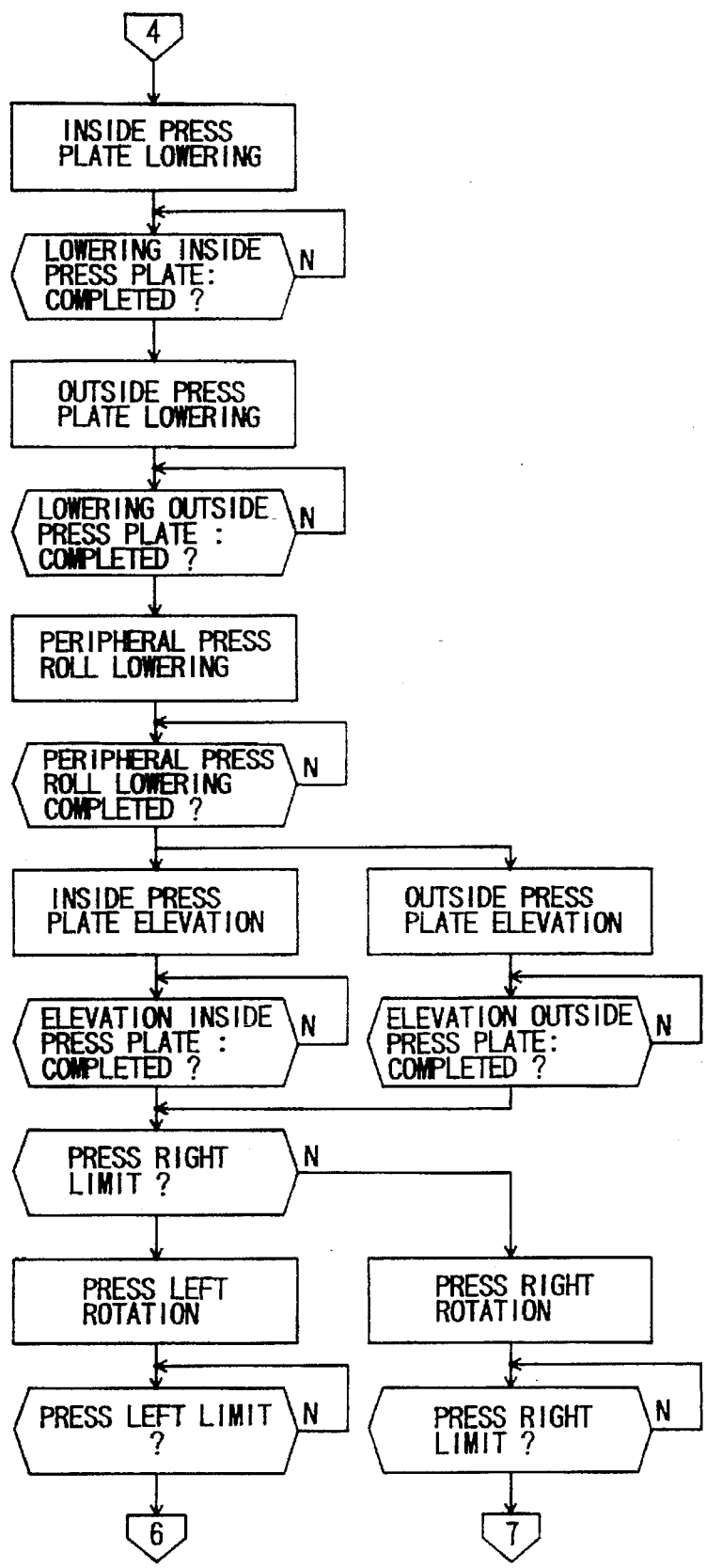
FIG. 48 is a flow chart continuing from FIG. 47.
Figure 49:
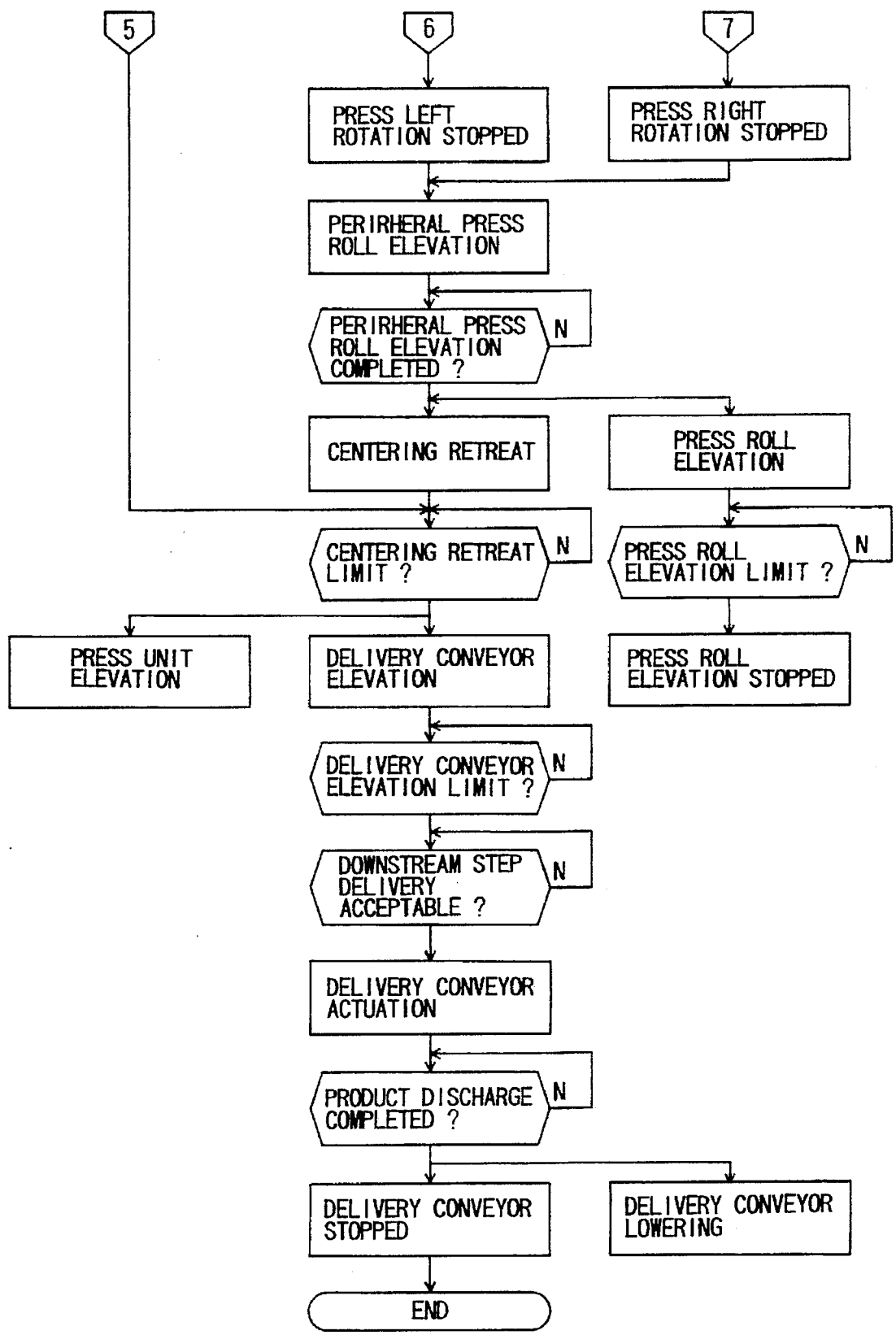
FIG. 49 is a flow chart continuing from FIG. 48.
Figure 50:
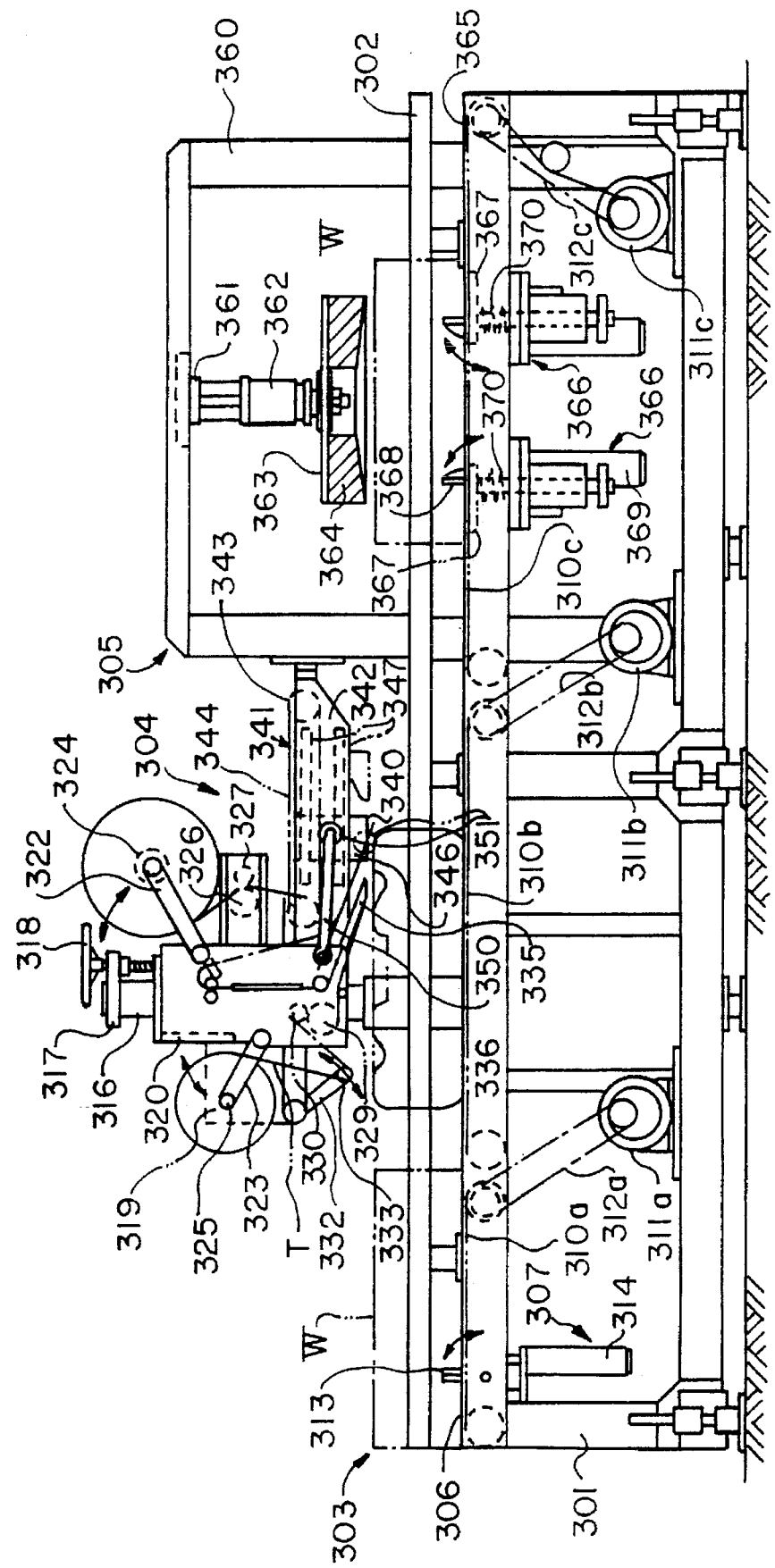
FIG. 50 is a front view illustrating the second embodiment of the present invention.

The operations in the press section 9 will be described with reference to FIGS. 42A and 42B and the flow charts shown in FIGS. 47 to 49.

On the condition that the carriage conveyor 110 of the sheet sticking section 8 has already been actuated, the press-section roll conveyor motor 193 is driven to actuate the feed roll conveyor 185 with the result that the wheel W on the carriage conveyor 110 is transferred onto the feed roll conveyor 185. When the wheel W reaches the predetermined position, it is stopped.

When sticking of the protective film S is not required or when the sorting result at the sorting section 7 is that the wheel W is not composed of aluminum so that sticking of the protective film S for protection is not necessary, the delivery-conveyor elevating cylinder 220 is actuated after the stopping of the feed roll conveyor 185 to thereby elevate the delivery conveyor 186, on the condition that the centering roll 238 lies in the reverse limit.

Thus, the wheel W on the feed roll conveyor 185 is transferred onto the delivery belt 200 of the delivery conveyor 186. When the delivery to the downstream step has become acceptable, the delivery conveyor motor 205 is driven to thereby actuate the delivery conveyor 186, so that the wheel W on the delivery belt 200 is discharged. After the completion of the discharge, the operation of the delivery conveyor 186 is stopped, and it is lowered.

When the wheel W is made of aluminum to thereby require sticking of the protective film S, the press-section elevation cylinder 230 is operated to thereby lower the press unit 187 to the bottom. Simultaneously, the press-plate elevating motor 244 is driven to thereby cause the press-device mount plate 257 and also the press plate 270 and the peripheral press roll 271 (press roll in FIGS. 47 to 49, same below) to descend to the predetermined position and stop.

At this time the press roll has a descent corresponding to the height of the wheel W detected in the sorting section 7 by means of the encoder 245 attached to an upper end of the ball screw 243, namely, the distance between the lower surface of the press roll and the surface of the wheel W is kept constant.

The centering cylinder 236 is operated synchronously with the stopping of the above press roll, so that the slide plates 233 are moved inward. Thus, the four centering rolls 238 vertically disposed at edges of the slide plates 233 are brought into contact with four points of the wheel W to thereby achieve positioning by centering.

Figure 42A:
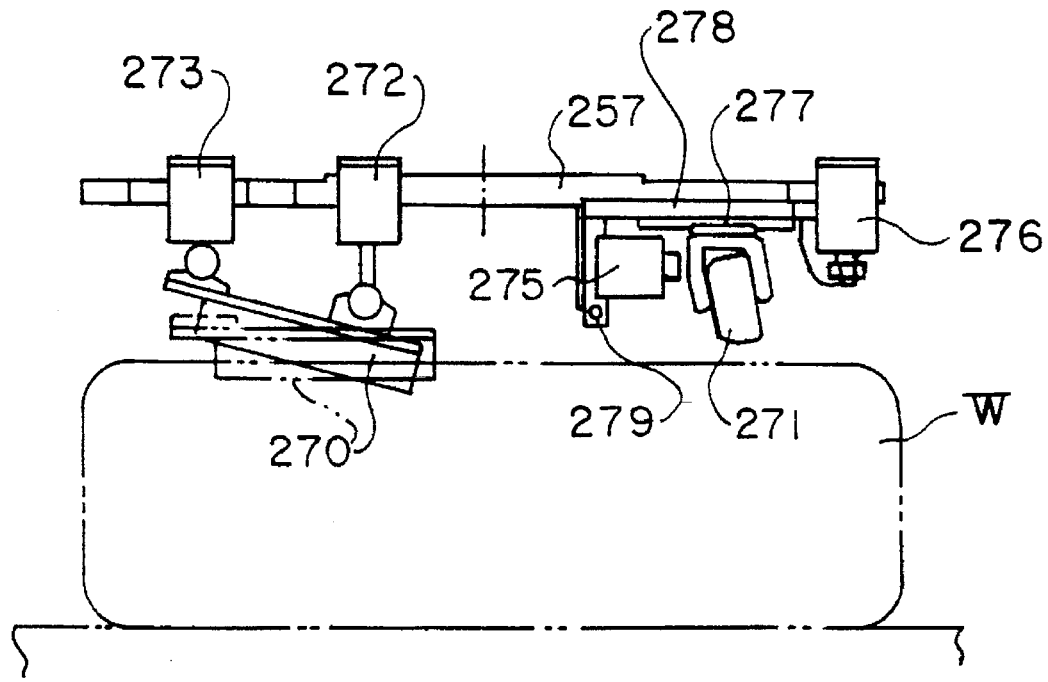
FIG. 42A and FIG. 42B are views illustrating the pressing action in the press section.

Subsequently, as shown in FIG. 42A, the inner swing cylinder 272 is operated to lower the inner side of the press plate 270 until it contacts the surface of the wheel W, and thereafter the outer swing cylinder 273 is operated so as for one entire surface of the press plate 270 to contact the surface of the wheel W with the result that the protective film S stuck to the surface of the wheel W is pressed against the wheel W.

Thus, the air present between the wheel W and the protective film S is dispelled outside by the gradual pressing from the inside toward the outside, so that the wrinkling of the protective film S can be prevented.

Figure 42B:
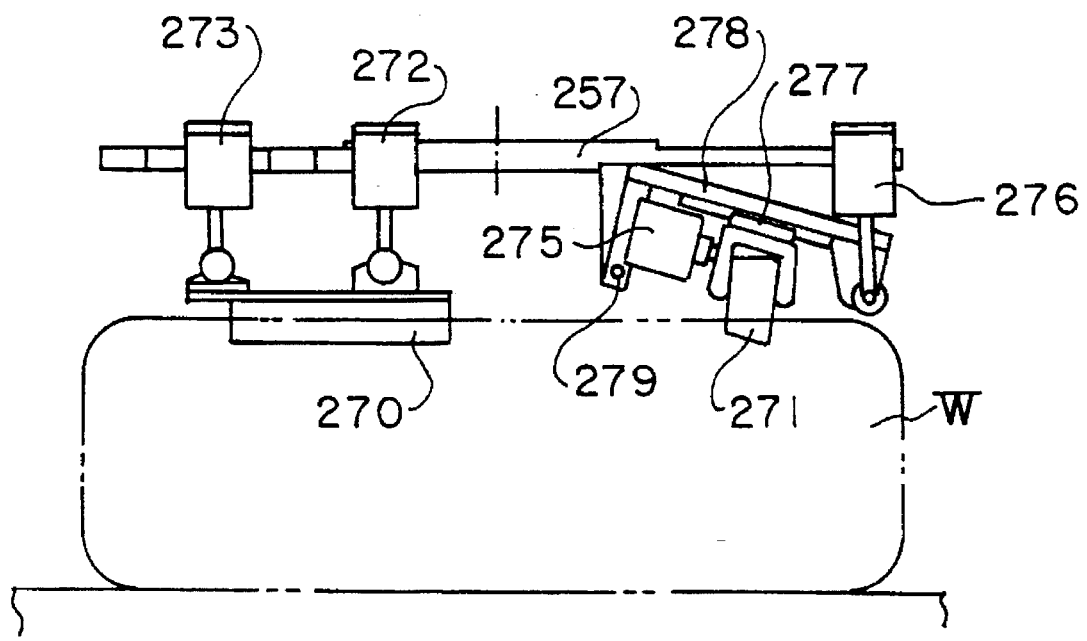

Thereafter, as shown in FIG. 42B, the peripheral press cylinder 276 is operated to lower the peripheral press roll 271, so that the lower edge thereof is brought into contact with the surface of the wheel W.

In this condition, the inner swing cylinder 272 and the outer swing cylinder 273 are reversely operated to elevate the press plate 270, so that the travel of the peripheral press roll 271 described below is not inhibited.

Then, whether or not the peripheral press roll 271 lies on the right margin is judged. When it is on the right margin, the press plate rotating motor 262 is rotated left to thereby rotate the peripheral press roll 271 left. On the other hand, when it is not on the right margin (lies on the left margin), the press plate rotating motor 262 is rotated right to thereby rotate the peripheral press roll 271 right. In this manner, the protective film S is pressed against the surface of the wheel W at its periphery.

The above pressing of the protective film S to the surface of the wheel W at the periphery ensures inhibition of coiling of the protective film S from the periphery.

The pressing of the protective film S to the wheel W by means of the press roll (press plate 270 and peripheral press roll 271) prevents the flotation and peeling of the protective film S.

Then, the peripheral press cylinder 276 is reversely operated to elevate the peripheral press roll 271. When this elevation is completed, the centering cylinder 236 is reversely operated to move the slide plate 233 outward, and the centering roll 238 is reversed to the reverse limit and stopped.

Synchronously with the reverse of the centering roll 238, the press plate elevating motor 244 is rotated in the direction reverse to the above to elevate the press roll to the ceiling and stop the same.

Next, the press-section cylinder 230 is reversely operated to elevate the press unit 187. Simultaneously, the delivery-conveyor elevating cylinder 220 is operated to elevate the delivery conveyor 186. Thus, the wheel W on the feed roll conveyor 185 is transferred onto the delivery belt 200 of the delivery conveyor 186.

When the delivery to the downstream step has become acceptable, the delivery conveyor motor 205 is driven to actuate the delivery conveyor 186, so that the wheel W on the delivery belt 200 is discharged. After the completion of the discharge, the operation of the delivery conveyor 186 is stopped, and it is lowered. The above operations are continually repeated.

In the first embodiment featured above, the wheel (work) W sequentially fed from the preceding step is sorted in the sorting section 7 with respect to the height, size and type, and carried to the sheet sticking section 8 where the protective film (sheet) S is automatically stuck to the surface of the wheel W. Then, the protective film S is pressed in the press section 9 in order to avoid flotation and peeling. After the pressing, the product can sequentially be delivered to the subsequent step.

Therefore, even if the work is large-sized and has an uneven surface, automatic sheet sticking can be performed to the surface without the need of using a mold conforming to the configuration of the work.

The above first embodiment shows a typical application example in which wheels (work) W having mutually different sizes or heights are randomly fed. However, when only the same wheels, e.g., 14-inch aluminum wheels, are sequentially fed, it is not necessary to install the sorting section 7 or to render the labeler head movable up and down.

Further, when the flotation or peeling of the protective film (sheet) S from the wheel (work) W does not occur or, if occurred, is substantially negligible, that is, when the sticking only in the sheet sticking section 8 is satisfactory, it is not necessary to install the press section 9.

It is feasible by the installation of the sheet sticking section 8 only to carry out a process comprising peeling an edge of a sheet held on a separator and continuously fed from the separator, drawing the sheet forward while adsorbing and holding the peeled edge to thereby cause the sheet to hang down so as to cover the surface of the work and, in this condition, conducting an air blow in which air is blown out toward the sheet from above the sheet while simultaneously carrying out the work carriage and the sheet feeding to thereby press the sheet against the surface of the, work to attain adhesion under the air blow pressure. Thus, the sheet can automatically be stuck to the surface of the work in a manner such that the sheet follows the configuration of the work, without the need of using a mold conforming to the work configuration.

The sticking (temporary sticking) of the protective film (sheet) S to the wheel (work) W prior to processing in the press section is satisfactory as long as the surface of the work is covered by the sheet and as the sheet is not easily peeled from the work. Thus, the above sheet sticking section 8 is not limiting. For example, the sheet may be manually spread, applied to the surface of the work and pressed.

That is, it is feasible only by means of the press section 9 to apply a plurality of divided press plates in a manner such that their inner sides are first lowered to thereby press the sheet temporarily stuck to the surface of the work against the work and then their outer sides are lowered to thereby gradually press and expand the sheet outward so as to gradually guide outward and finally release the air enclosed between the work and the sheet. This ensures desirable adhesion between the work and the sheet, so that sheet wrinkling and formation of an air layer between the work and the sheet can be prevented.

Subsequent to the above pressing of the sheet to the work by means of the press plates, a peripheral press roll may be traveled, while pressing its lower edge against the surface of the work, on the peripheral part of the sheet along the periphery to thereby press the peripheral part over its entire circumference against the work at a satisfactory force. Thus, sheet coiling and peeling at the periphery can be avoided.

Below, the second embodiment of the present invention will be described with reference to FIGS. 50 to 55.

In the second embodiment, numeral 301 denotes a rectangularly assembled frame. A pair of side guides 302 are disposed in substantially parallel relationship, which lie on both upper width-direction sides of the frame 301, extend along the lengthwise direction of the frame 301 as long as the entire length thereof and are adapted to contact the side of the wheel W to guide it. A series of a work separation section 303, a sheet sticking section 304 and a press section 305 are arranged in the carriage direction of the wheel (work) W.

Figure 51:
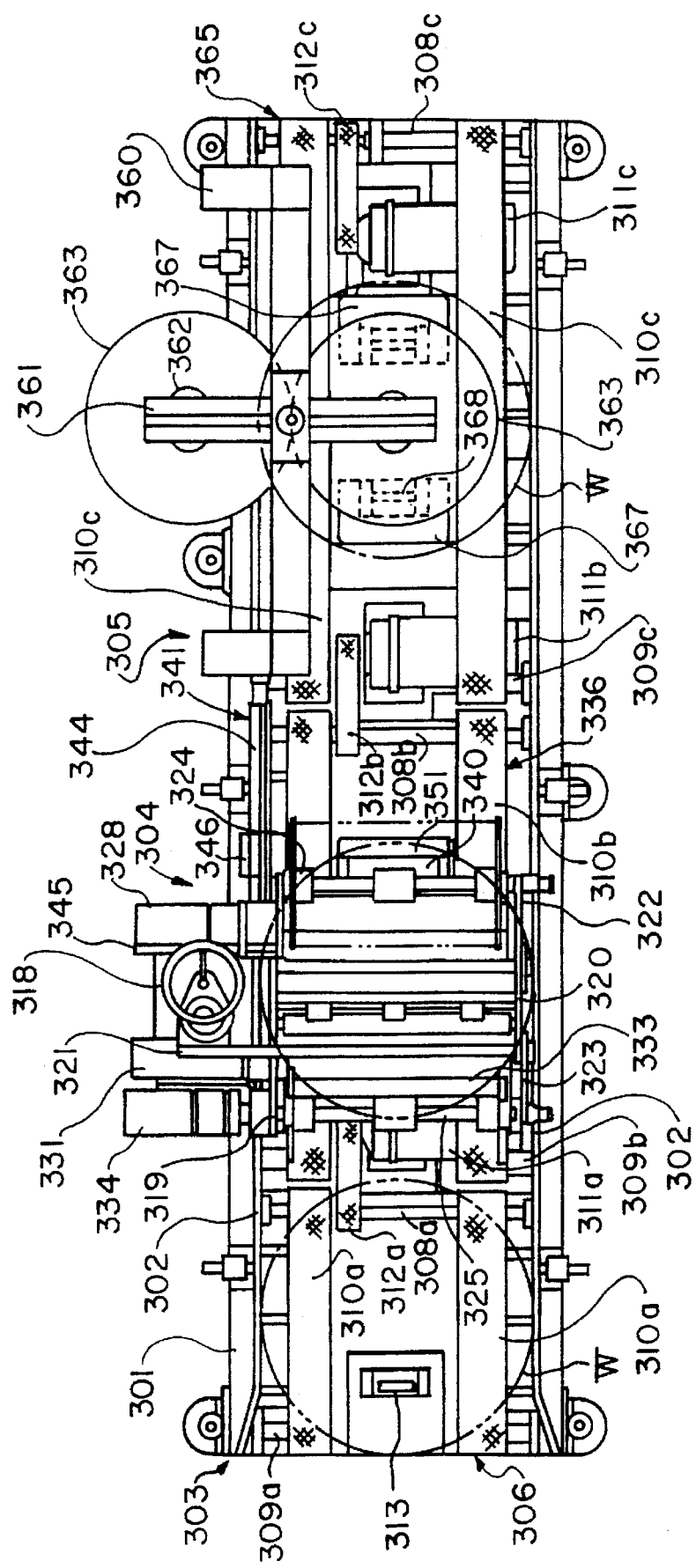
FIG. 51 is a partially omitted plan illustrating the same.
Figure 52:
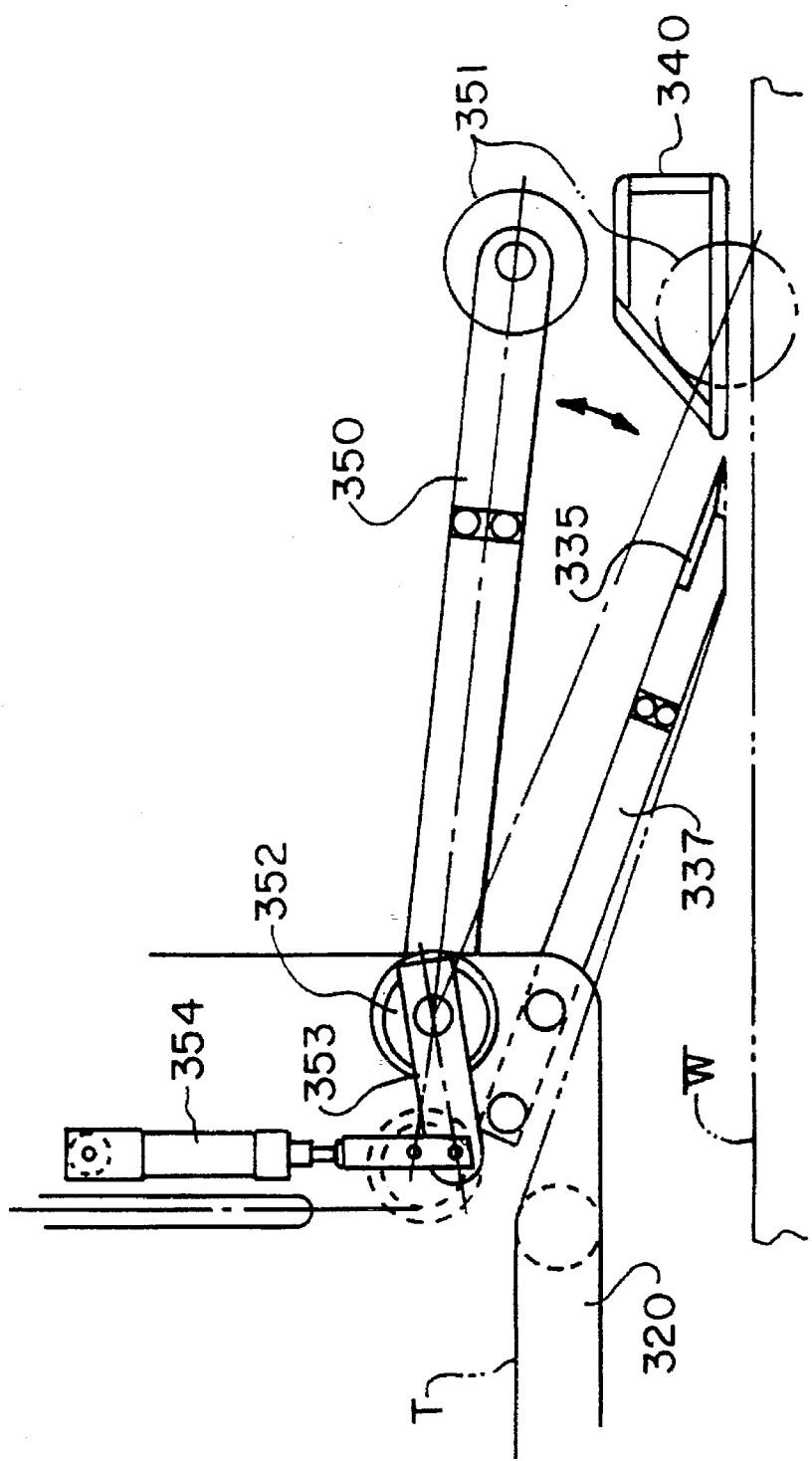
FIG. 52 is an enlarged view of an essential part of FIG. 50.

In the second embodiment, the wheel W is fed from the left margin of FIG. 51, and carried from the left side to the right side. During the carriage, a protective film (sheet) S is stuck to the disk surface of the wheel W. Thereafter, the wheel W having the protective film S stuck thereto is delivered from the right margin of the Figure to the subsequent step.

The functions of the work separation section 303 are to intermittently repeat positioning and stopping of the wheel W fed from the preceding step and carriage thereof to the sheet sticking section 304. It is provided with a separation-section belt conveyor 306 and a separation stopper device 307.

The separation-section belt conveyor 306 is provided with a pair of carriage belts 310a stretched between a conveyor driving shaft 308a having its both ends rotatably supported by the frame 301 and a conveyor follower shaft 309a having its one end rotatably supported by the frame 301, and also provided with a timing belt 312a stretched between the conveyor driving shaft 308a and a conveyor driving motor 311a. In the above structure, the rotation of the conveyor driving motor 311a causes the carriage belt 310a to travel.

On the other hand, the separation stopper device 307 is mainly composed of a separation stopper chip 313 and a separation cylinder 314. It is disposed between the carriage belts 310a, 310a and below the same. The actuation of the separation cylinder 314 causes the separation stopper chip 313 to swing upward so that it projects above the carriage belt 310a. This separation stopper chip 313 is brought into contact with the inner circumferential plane of the wheel W to thereby effect positioning and stopping thereof. When the separation cylinder 314 is reversely operated, the separation stopper chip 313 swings downward and sink below the carriage belt 310a to thereby release the stopping.

Thus, the mechanism is formed that the wheels W fed from the preceding step are positioned one by one and separated by means of the separation stopper device 307 and that, after the separation, the wheels W are intermittently carried by the traveling of the separation-section belt conveyor 306 to the sheet sticking section 304.

The functions of the sheet sticking section 304 are to stick the protective films S (initial sticking), while peeling one by one from the separator T, to the surfaces of the wheels W intermittently carried in the positioned condition from the work separation section 303, and to carry the same to the subsequent step press section 305.

The sheet sticking section 304 is provided with a stand 316 vertically extending upward from the frame 301. An up-and-down regulation handle 318 is rotatable supported by a flange 317 fixed to an upper end of the stand 316. The rotation of the up-and-down regulation handle 318 causes a face plate 319, a subface plate 320 and a labeler mount beam 321 to integrally move up and down.

One end of each of a pair of swing arms 322 projecting toward the press section 305 and one end of each of a pair of swing arms 323 projecting toward the work separation section 303 are respectively rotatably supported by the face plate 319 and the subface plate 320. The other ends of the swing arms 322 and 323 are respectively provided with a sheet-bearing-separator holding shaft 324 which supports the separator T holding the protective films S in a wound form and a separator winding shaft 325 which winds the separator T after peeling of the protective films S.

A feed roll 326 and a pinch roll 327 are disposed opposite to each other below the sheet-bearing-separator shaft 324. Also, a separator feeding motor 328 for rotating the feed roll 326 is provided. The rotation of the separator feeding motor 328 causes the feed roll 326 to rotate, so that the separator T having the protective film S is sequentially traveled toward below the sheet-bearing-separator holding shaft 324 while sandwiching the separator T between the feed roll 326 and the pinch roll 327.

A drive roll 329 and a pinch roll 330 are disposed opposite to each other on the side of the separator winding shaft 325 and below the same. Also, a separator feeding motor 331 for rotating the drive roll 329 is provided. The rotation of the separator feeding motor 331 causes the drive roll 329 to rotate, so that the separator T having the protective films S peeled therefrom is sequentially traveled toward the separator winding shaft 325 while sandwiching the separator T between the drive roll 329 and the pinch roll 330.

Further, a dancer roll 333 rotatably supported by the tip of a swingable tension arm 332 is disposed downstream of the drive roll 329 and between the same and the separator winding shaft 325. A tension is applied to the separator T positioned there by the dancer roll 333, and the separator winding shaft 325 is arranged to rotate by the rotation of a separator winding motor 334.

A peel plate 335 suitable for sharply folding back the separator T to thereby peel the forward edge of the protective film S due to the rigidity of the protective film S itself from the separator T is disposed between the feed roll 326 and the drive roll 329 set along the travel path of the separator T.

Illustratively, the peel plate 335 is flat, mounted on the tip of a peel plate base 337, slightly downward arranged along the wheel W carriage direction, and has an acute-angled free edge. On the other hand, the separator T downward fed by the feed roll 326 once goes up, then is guided downward, and is traveled on the upper surface, the free edge and the lower surface of the peel plate 335 prior to reaching the drive roll 329.

Thus, the separator T is folded back by about 180° along the peel plate 335. At that time, the protective films S tend to continue the linear travel on the upper surface of the peel plate 335, and the rigidity of the protective films S beats the adherence between the protective films S and the separator T. As a result, the edge of the protective films S is peeled from the separator T.

A sticking-section belt conveyor 336 is provided in continuity with the separation-section belt conveyor 306.

As in the separation-section belt conveyor 306, the sticking-section belt conveyor 336 is provided with a pair of carriage belts 310b stretched between a conveyor driving shaft 308b having its both ends rotatably supported by the frame 301 and a conveyor follower shaft 309b having its one end rotatably supported by the frame 301, and also provided with a timing belt 312b stretched between the conveyor driving shaft 308b and a conveyor driving motor 311b. In the above structure, the rotation of the conveyor driving motor 311b causes the carriage belt 310b to travel.

A variable speed motor whose speed can be controlled by, for example, inverter control or the like, may be used as the above conveyor driving motor 311b.

A vacuum grid 340 adapted to adsorb and hold the edge of the protective film S which has been peeled by the peel plate 335 is disposed in front of the peel plate 335 along the work carriage direction. This vacuum grid 340 is connected to a grid moving device 341, and moves forward and backward along the wheel W carriage direction.

Illustratively, the grid moving device 341 is mainly comprised of a pair of rolls 343, 343 rotatably supported by a horizontally extending support plate 342 having its one end connected to the below described mount beam 360, a timing belt 344 stretched between the above rolls 343, 343 and a grid moving motor 345 capable of rotating one of the above rolls 343. The timing belt 344 travels forward or backward depending on whether the direction of rotation of the grid moving motor 345 is normal or reverse. The vacuum grid 340 is connected to a connector 346 fixed to the timing belt 344, and moves integrally with the timing belt 344 along the LM guide 347.

The rotational speed of the conveyor driving motor 311b is controlled so that the timing belt 344 and the carriage belt 310b of the sticking-section belt conveyor 336 are synchronously traveled, i.e., so that the protective film S and the wheel W are moved in the same positional relationship along the carriage direction of wheel W.

A press roll 351 rotatably supported by the free end of a pair of swingable swing arms 350 is disposed above the vacuum grid 340. The basic end of the swing arms 350 is connected to a rotation axis 352 having its both ends rotatably supported by the face plate 319 and the subface plate 320, respectively. An end of a coupling rod 353 is fixed to the rotation axis 352, and a press roll elevating cylinder 354 is connected to the other end of the coupling rod 353.

Thus, the shrinkage of the press roll elevating cylinder 354 causes the swing arms 350 to swing downward to thereby lower the press roll 351. The elongation of the press roll elevating cylinder 354 causes the swing arms 350 to swing upward to thereby elevate the press roll 351.

The press roll 351 is adapted to descend so as to press the protective film S against the surface of the wheel W. It is so constructed as to be able to follow the uneven contour of the wheel W, i.e., to be able to control the swing level of the swing arms 350 with the result that the tension by the press roll 351 can be regulated.

In the sheet sticking section 304 with the above structure, the edge of the protective film S sequentially carried by the traveling of the separator T is peeled from the separator T by sharply folding back the separator T by means of the peel plate 335, and the peeled edge of the protective film S is adsorbed and held by the vacuum grid 340.

In this condition, the vacuum grid 340 is traveled along the wheel W carriage direction by means of the grid moving device 341 in synchronism with the traveling of the wheel W placed on the carriage belt 310b of the sticking-section belt conveyor 336. At that time, a regulation is effected such that the protective film S held by the vacuum grid 340 is brought to a given sticking position of the wheel W.

After the passage of the vacuum grid 340 below the press roll 351, the press roll 351 is lowered by the press roll elevating cylinder 354 so as for the press roll 351 to press the protective film S against the surface of the wheel W.

When part of the protective film S has securely been stuck to the surface of the wheel W by the pressing with the press roll 351, the adsorption and holding by the vacuum grid 340 is released and stopped.

When the wheel W has passed from below the press roll 351 by the carriage belt 310b of the sticking-section belt conveyor 336, i.e., when the sticking operation (temporary sticking) of the protective film S to the surface of the wheel W has been completed, the press roll 351 is elevated and the vacuum grid 340 is retreated.

The functions of the press section 305 are to press the protective film S over its entire surface against the surface of the wheel W so as to ensure secure sticking of the protective film S over its entire surface to the surface of the wheel W.

Figure 53:
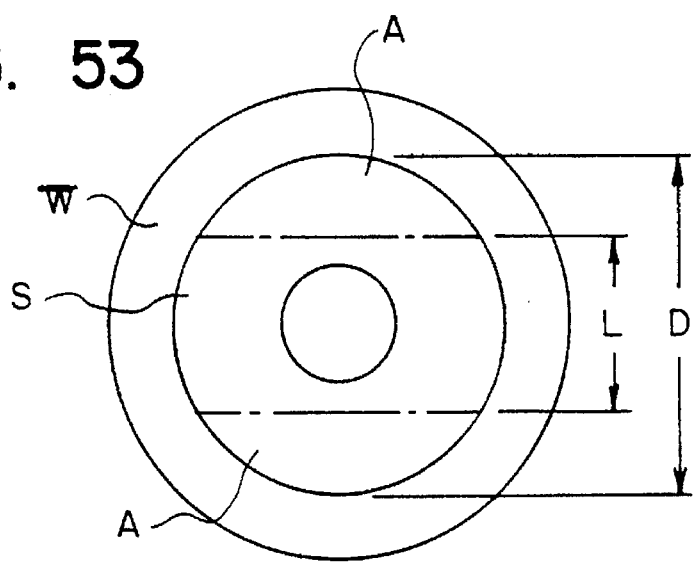
FIG. 53 is a plan illustrating the condition of a protective film having undergone primary sticking to a wheel surface in the second embodiment.

As shown in FIG. 53, when the diameter D of the protective film S is smaller than the length L of the press roll 351, nonstuck region A occurs on two sides of the protective film S. Thus, the press section 305 is provided for dealing with parts where pressing with the press roll 351 cannot be effected due to the relatively large diameter D of the protective film S.

The press section 305 is provided with a gate-shaped mount beam 360 projecting upward. A rotational arm 361 is rotatably supported by a lateral beam of the mount beam 360 at its center. Further, press cylinders 362 are disposed vertically in the downward direction at both lengthwise ends of the rotational arm 361.

A press head 364 composed of, for example, a sponge, which is a size larger than the protective film S and has a surface with an uneven configuration relative to the surface of the wheel W, is secured through a support plate 363 to a lower end of each of the press cylinders 362.

A press-section belt conveyor 365 is provided in continuity with the sticking-section belt conveyor 336.

As in the separation-section belt conveyor 306 and the sticking-section belt conveyor 336, the press-section belt conveyor 365 is provided with a pair of carriage belts 310c stretched between a conveyor driving shaft 308c having its both ends rotatably supported by the frame 301 and a conveyor follower shaft 309c having its one end rotatably supported by the frame 301, and also provided with a timing belt 312c stretched between the conveyor driving shaft 308c and a conveyor driving motor 311c. In the above structure, the rotation of the conveyor driving motor 311c causes the carriage belt 310c to travel.

A pair of press-section stopper devices 366 and a work elevating plate 367 are disposed between and below the carriage belts 310c, 310c.

Each of the press-section stopper devices 366 is mainly composed of a press-section stopper chip 368 and a press-section cylinder 369. The actuation of the press-section cylinder 369 causes the press-section stopper chip 368 to swing upward in a mutually opening direction so that it projects above the carriage belt 310c. This press-section stopper chip 368 is brought into contact with the inner circumferential plane of the wheel W to thereby effect positioning by centering and stopping thereof. When the press-section cylinder 369 is reversely operated, the press-section stopper chip 368 swings downward and sink below the carriage belt 310c to thereby release the stopping.

The work elevating plate 367 is constantly pushed upward by the elasticity of a spring 370. The mechanism is provided that the work elevating plate 367 is elevated by the elasticity of the spring 370 when the press-section stopper chip 368 is swung to project above the carriage belt 310c, while the work elevating plate 367 is lowered against the elastic force of the spring 370 when the press-section stopper chip 368 is sunk downward.

When the wheel W placed and carried on the carriage belt 310c of the press-section belt conveyor 365 has reached a predetermined position, the press-section stopper chip 368 is swung to project above the carriage belt 310c, thereby carrying out positioning by centering and stopping of the wheel W. Further, the work elevating plate 367 is elevated by the elasticity of the spring 370 to thereby elevate the wheel W. In this condition, the press head 364 is lowered so as for the lower surface thereof to press the protective film S over its entire surface against the wheel W to effect secure sticking (second sticking).

After the completion of the second sticking, the press-section stopper chip 368 is sunk below the carriage belt 310c and simultaneously the work elevating plate 367 is lowered, so that the wheel W is placed on the carriage belt 310c of the press-section belt conveyor 365. Further, the stopping by the press-section stopper chip 368 is released to thereby deliver the wheel W to the subsequent step.

The actions of the above second embodiment will be described below.

First, the wheels W sequentially fed from the preceding step are individually positioned and separated in the work separation section 303, and, after the separation, intermittently carried to the sheet sticking section 304. These are carried out by repeating the projection above or sink below the carriage belt 310a of the separation stopper chip 313 by means of the separation cylinder 314 while keeping the separation-section belt conveyor 306 traveling.

Figure 54A:
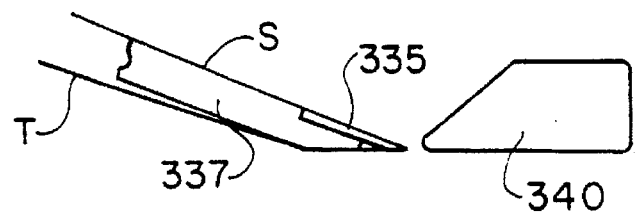
FIG. 54A, FIG. 54B and FIG. 55C are views illustrating the action taken when an edge of a protective film is peeled and the peeled edge is adsorbed and held in the second embodiment.
Figure 54B:
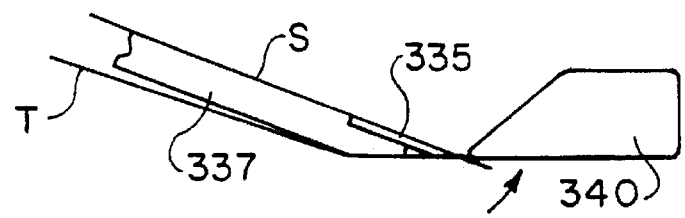
Figure 54C:
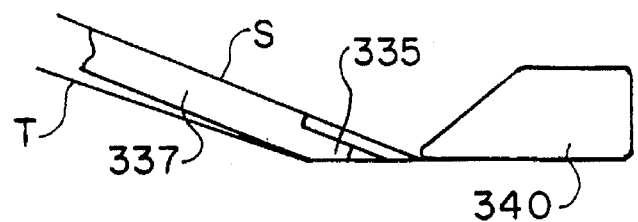

In the sheet sticking section 304, the feed roll 326, the drive roll 329 and the winding shaft 325 are rotated to travel the separator T. As shown in FIG. 54A, the protective film S held on the separator T is traveled, in accordance with the travel of the separator T, along the upper surface of the peel plate 335. The separator T is sharply folded back at the free edge of the peel plate 335 to thereby peel the forward edge of the protective film S from the separator T as shown in FIG. 54B. The vacuum grid 340 is operated, which adsorbs and holds the peeled edge of the protective film S, as shown in FIG. 54C.

Figure 55A:
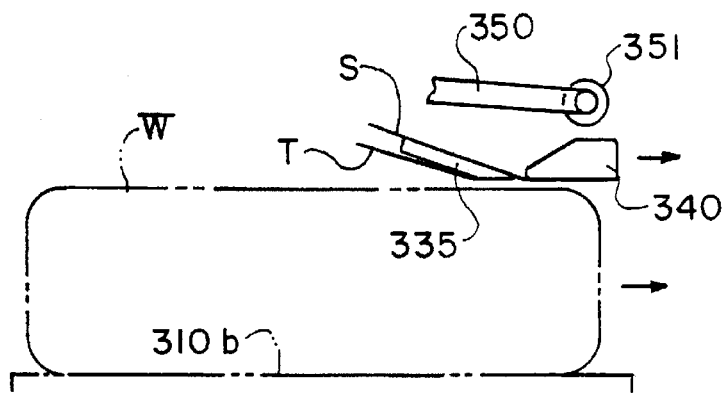

As shown in FIG. 55A, the above edge of the protective film S is positioned in a predetermined site of the wheel W placed and carried on the carriage belt 310b of the sticking-section belt conveyor 336 in accordance with the traveling thereof. In this condition, the vacuum grid 340 is moved along the wheel W carriage direction, synchronously with the wheel W.

Figure 55B:
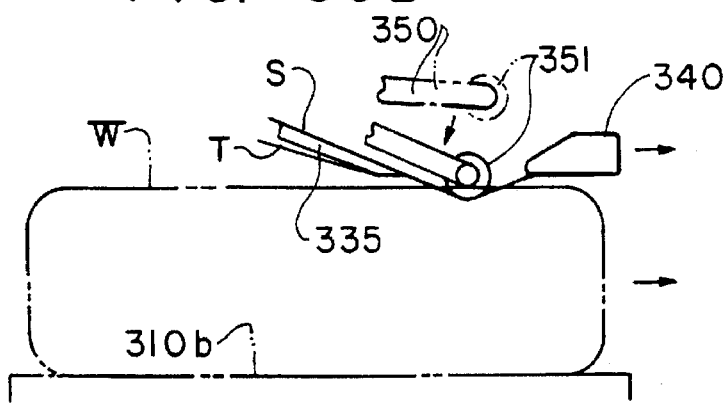

When the vacuum grid 340 has passed from below the press roll 351, as shown in FIG. 55B, the press roll 351 is lowered so as for the same to press the protective film S against the surface of the wheel W. Thereafter, the operation of the vacuum grid 340 is stopped to thereby release the adsorption and holding of the edge of the protective film S and the movement of the vacuum grid 340 is discontinued.

Figure 55C:
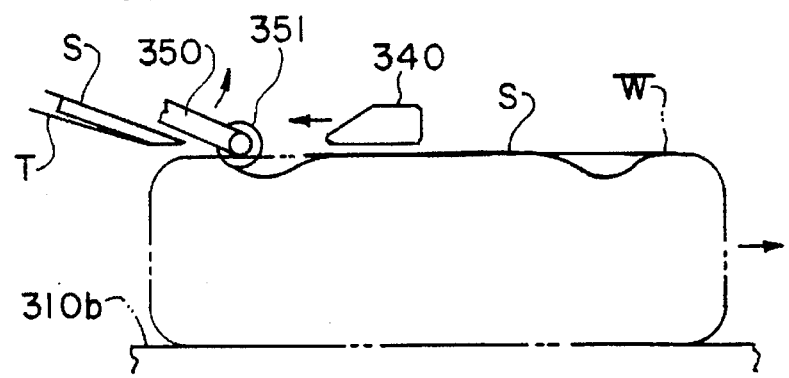

As shown in FIG. 55C, the wheel W placed and carried on the carriage belt 310b of the sticking-section belt conveyor 336 in accordance with the traveling thereof is passed from below the press roll 351 to thereby complete the sticking operation (primary sticking) of the protective film S to the surface of the wheel W. Thereafter, the press roll 351 is elevated, and simultaneously the vacuum grid 340 is retreated.

After the completion of the sticking operation (primary sticking) of the protective film S, the wheel W is transferred onto the press-section belt conveyor 365, and carried in accordance with the travel of the carriage belt 310c. When the wheel W has reached a predetermined position just under the press head 364, the press-section stopper chip 368 is swung up to project above the carriage belt 310c, thereby carrying out positioning by centering and stopping of the wheel W. Further, the work elevating plate 367 is elevated to thereby elevate the wheel W. In this condition, the press head 364 is lowered so as for the lower surface thereof to press the protective film S over its entire surface against the wheel W to effect secure sticking (second sticking).

After the completion of the second sticking, the press-section stopper chip 368 is sunk below the carriage belt 310c and simultaneously the work elevating plate 367 is lowered, so that the wheel W is placed on the carriage belt 310c of the press-section belt conveyor 365. Further, the stopping by the press-section stopper chip 368 is released to thereby deliver the wheel W to the subsequent step. Thus, a series of sticking operations are finalized.

In the above second embodiment as well, the sheet can automatically be stuck to the surface of the work even if the work is large-sized and has uneven surface, without the need of using a mold conforming to the configuration of the work, by a process comprising peeling an edge of the sheet held on a separator T and sequentially fed from the separator T, advancing the sheet along the work carriage direction in synchronism with the work while adsorbing and holding the peeled sheet edge so that the sheet is gradually peeled from the separator T, causing the peeled sheet to cover the surface of the work and simultaneously pressing the sheet covering the surface of the work by means of a press roll.

Naturally, elements of the first embodiment may be arbitrarily exchanged with those of the second embodiment.

For example, the work separation section 303 of the second embodiment may replace the sorting section 7 of the first embodiment. The press section 9 of the first embodiment and the press section 305 of the second embodiment may be exchanged with each other.

Further, the sheet sticking section 8 with the carriage path of the separator of the first embodiment may be exchanged with the sheet sticking section 304 of the second embodiment.

What is claimed is:

1. A sheet sticking apparatus for sticking a sheet held on a continuous separator and which is continuously fed to the surface of a work which is sequentially carried on a conveyor, said sheet sticking apparatus comprising:

a sorting section adapted to position a work fed to said sorting section and adapted to lower a detection plate so as to sort at least the height of the work;

a sheet sticking section arranged downstream of said sorting section and adapted to lower the sheet-holding continuous separator to just above the work in accordance with the height of the work sorted in said sorting section and to simultaneously sharply fold back the continuous separator to thereby cause a forward edge of the sheet to peel therefrom, and wherein the sheet is gradually stuck to the surface of the work while the continuous separator is moved in synchronism with the movement of the work to thereby gradually peel the sheet from the continuous separator; and a press section adapted to lower a press member to a position at which said press member contacts the surface of the work, so that said press member presses the sheet over substantially its entire surface against the work, and to deliver the work with the sheet stuck thereto from said sheet sticking apparatus.

2. The sheet sticking apparatus as claimed in claim 1, wherein not only the height of the work but also the size and type of the work are sorted in accordance with the descent of said detection plate of said sorting section.

3. The sheet sticking apparatus as claimed in claim 1, wherein said detection plate is connected to a lower end of a ball screw, a spindle provided with a nut part threadedly engaging said ball screw is rotated to move said detection plate up and down, and simultaneously a number of revolutions of said spindle is measured to thereby sort the height of the work.

4. The sheet sticking apparatus as claimed in claim 1, wherein the work is positioned by providing a pair of slide plates disposed in mutually parallel relationship and adapted to synchronously move in the contacting and parting directions, vertically disposing centering bars at both ends of each of said slide plates so as to cause said centering bars to position around said detection plate and having said centering bars contact the work at four positions thereof.

5. The sheet sticking apparatus as claimed in claim 1, wherein said sorting section has a sorting section conveyor composed of a first conveyor extending from a feed source to said sorting section and a second conveyor extending from said sorting section to said sheet sticking section, one of said conveyors being movable up and down, and said up and down movable conveyor is moved up and down to perform the transfer of the work.

6. A sheet sticking apparatus for sticking a sheet held on a continuous separator and continuously fed to the surface of a work which is sequentially carried on a conveyor, said sheet sticking apparatus comprising:

a labeler head having a peel plate adapted to peel a forward edge of the sheet from the continuous separator by sharply folding back the sheet-holding continuous separator halfway on a feed path thereof;

a vacuum grid capable of traveling along the work conveyor direction, positioned in front of said peel plate and adapted to advance and partially draw the peel sheet forward while adsorbing and holding the sheet peeled from the continuous separator, and herein said vacuum grid allows the sheet to hang down onto the work; and an air blow connected to an edge of said vacuum grid on its side of said peel plate and adapted to downwardly blow air at a forward edge of said vacuum grid in synchronism with the feed of the sheet and the conveyor of the work to thereby stick the sheet to the work.

7. The sheet sticking apparatus as claimed in claim 6, wherein said labeler head and said vacuum grid are connected to a lower end of an elevation plate movable up and down to thereby compose an elevatable labeler unit.

8. The sheet sticking apparatus as claimed in claim 7, wherein said elevation plate is so constructed as to move up and down in accordance with rotation of a ball screw, and wherein a number of revolutions of said ball screw is measured to control the position of said labeler unit.

9. The sheet sticking apparatus as claimed in claim 6, wherein an air assist adapted to blow the peeled sheet upward is disposed below a tip of the peel plate.

10. The sheet sticking apparatus as claimed in claim 6, wherein a plurality of film carrying belts each having a lower side adapted to travel along the work conveyor direction to thereby guide the sheet forward are accommodated inside said vacuum grid.

11. A sheet sticking apparatus provided with a press section adapted to press a sheet temporarily stuck to the surface of a work, over its substantially entire surface, against the work, wherein the press section is composed of a rotatable press device mount plate, and fixed to a lower side thereof, a plurality of radially divided and approximately sectorially shaped elastic press plates each having inner and outer sides independently movable up and down and a peripheral press roll movable up and down, the peripheral press roll being interposed between neighboring press plates and at a position corresponding to the peripheral edge of the press plates.

12. The sheet sticking apparatus as claimed in claim 11, wherein said peripheral press roll is movable along a diameter direction of the press device mount plate.

13. The sheet sticking apparatus as claimed in claim 11, wherein the press device mount plate is so constructed as to move up and down in accordance with the rotation of a ball screw, and the number of revolutions of the ball screw is measured to control the position of the press device mount plate.

14. The sheet sticking apparatus as claimed in claim 11, wherein the work is positioned in the press section by providing a pair of slide plates disposed in mutually parallel relationship and adapted to synchronously move in the contacting and parting directions, vertically disposing centering bars at both ends of each of the slide plates so as to cause the centering bars to position around the press device mount plate and having the centering bars contact the work at four positions thereof.

15. The sheet sticking apparatus as claimed in claim 11, wherein the press section has a press section conveyor composed of a conveyor extending from the sheet sticking section to the press section and a conveyor extending from the press section to a delivery destination, one of the conveyors being movable up and down, and the up and down movable conveyor is moved up and down to perform the transfer of the work.

16. A sheet sticking apparatus for sticking a sheet held on a continuous separator and continuously fed to a surface of a work which is sequentially carried on a conveyor, said sheet sticking apparatus comprising:

a peel plate adapted to peel a forward edge of the sheet from the continuous separator by sharply folding back the sheet-holding continuous separator halfway on a feed path thereof;

a grid positioned in front of said peel plate along the work conveyor direction, being movable forward and backward along the work conveyor direction and adapted to advance in synchronism with the feed of the sheet and the conveyor of the work while adsorbing and holding an edge of the peeled sheet; and an elevatable press roll positioned above said grid and adapted to descend to press the sheet fed in synchronism with the conveyor of the work against the work.

17. The sheet sticking apparatus as claimed in claim 1, further including:

a peel plate adapted to peel a forward edge of the sheet from the continuous separator by sharply folding back the sheet-holding continuous separator halfway on a feed path thereof;

a grid positioned in front of said peel plate along the work conveyor direction, being movable forward and backward along the work conveyor direction and adapted to advance in synchronism with the feed of the sheet and the conveyor of the work while adsorbing and holding an edge of the peeled sheet; and an elevatable press roll positioned above said grid and adapted to descend to press the sheet fed in synchronism with the conveyor of the work against the work.

18. The sheet sticking apparatus as claimed in claim 1, further including:

a labeler head having a peel plate adapted to peel a forward edge of the sheet from the continuous separator by sharply folding back the sheet-holding continuous separator halfway on a feed path thereof;

a vacuum grid capable of traveling along the work conveyor direction, positioned in front of said peel plate and adapted to advance and partially draw the peeled sheet forward while adsorbing and holding the sheet peeled from the continuous separator, said vacuum grid thereby allowing the sheet to hang down onto the work; and an air blow connected to an edge of said vacuum grid on its side of said peel plate and adapted to downwardly blow air at a forward edge of said vacuum grid in synchronism with the feed of the sheet and the conveyor of the work to thereby stick the sheet to the work.

19. The sheet sticking apparatus as claimed in claim 1, wherein said press section includes a rotatable press device mount plate fixed to a lower side thereof, a plurality of radially divided and approximately sectorially shaped elastic press plates each having inner and outer sides independently movable up and down and a peripheral press roll movable up and down, the peripheral press roll being interposed between neighboring press plates and at a position corresponding to the peripheral edge of the press plates.

\* \* \* \* \*

UNITED STATES PATENT AND TRADEMARK OFFICE
CERTIFICATE OF CORRECTION

PATENT NO. : 5,624,525
DATED : April 29, 1997
INVENTOR(S) : Tadamasa Ehara, Tetsuro Kimura, Kazuaki Mimura It is certified that error appears in the above-indentified patent and that said Letters Patent is hereby corrected as shown below:

Column 1 Line 39 "No," should read --No.--.

Column 3 Line 22 "o" should read --of--.

Column 4 Line 48 "no" should read --to--.

Column 11 Line 49 "Section" should read --section--.

Column 13 Line 48 after "thereof" insert --.--.

Column 13 Line 61 after "132" insert --.--.

Column 15 Line 51 "Fig." should read --Figs.--.

Column 19 Line 14 "film" should read --film S--

Column 21 Line 52 between "the" and "work" delete --,--.

Claim 6 Column 28 Line 51 "herein" should read --wherein--.

Signed and Sealed this

Fourteenth Day of October, 1997

Attest:

BRUCE LEHMAN

Attesting Officer

Commissioner of Patents and Trademarks